US012458069B2

(12) United States Patent
Lee et al.

(10) Patent No.: US 12,458,069 B2
(45) Date of Patent: Nov. 4, 2025

(54) AEROSOL-GENERATING DEVICE

(71) Applicant: KT&G CORPORATION, Daejeon (KR)

(72) Inventors: Jongsub Lee, Sungnam-si (KR); Minkyu Kim, Seoul (KR); Jueon Park, Seoul (KR); Byungsung Cho, Gwangmyung-si (KR)

(73) Assignee: KT&G CORPORATION, Daejeon (KR)

( * ) Notice: Subject to any disclaimer, the term of this patent is extended or adjusted under 35 U.S.C. 154(b) by 461 days.

(21) Appl. No.: 17/799,601

(22) PCT Filed: Dec. 14, 2021

(86) PCT No.: PCT/KR2021/018935
§ 371 (c)(1),
(2) Date: Aug. 12, 2022

(87) PCT Pub. No.: WO2022/139295
PCT Pub. Date: Jun. 30, 2022

(65) Prior Publication Data
US 2023/0067854 A1    Mar. 2, 2023

(30) Foreign Application Priority Data
Dec. 21, 2020    (KR) .................. 10-2020-0180001

(51) Int. Cl.
*A24F 40/20*    (2020.01)
*A24F 7/00*    (2006.01)
(Continued)

(52) U.S. Cl.
CPC .............. *A24F 40/42* (2020.01); *A24F 40/10* (2020.01); *A24F 40/30* (2020.01); *A24F 40/46* (2020.01); *A24F 40/51* (2020.01)

(58) Field of Classification Search
CPC ...................................................... A24F 40/30
See application file for complete search history.

(56) References Cited

U.S. PATENT DOCUMENTS 9,498,002 B1 * 11/2016 Soreide .................. A24F 40/30
2012/0227753 A1    9/2012 Newton
(Continued)

FOREIGN PATENT DOCUMENTS

CN     203789157     8/2014
CN     106231929     12/2016
(Continued)

OTHER PUBLICATIONS

English Machine Translation of CN 110973712, obtained from PE2E Search (Clarivate Analytics) (Year: 2019).*
(Continued)

*Primary Examiner* — Philip Y Louie
*Assistant Examiner* — Charlotte Davison
(74) *Attorney, Agent, or Firm* — LEE, HONG, DEGERMAN, KANG & WAIMEY

(57) ABSTRACT

An aerosol-generating device is disclosed. The aerosol-generating device of the present disclosure includes a first container configured to accommodate an aerosol-generating substance, a heater configured to heat the aerosol-generating substance, a second container configured to be rotatable about a rotating shaft thereof and including a plurality of partitioned chambers, a first sensor configured to output a signal indicating rotation of the second container, and a controller configured to determine whether the plurality of chambers is located at preset correct positions based on a signal received from the first sensor.

8 Claims, 43 Drawing Sheets

(51) Int. Cl.

| | | |
|---|---|---|
| *A24F 40/10* | (2020.01) |
| *A24F 40/30* | (2020.01) |
| *A24F 40/42* | (2020.01) |
| *A24F 40/46* | (2020.01) |
| *A24F 40/485* | (2020.01) |
| *A24F 40/50* | (2020.01) |
| *A24F 40/51* | (2020.01) |
| *A24F 40/53* | (2020.01) |
| *A24F 40/60* | (2020.01) |
| *G08B 5/22* | (2006.01) |
| *G08B 6/00* | (2006.01) |
| *H02J 7/00* | (2006.01) |

(56) References Cited

U.S. PATENT DOCUMENTS

| | | | |
|---|---|---|---|
| 2014/0060556 A1 | 3/2014 | Liu | |
| 2017/0014582 A1* | 1/2017 | Skoda | A61M 15/06 |
| 2018/0242641 A1* | 8/2018 | Chaves | A24F 40/42 |
| 2019/0200673 A1* | 7/2019 | Bless | A24F 40/485 |
| 2019/0289909 A1* | 9/2019 | Hejazi | A24F 40/42 |
| 2020/0093184 A1* | 3/2020 | Crespo | H05B 1/0227 |
| 2020/0390153 A1* | 12/2020 | Li | A24F 40/57 |
| 2021/0037890 A1* | 2/2021 | Du | A24F 40/57 |

FOREIGN PATENT DOCUMENTS

| | | | | |
|---|---|---|---|---|
| CN | 109952035 | | 6/2019 | |
| CN | 110973712 A | * | 4/2020 | |
| CN | 212139314 | | 12/2020 | |
| EP | 2989912 | | 3/2016 | |
| EP | 2989912 B1 | * | 5/2019 | ............ A24F 40/30 |
| EP | 3955756 | | 5/2023 | |
| KR | 10-2014-0070524 | | 6/2014 | |
| KR | 10-2017-0083614 | | 7/2017 | |
| KR | 10-2019-0038181 | | 4/2019 | |
| KR | 10-2020-0122392 | | 10/2020 | |
| KR | 10-2020-0124741 | | 11/2020 | |
| WO | 2019186328 | | 10/2019 | |
| WO | WO-2019185749 A1 | * | 10/2019 | ............ A24F 40/40 |
| WO | WO-2020089890 A1 | * | 5/2020 | ............ A24F 40/30 |

OTHER PUBLICATIONS

PCT International Application No. PCT/KR2021/018935, International Search Report dated Mar. 24, 2022, 2 pages.
The State Intellectual Property Office of the People's Republic of China Application Serial No. 202180012313.7, Office Action dated Aug. 24, 2024, 8 pages.
European Patent Office Application Serial No. 21911362.8, Search Report dated Oct. 29, 2024, 8 pages.

* cited by examiner

[Fig. 1]
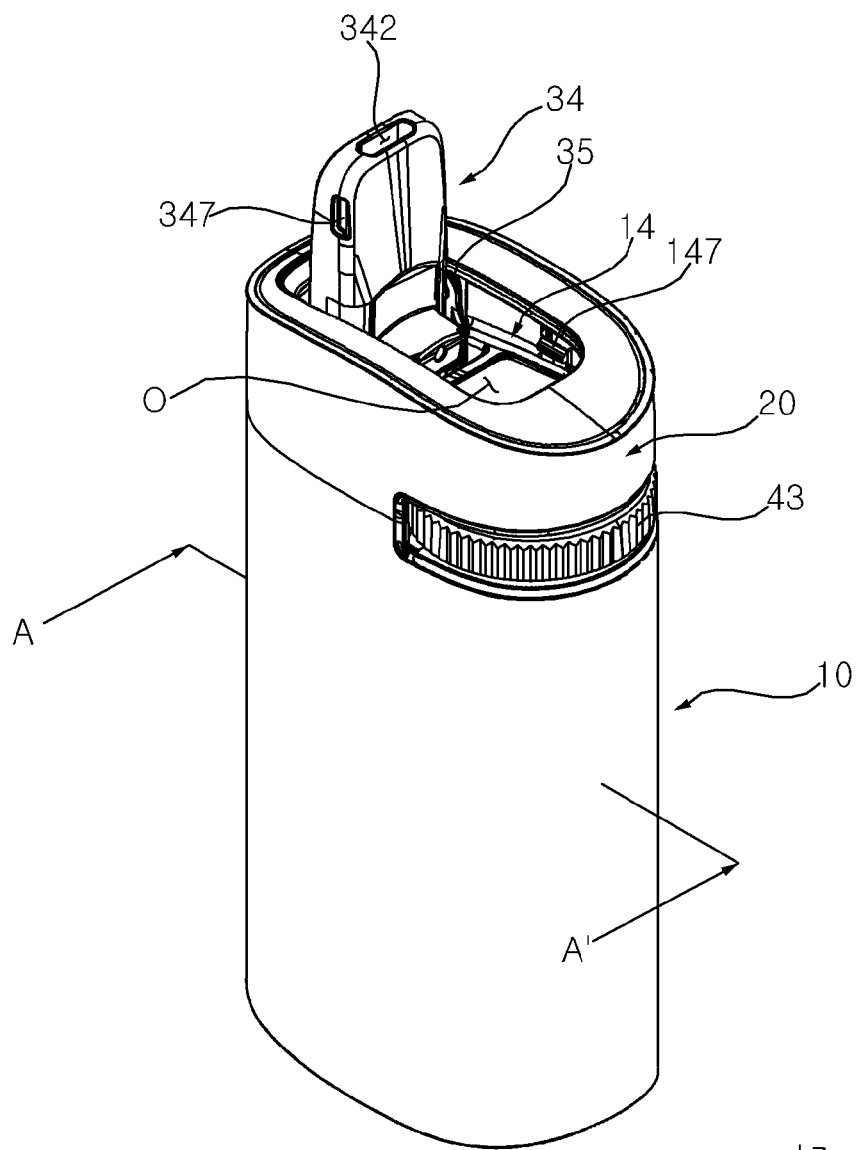
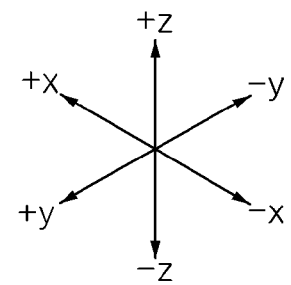

[Fig. 2]
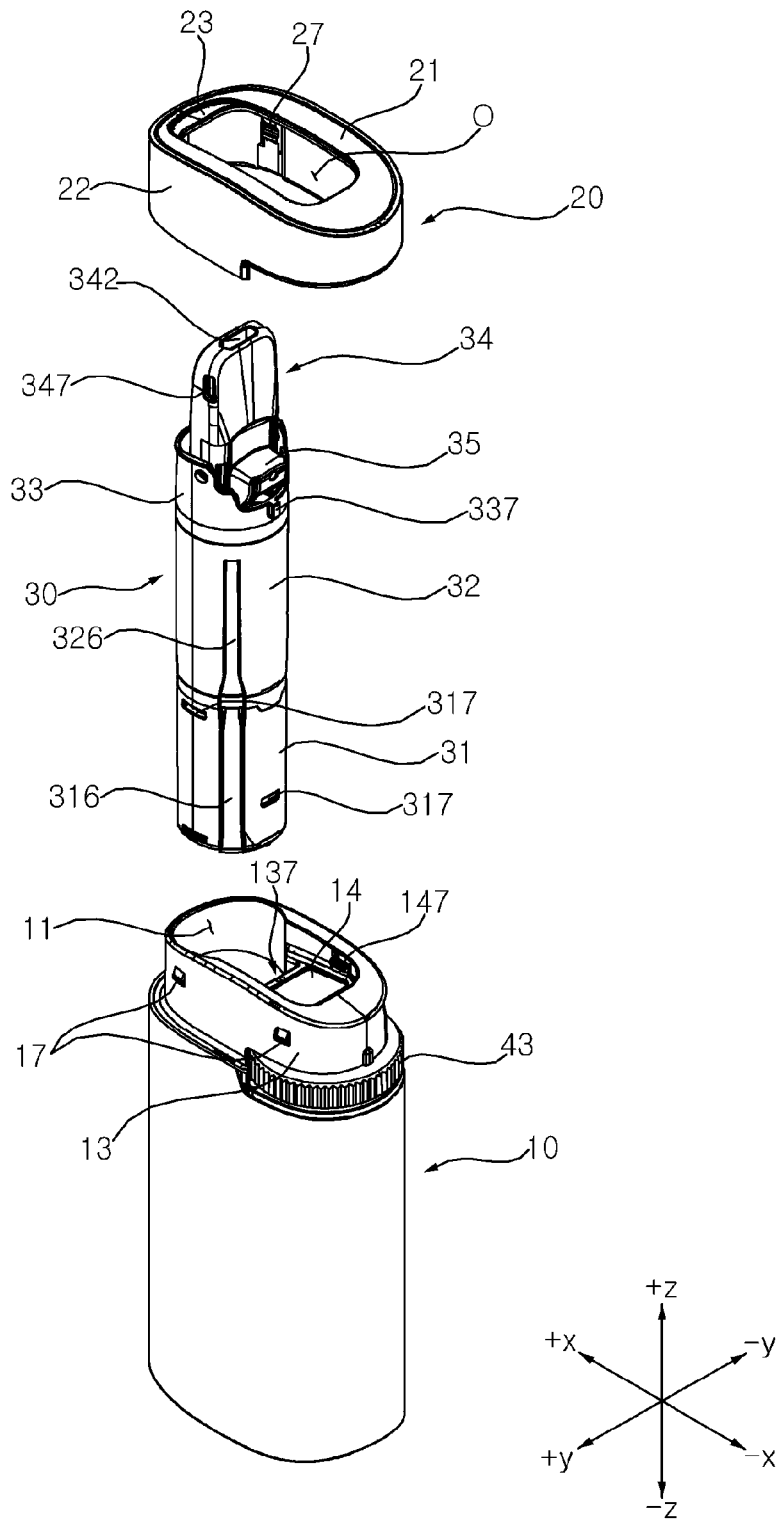

[Fig. 3]
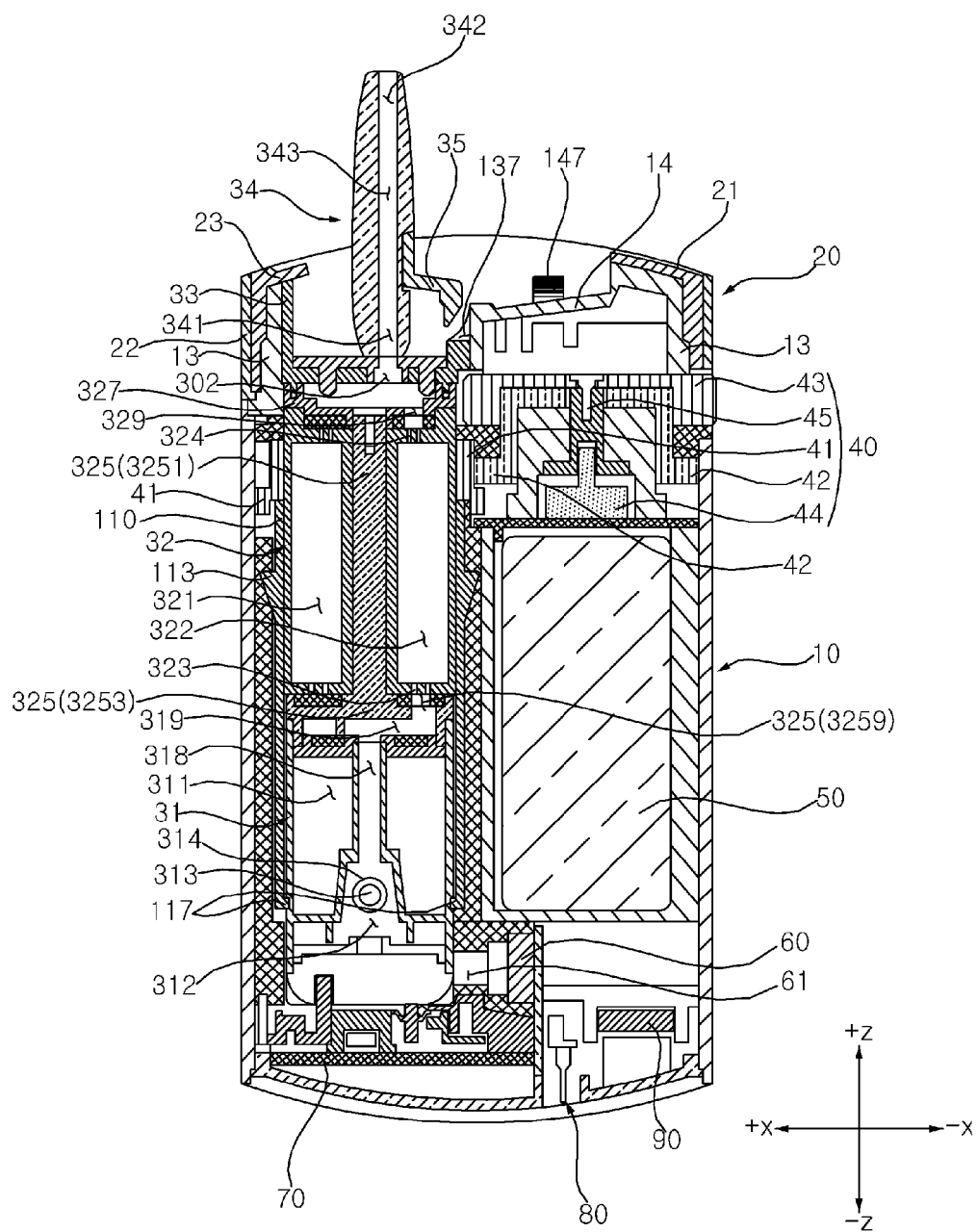

[Fig. 4]
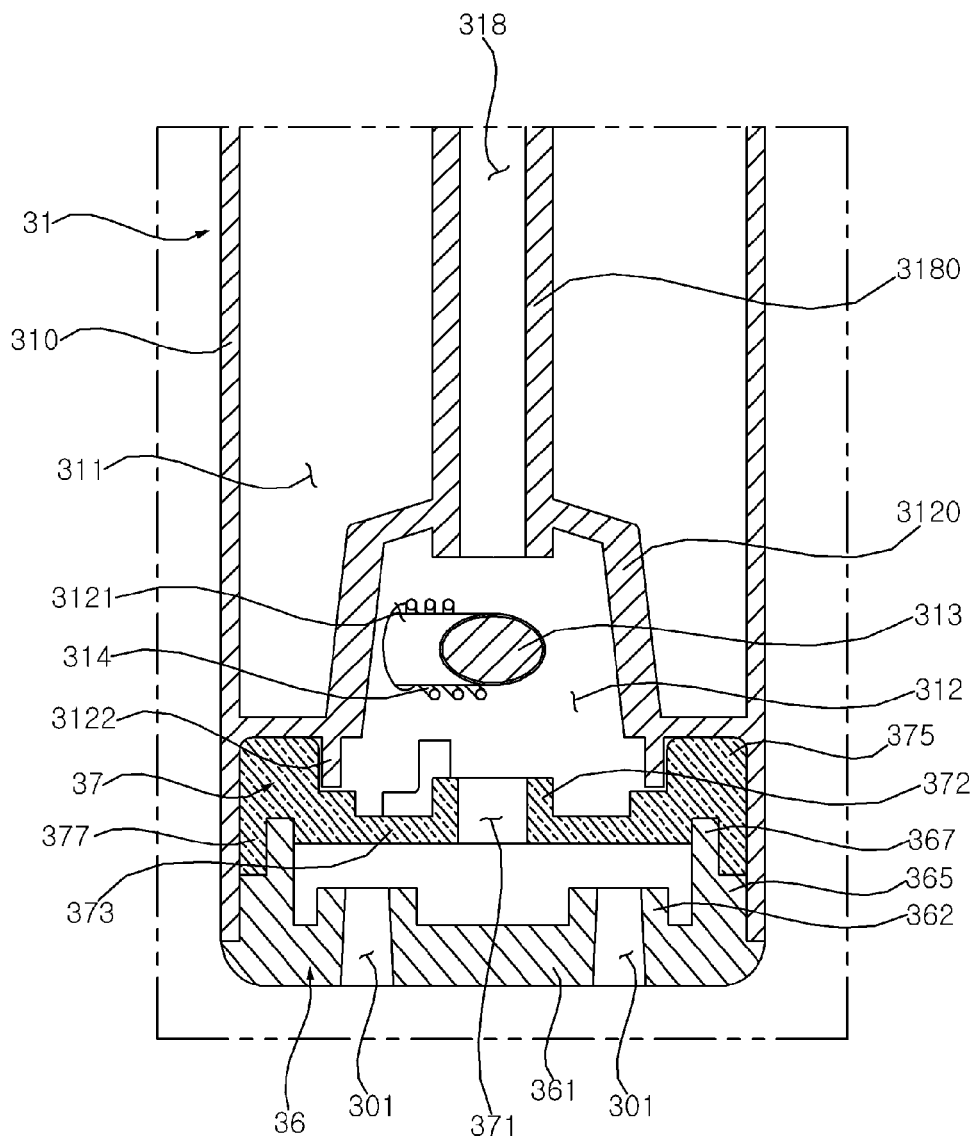

[Fig. 5]
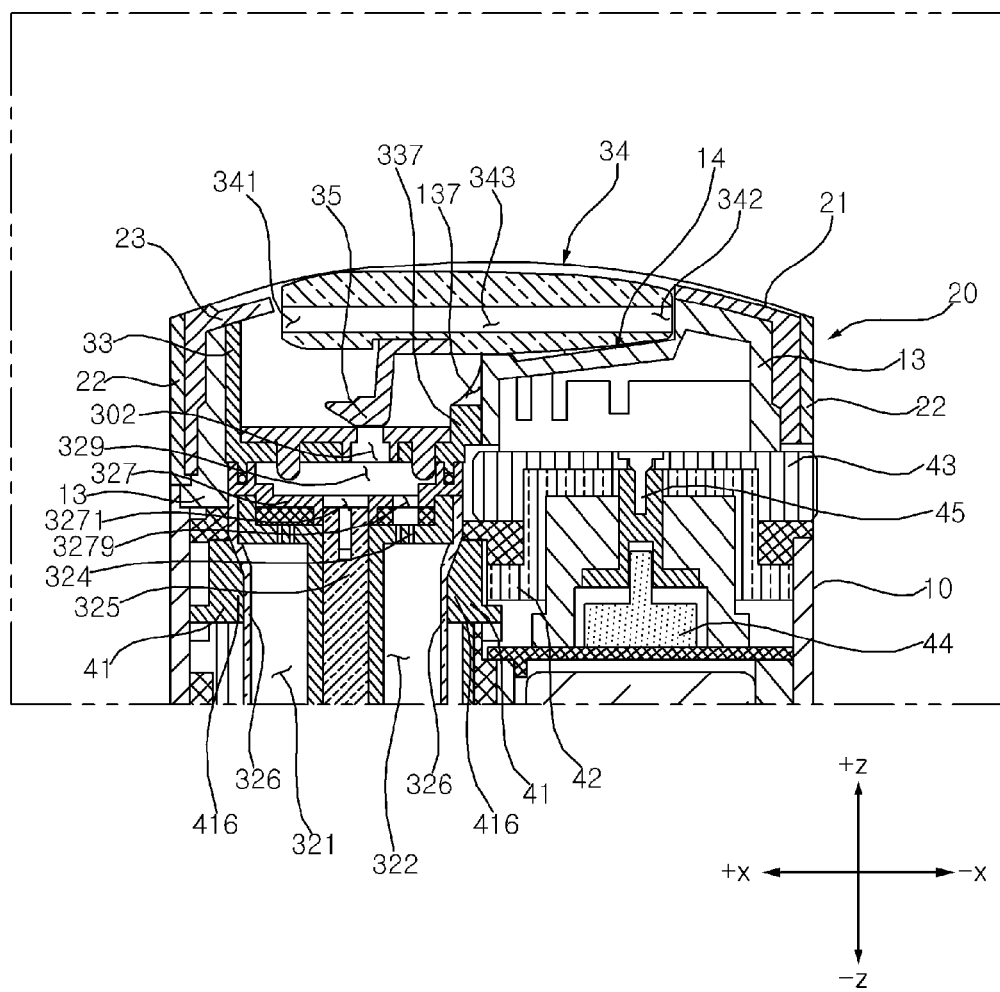

[Fig. 6]
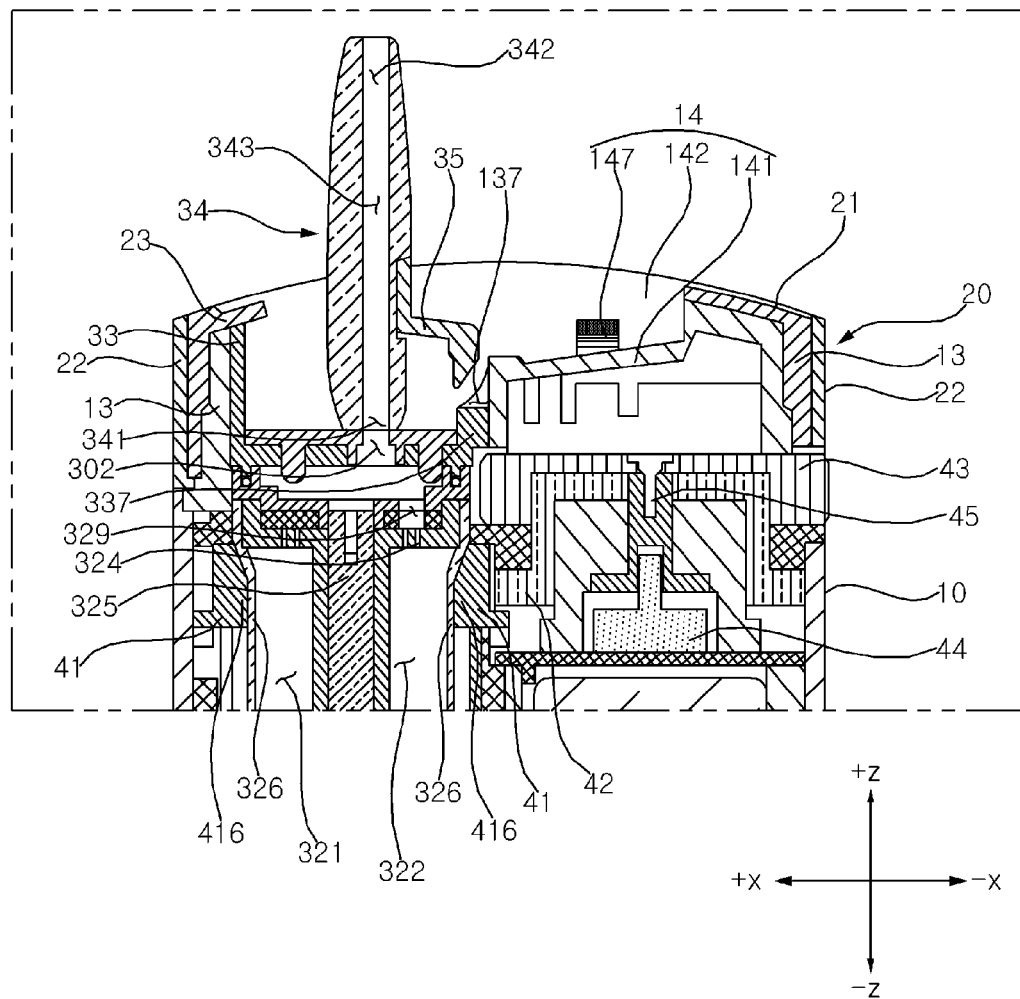

[Fig. 7]
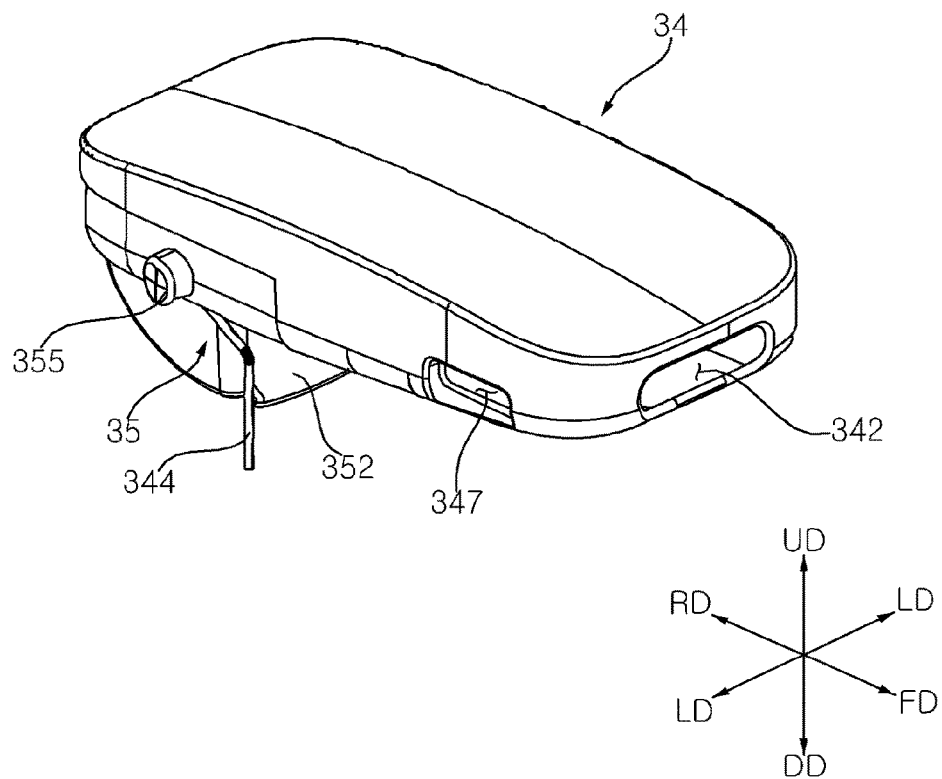
[Fig. 8]
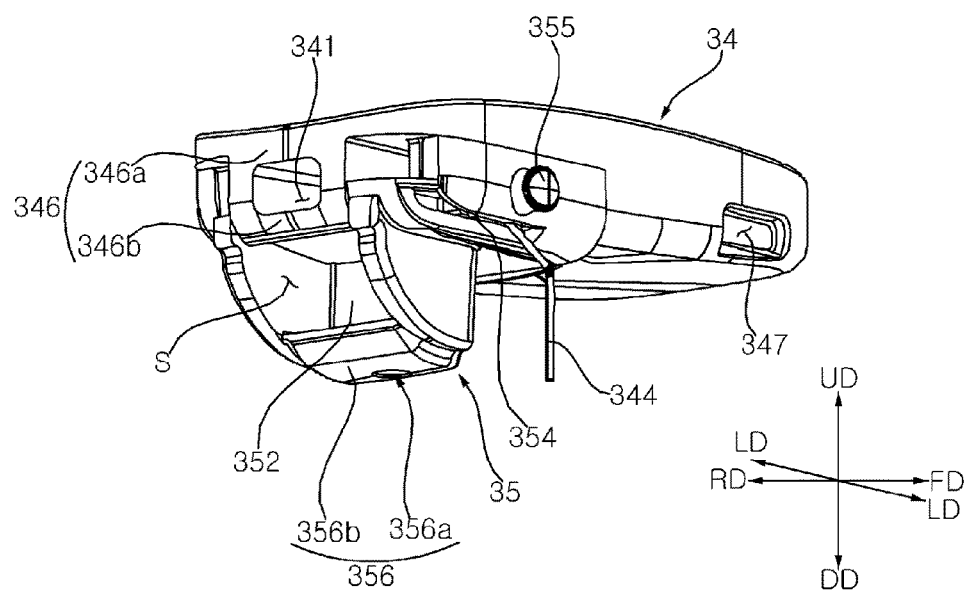

[Fig. 9]
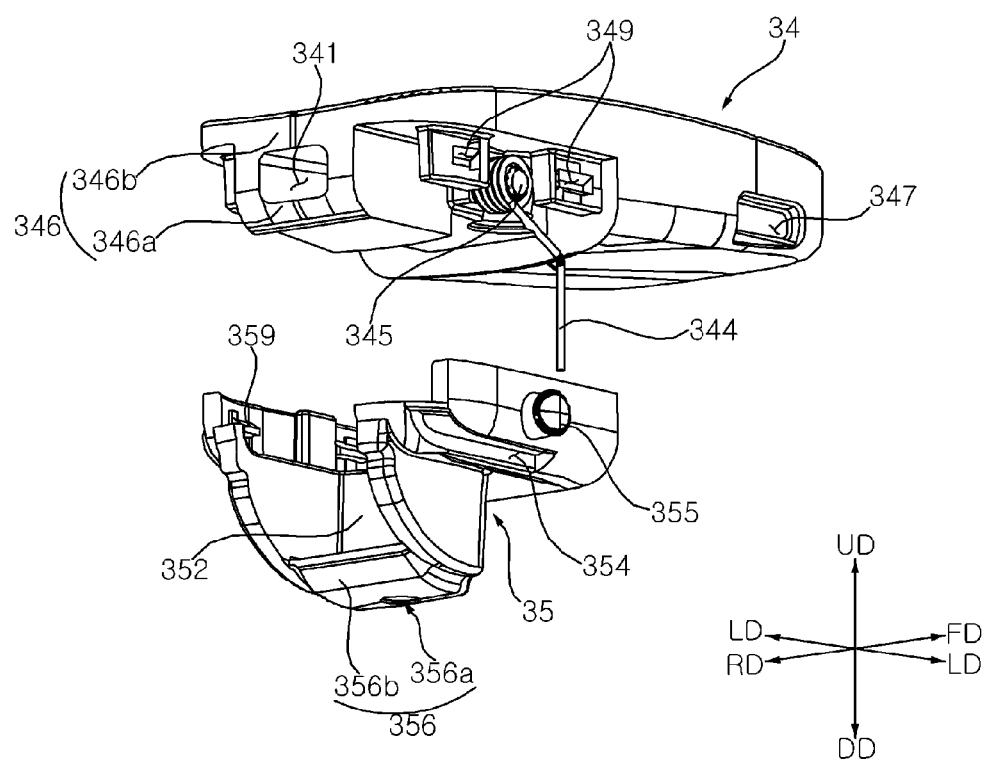

[Fig. 10]
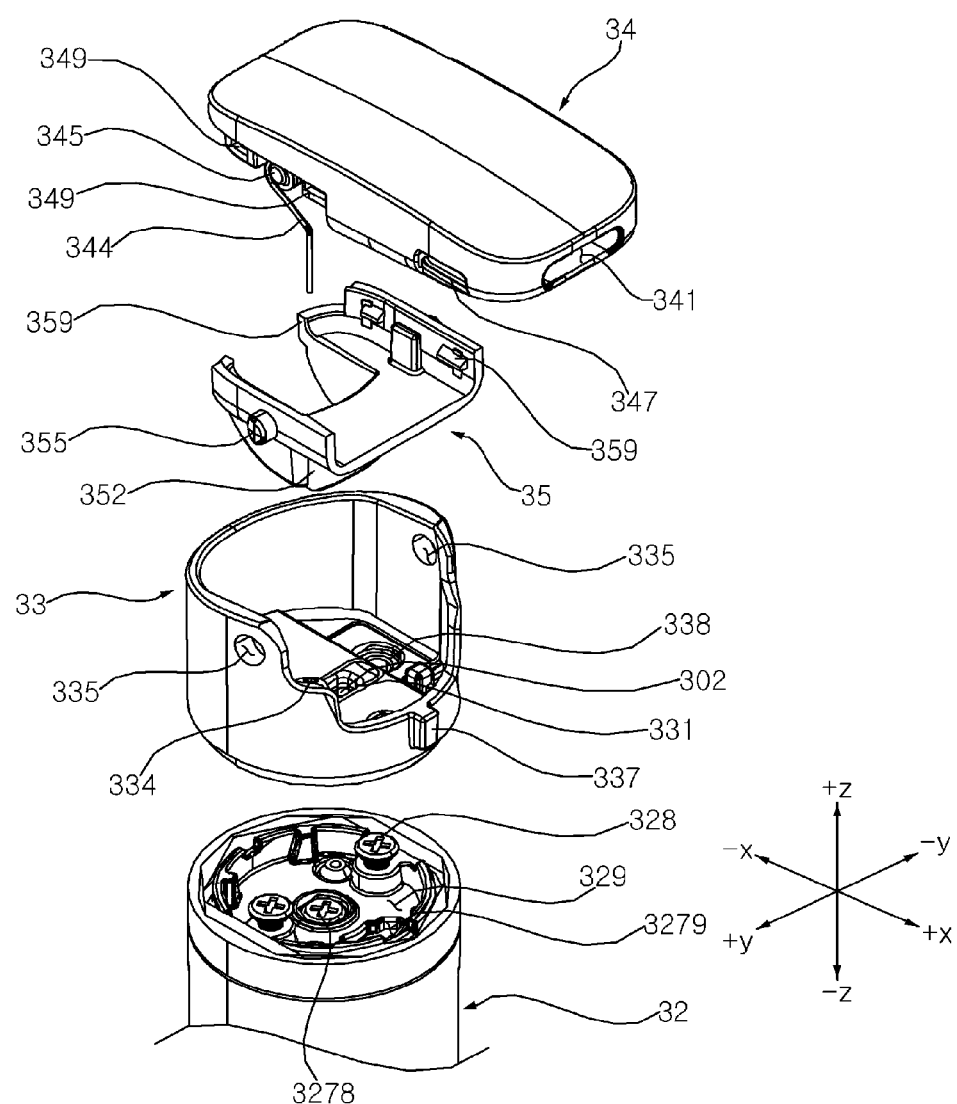

[Fig. 11]
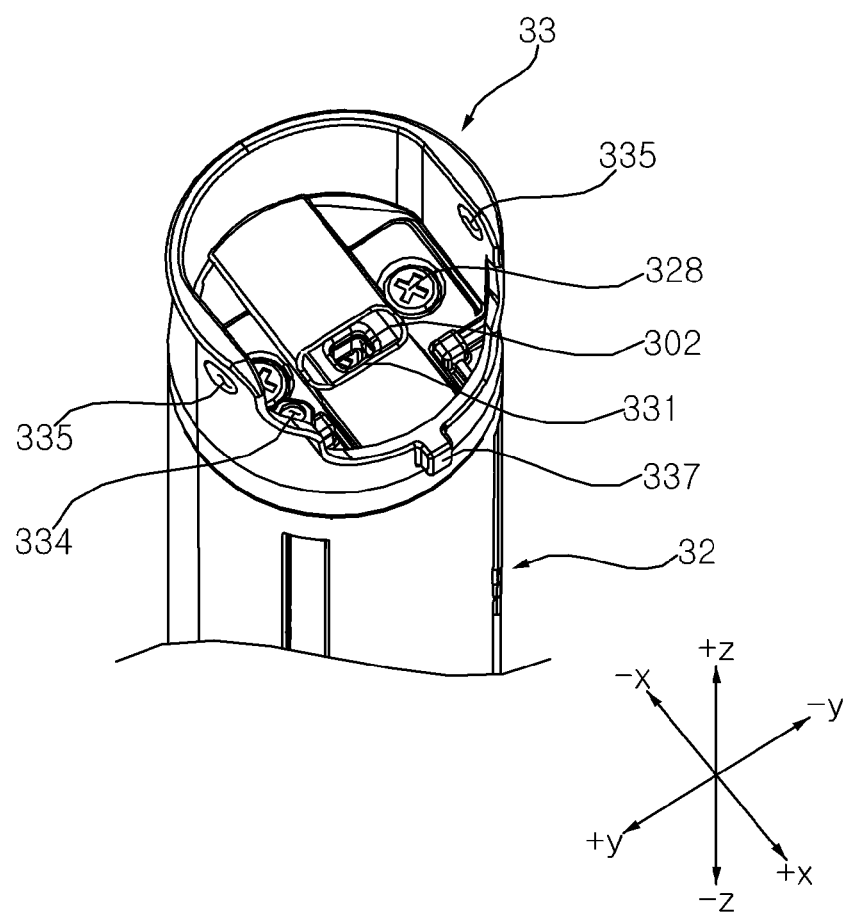

[Fig. 12]
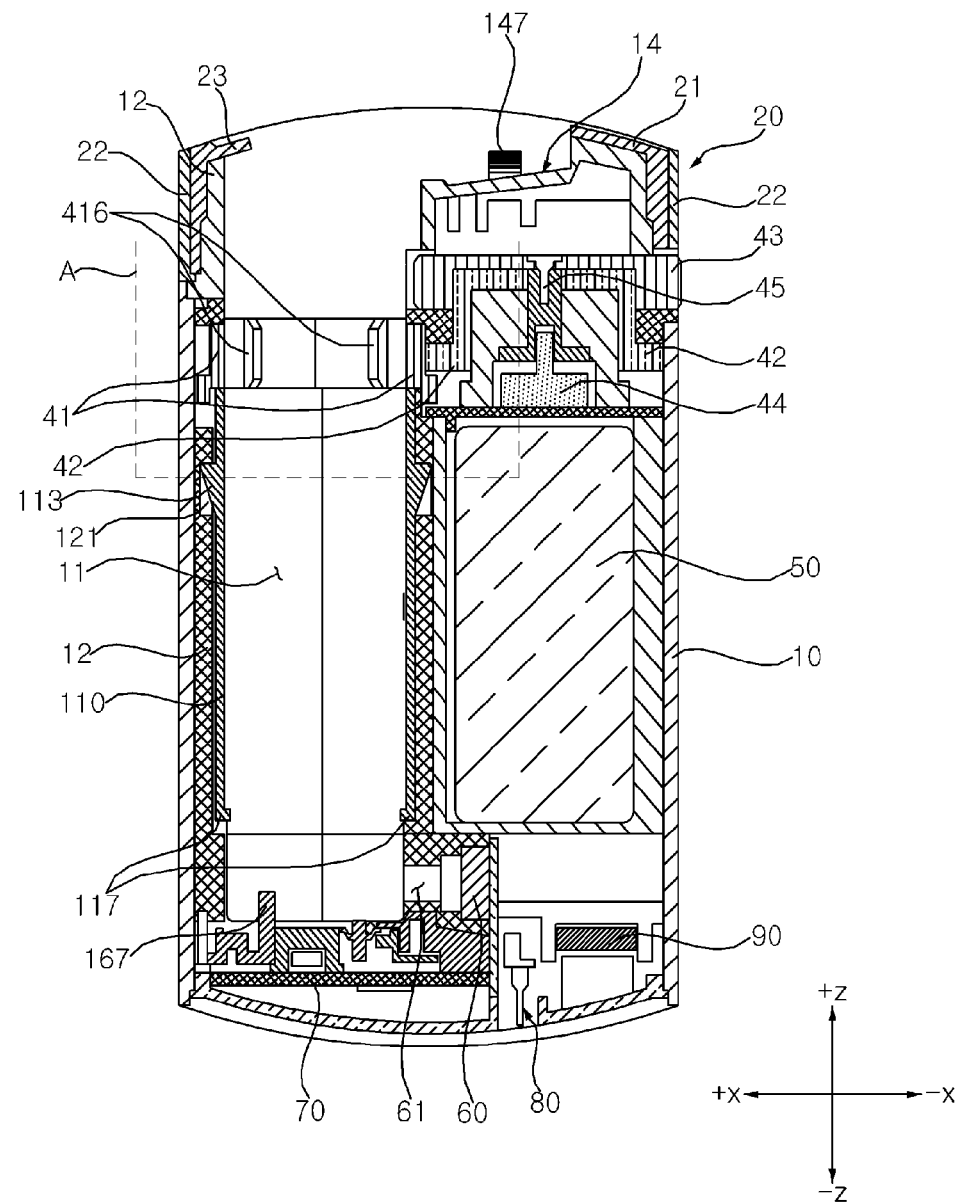

[Fig. 13]
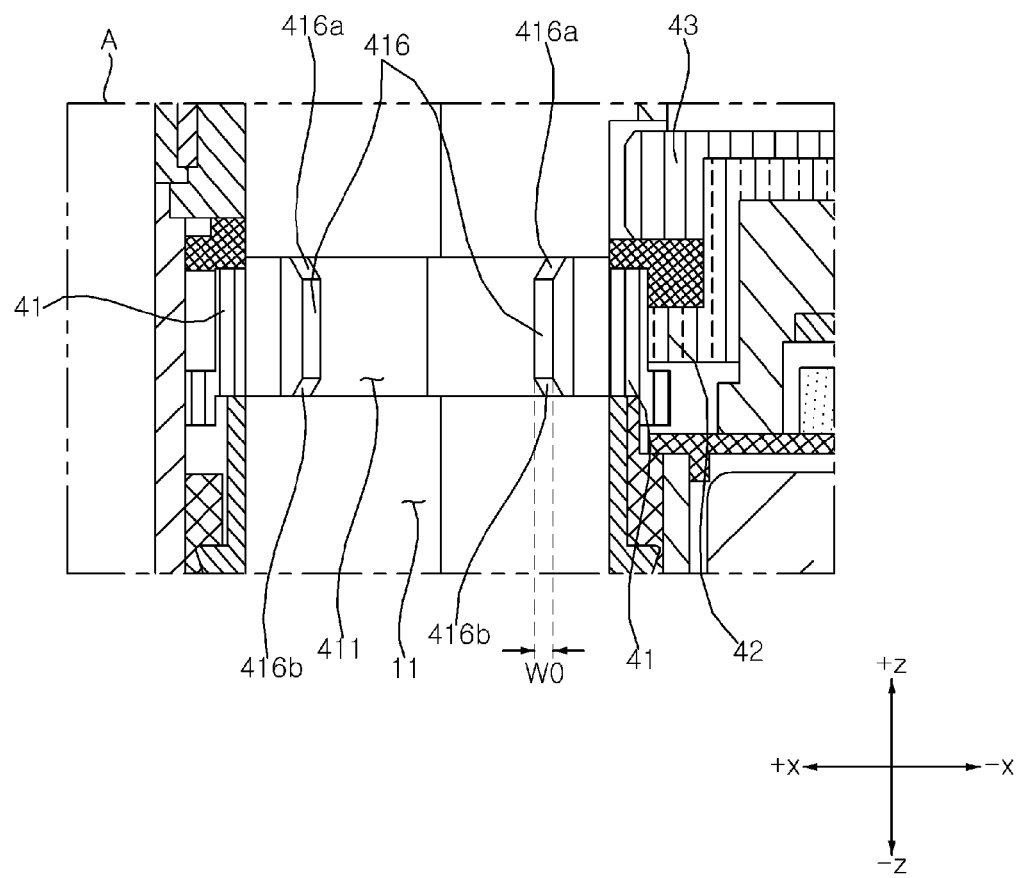

[Fig. 14]
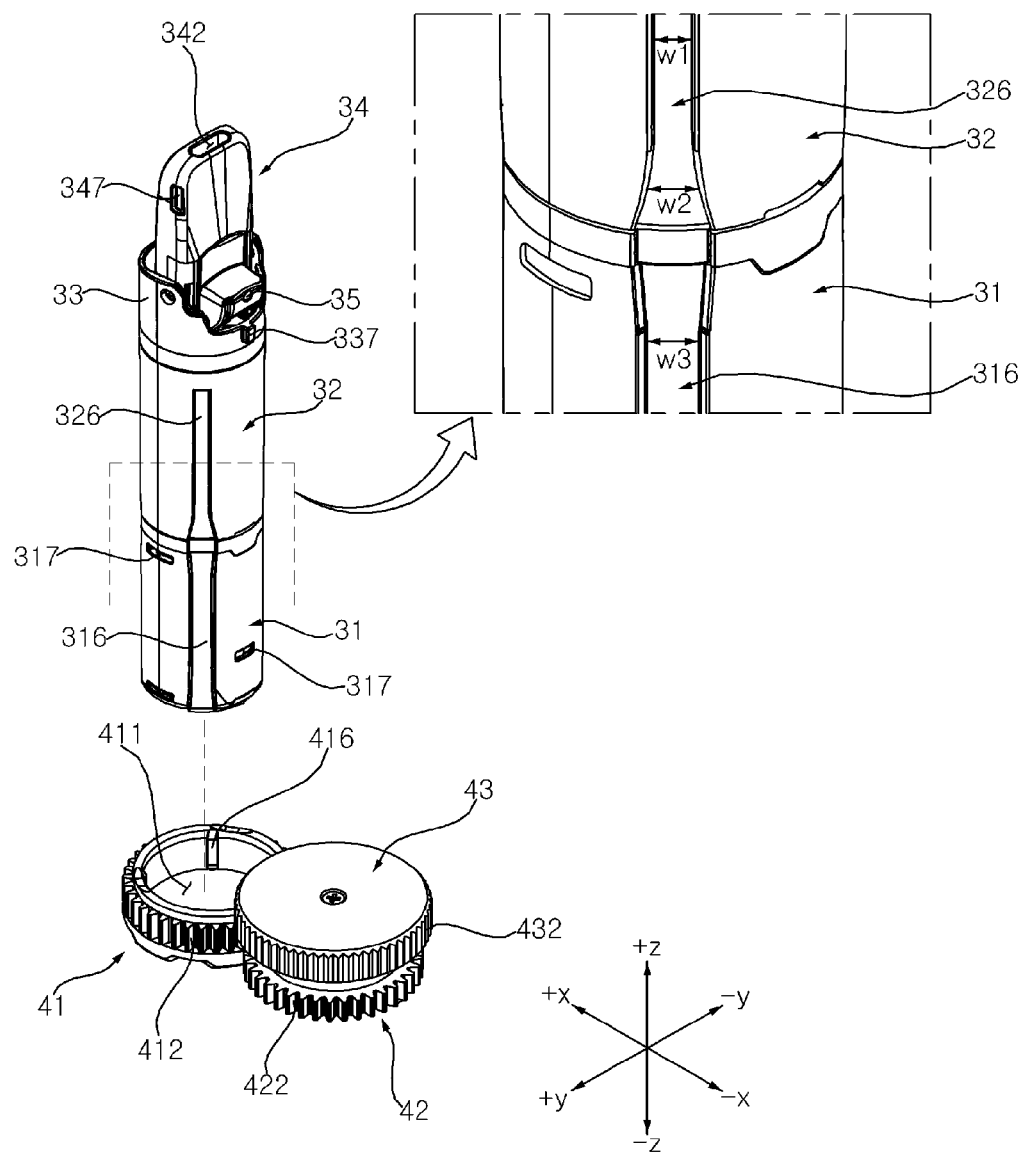

[Fig. 15]
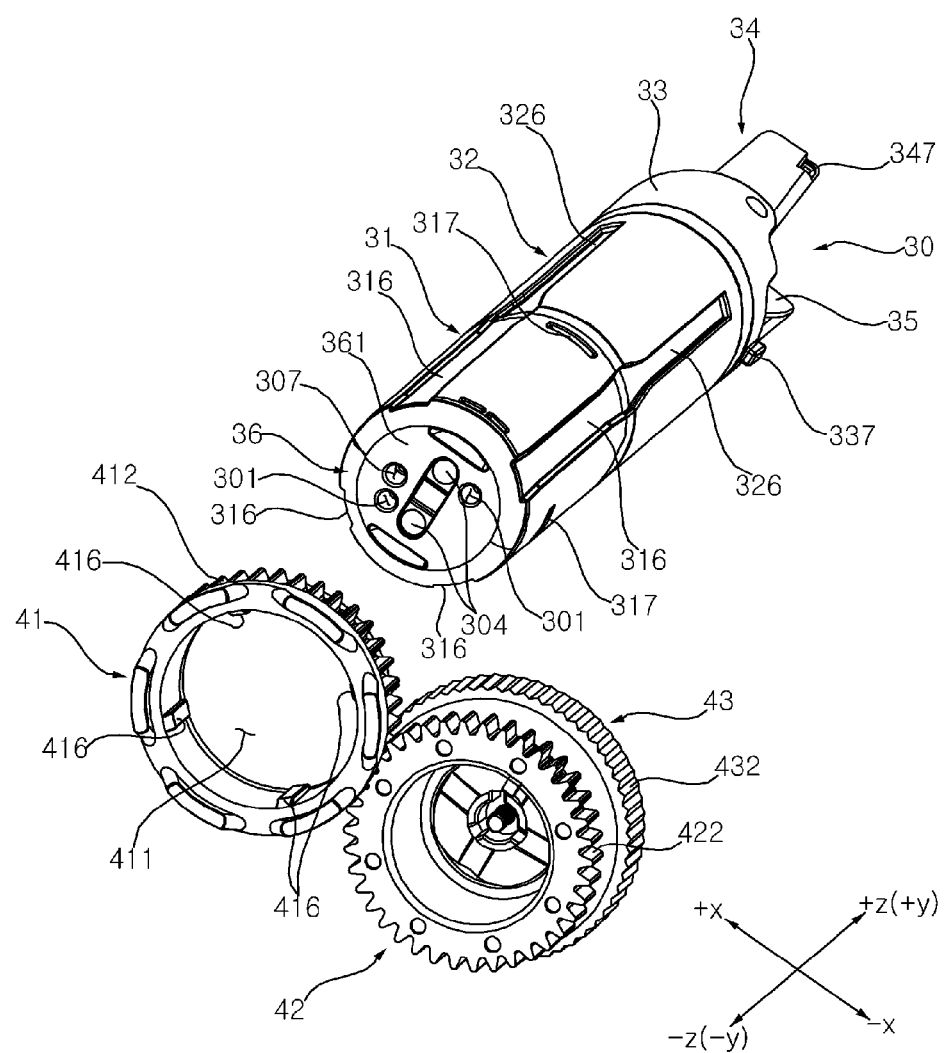

[Fig. 16]
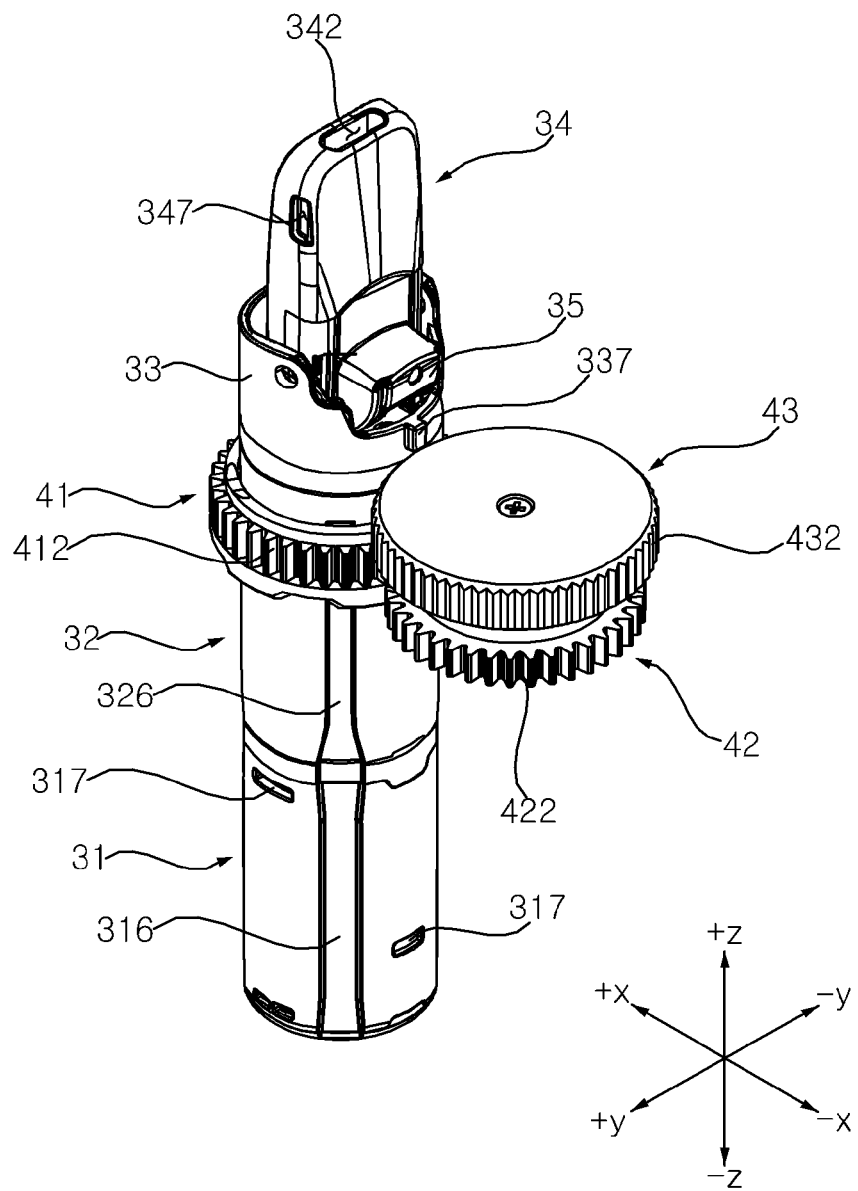

[Fig. 17]
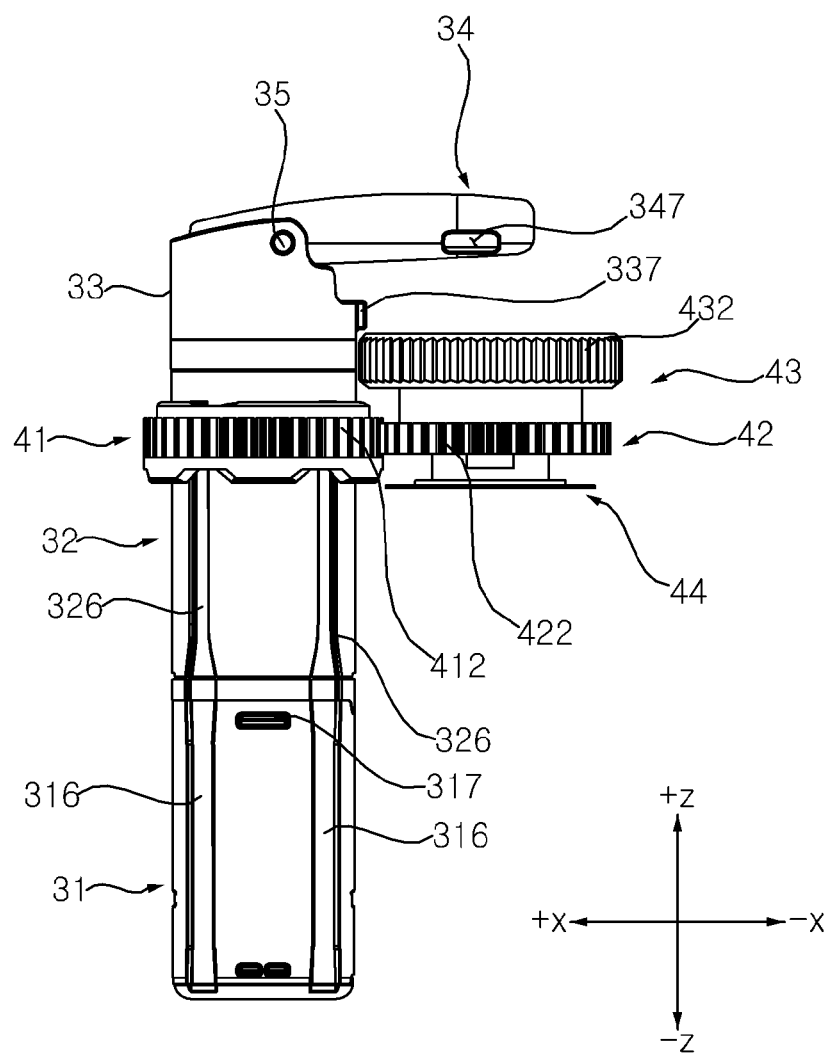

[Fig. 18]
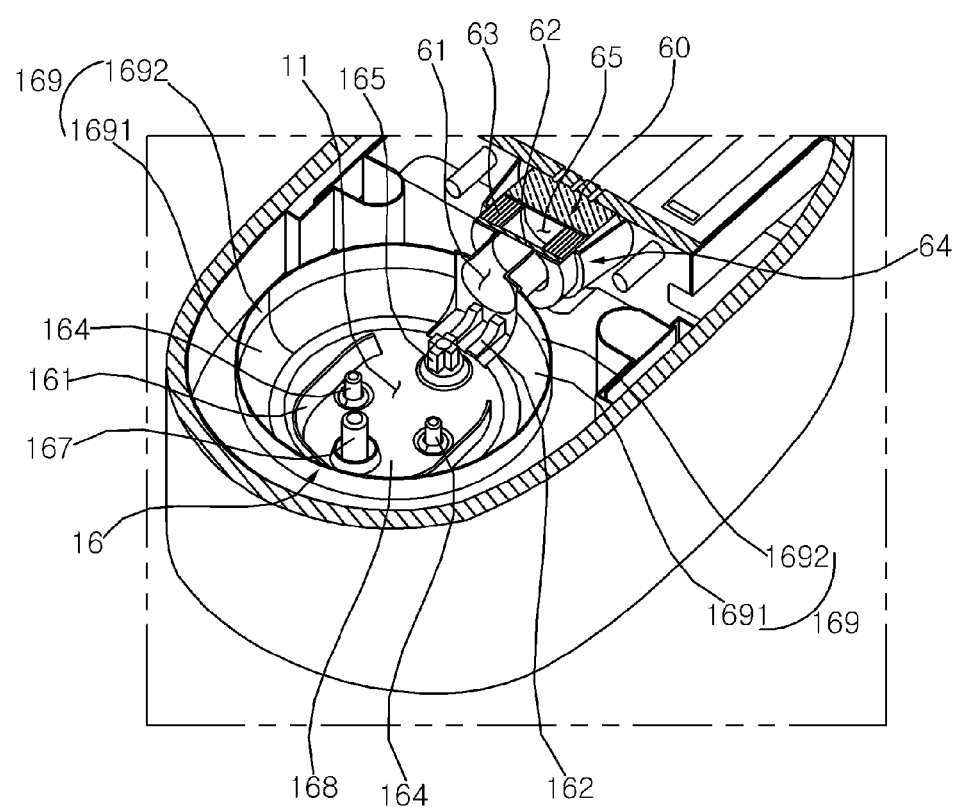

[Fig. 19]
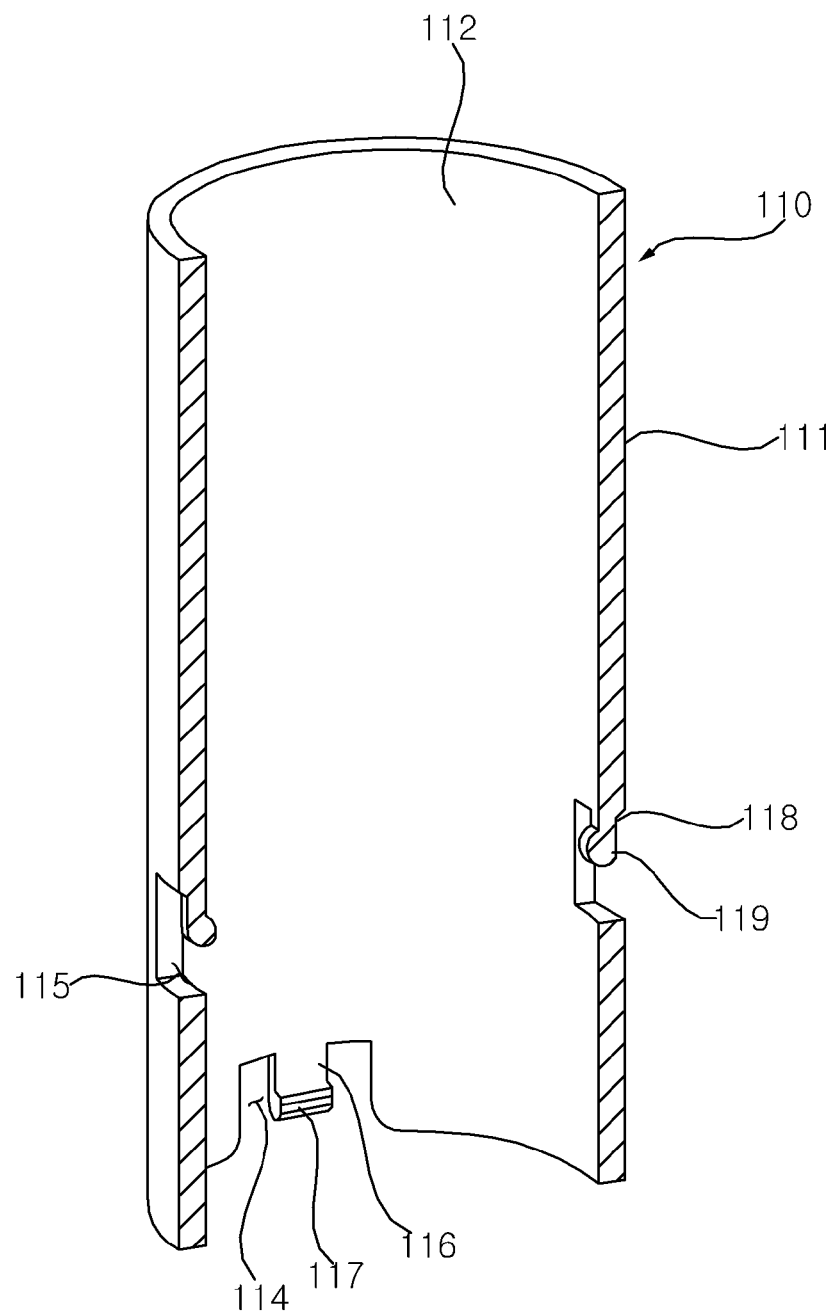

[Fig. 20]
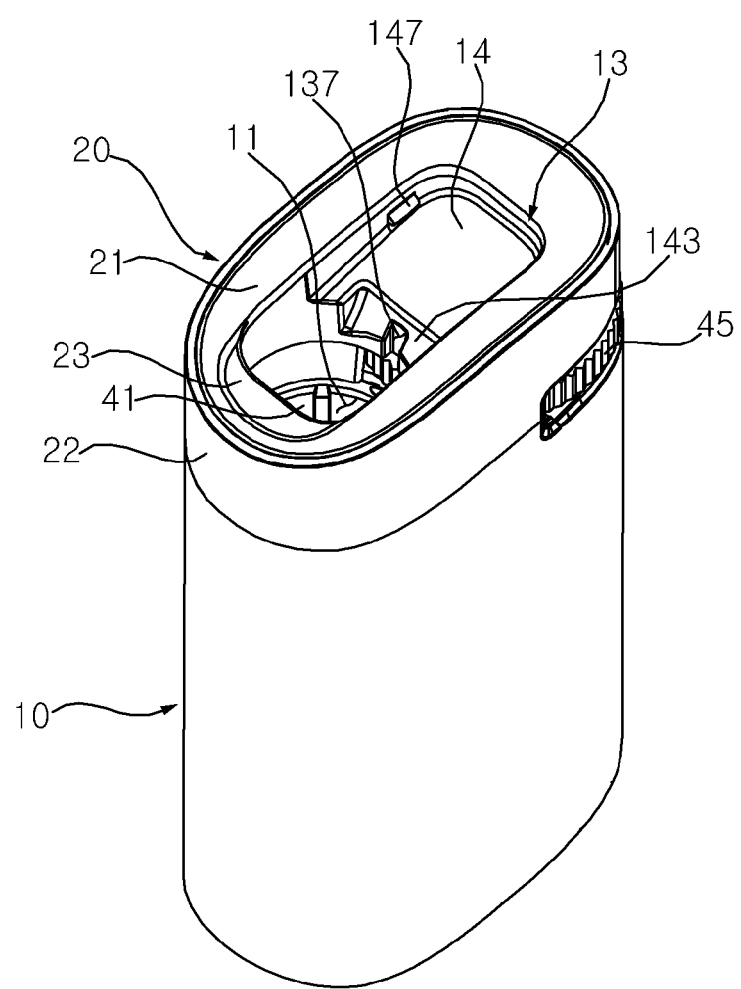

[Fig. 21]
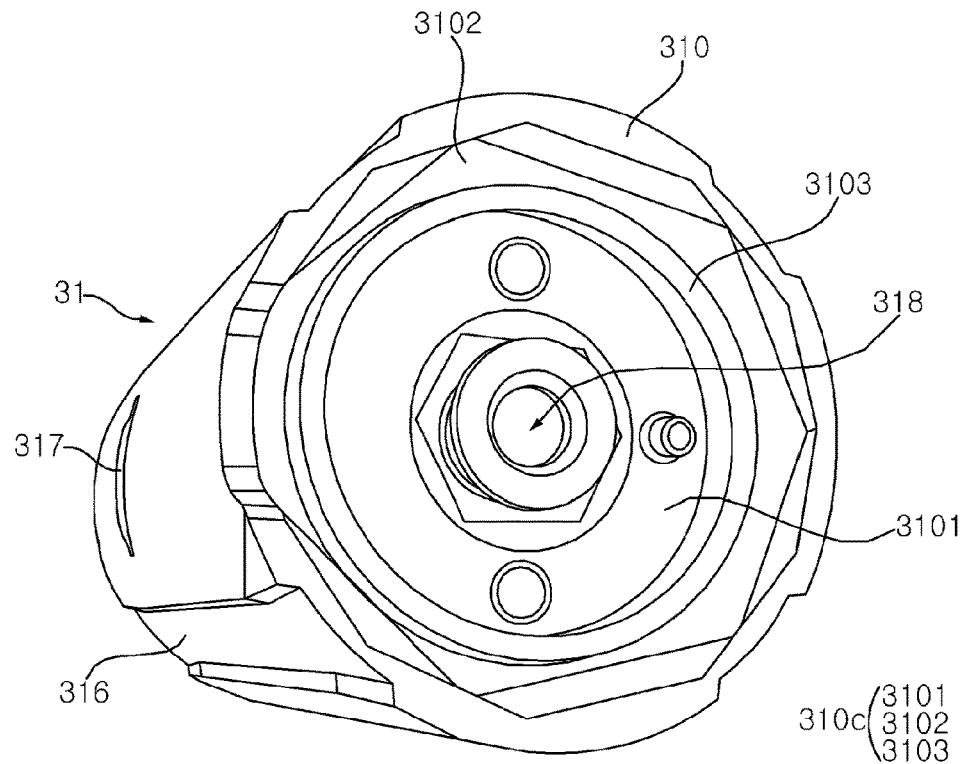
[Fig. 22]
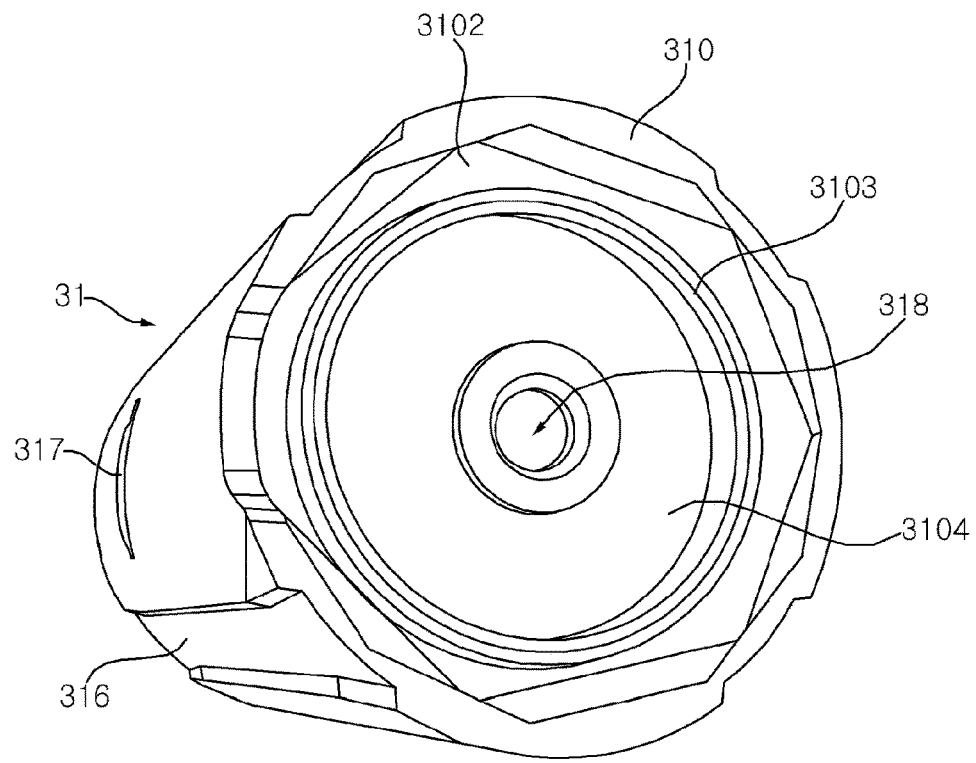

[Fig. 23]
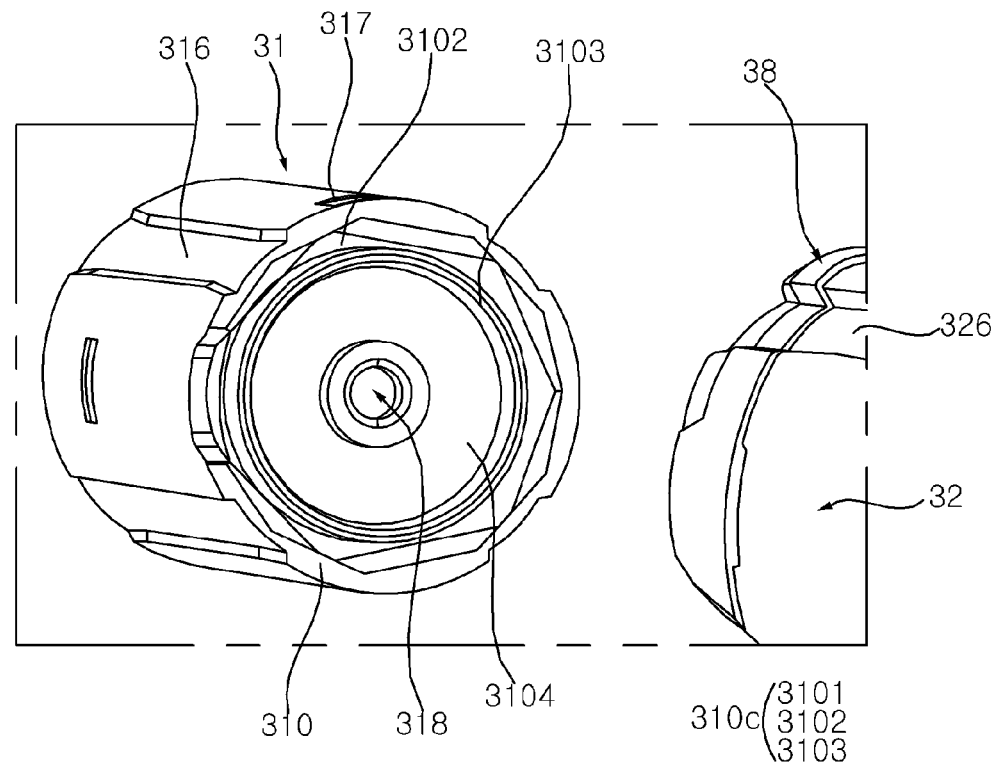
[Fig. 24]
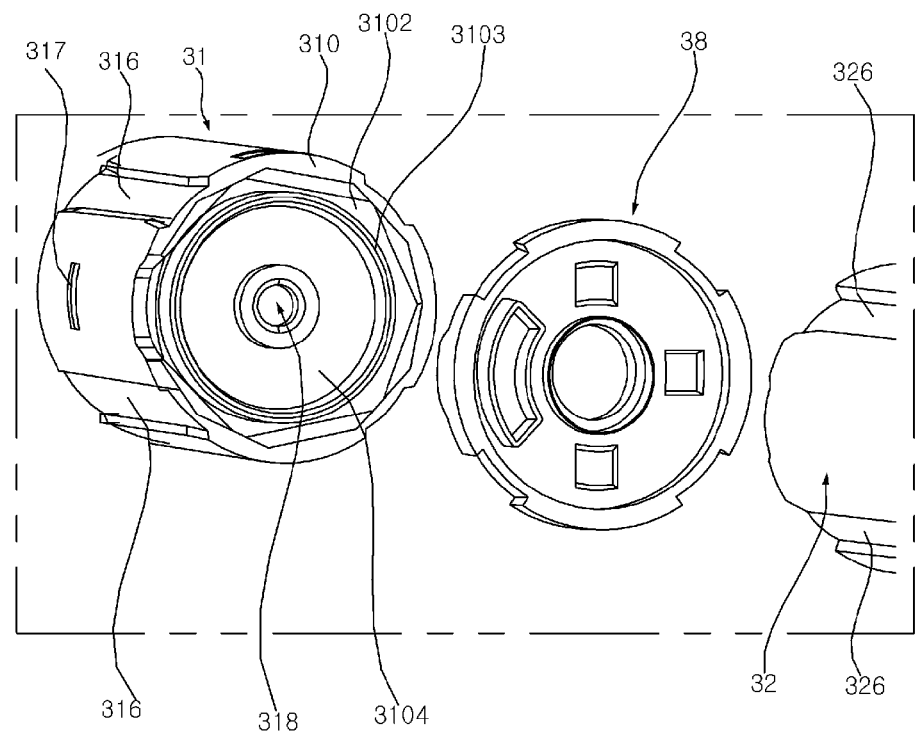

[Fig. 25]
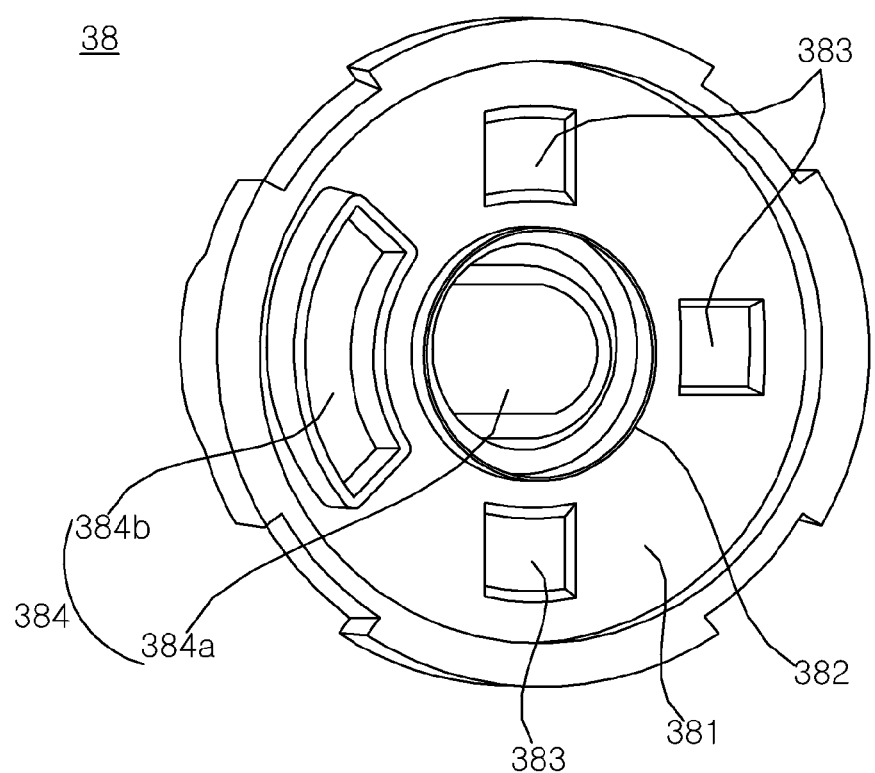

[Fig. 26]
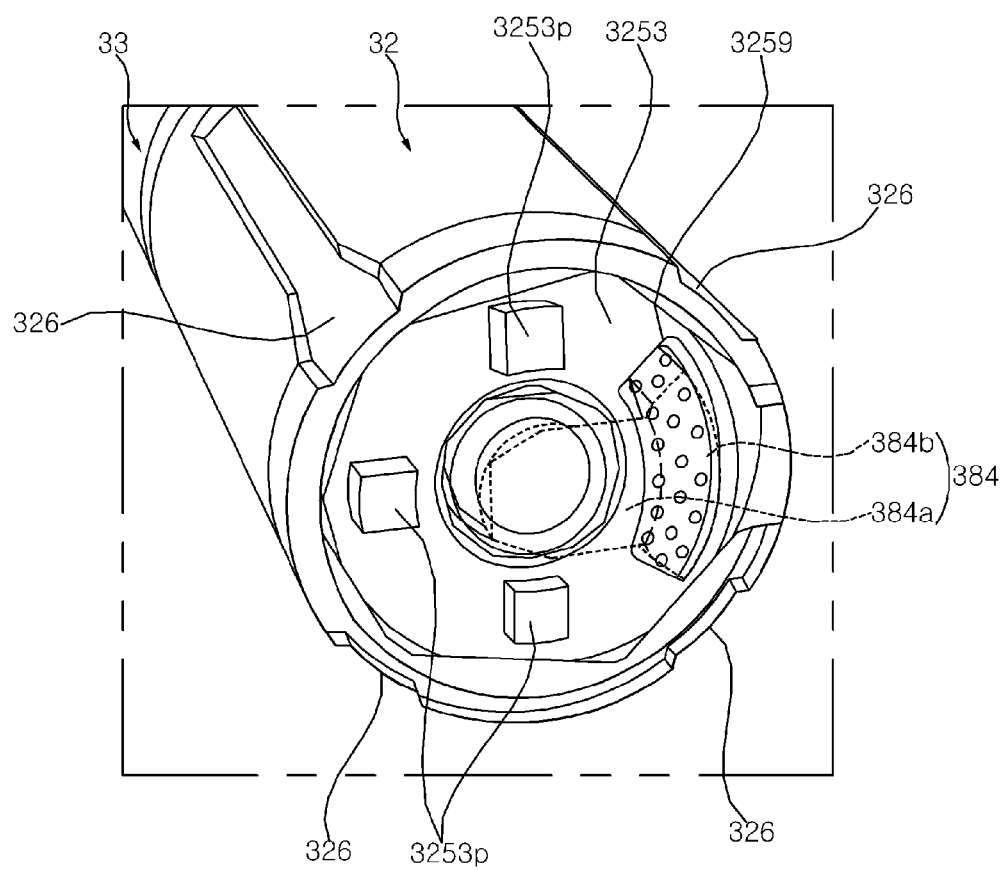

[Fig. 27]
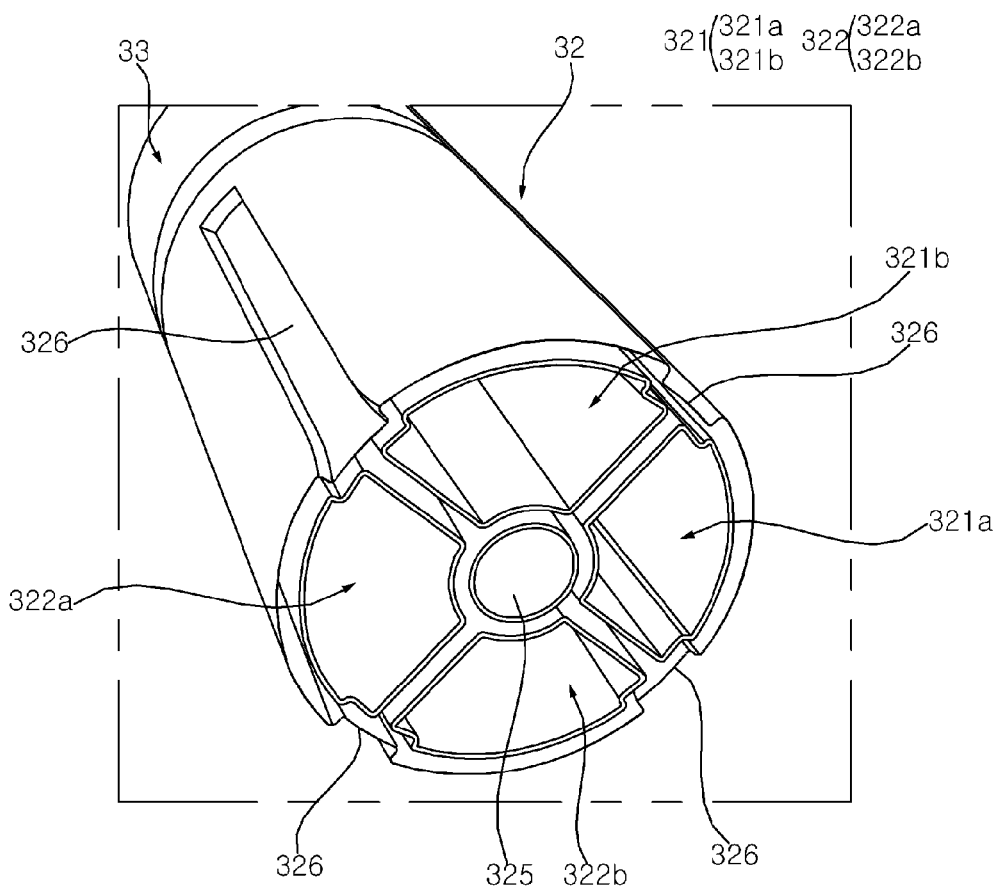

[Fig. 28]
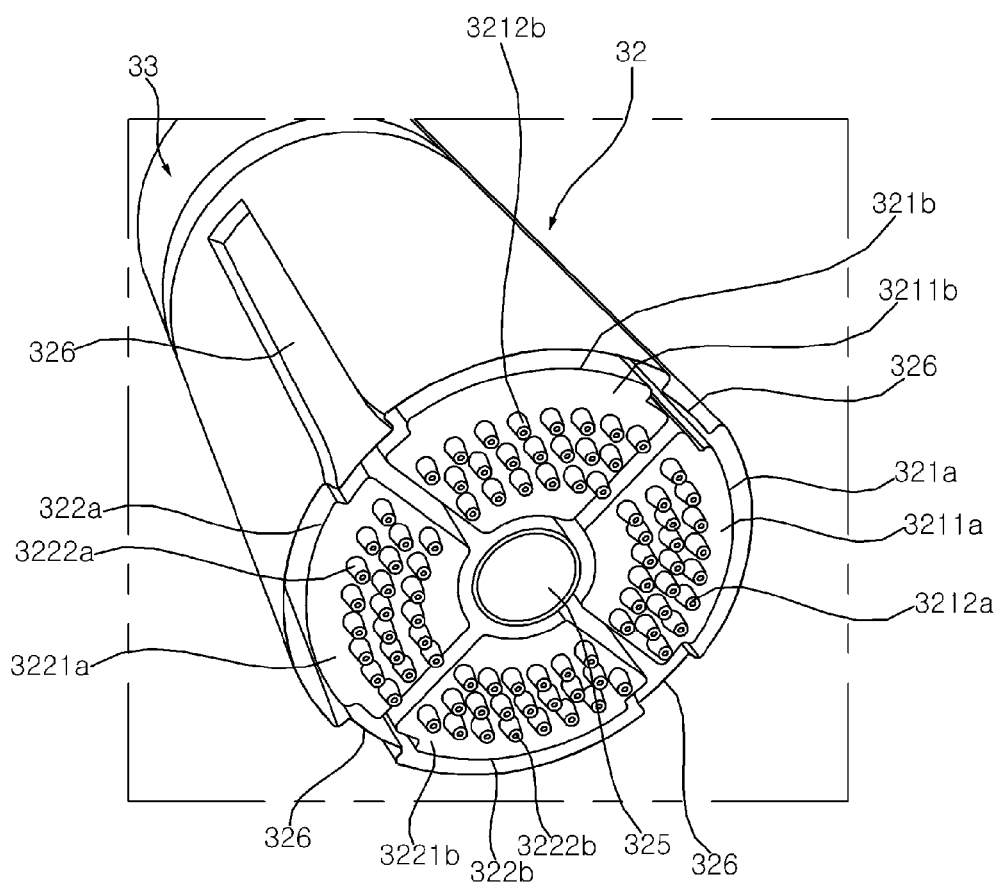

[Fig. 29]
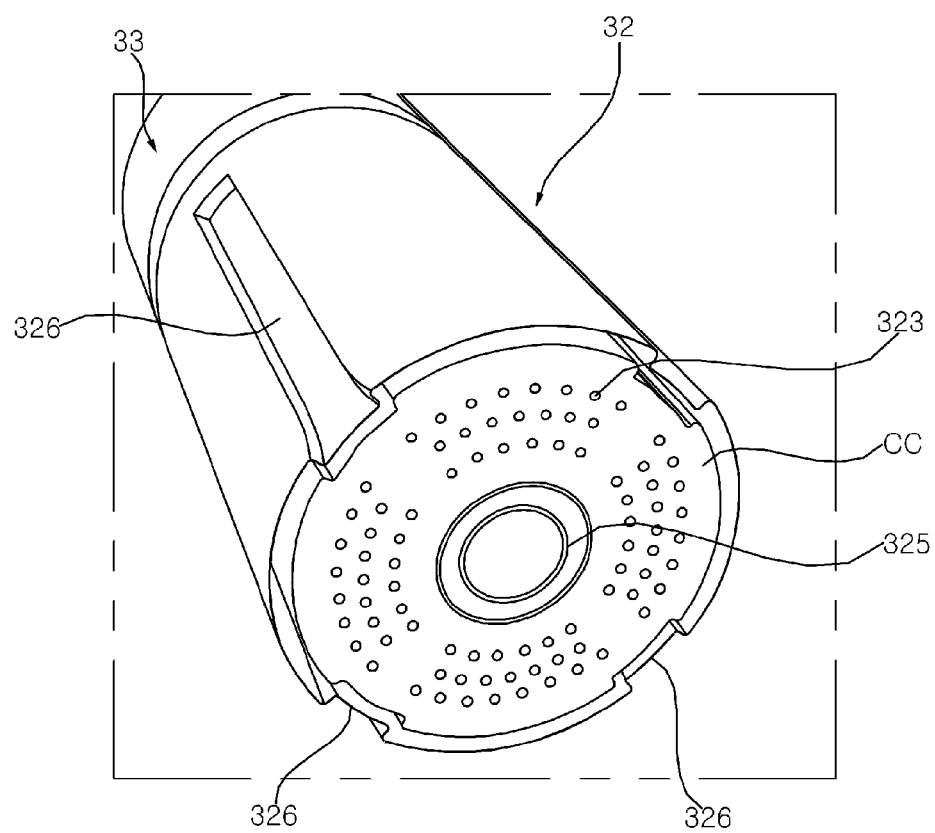

[Fig. 30]
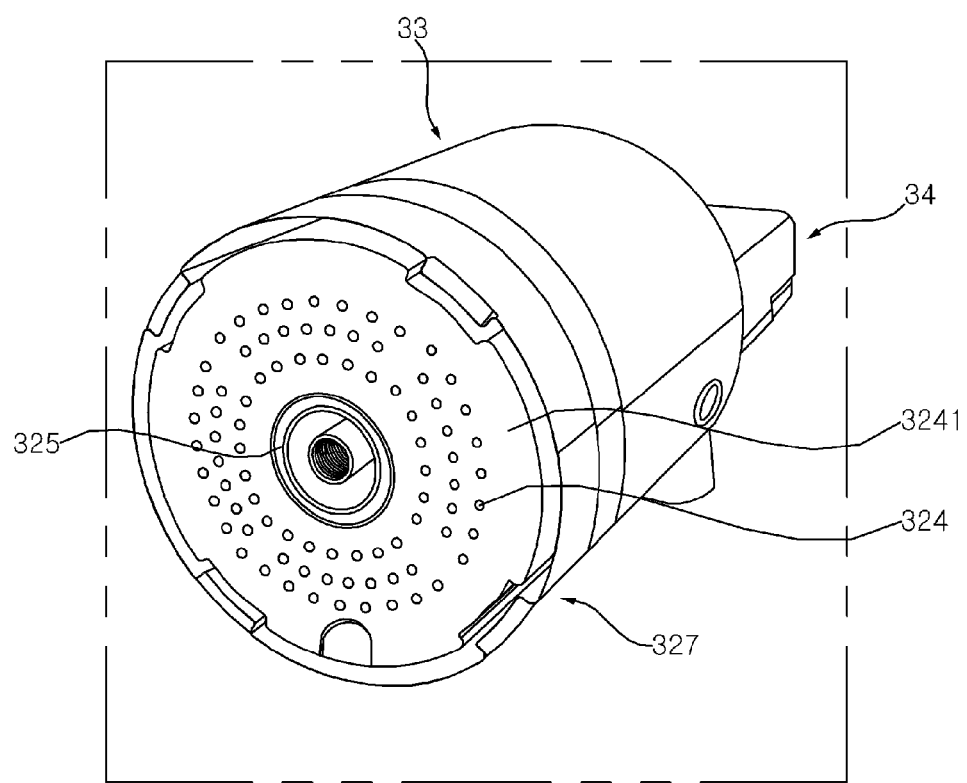

[Fig. 31]
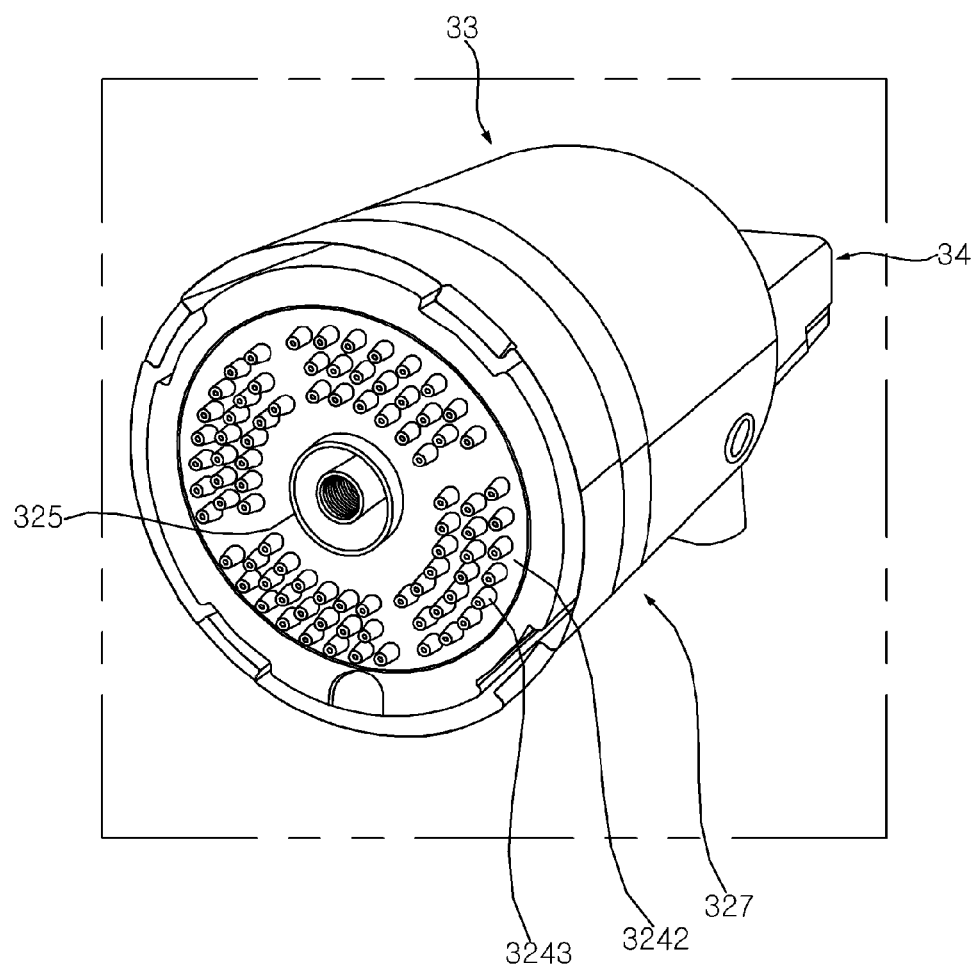

[Fig. 32]
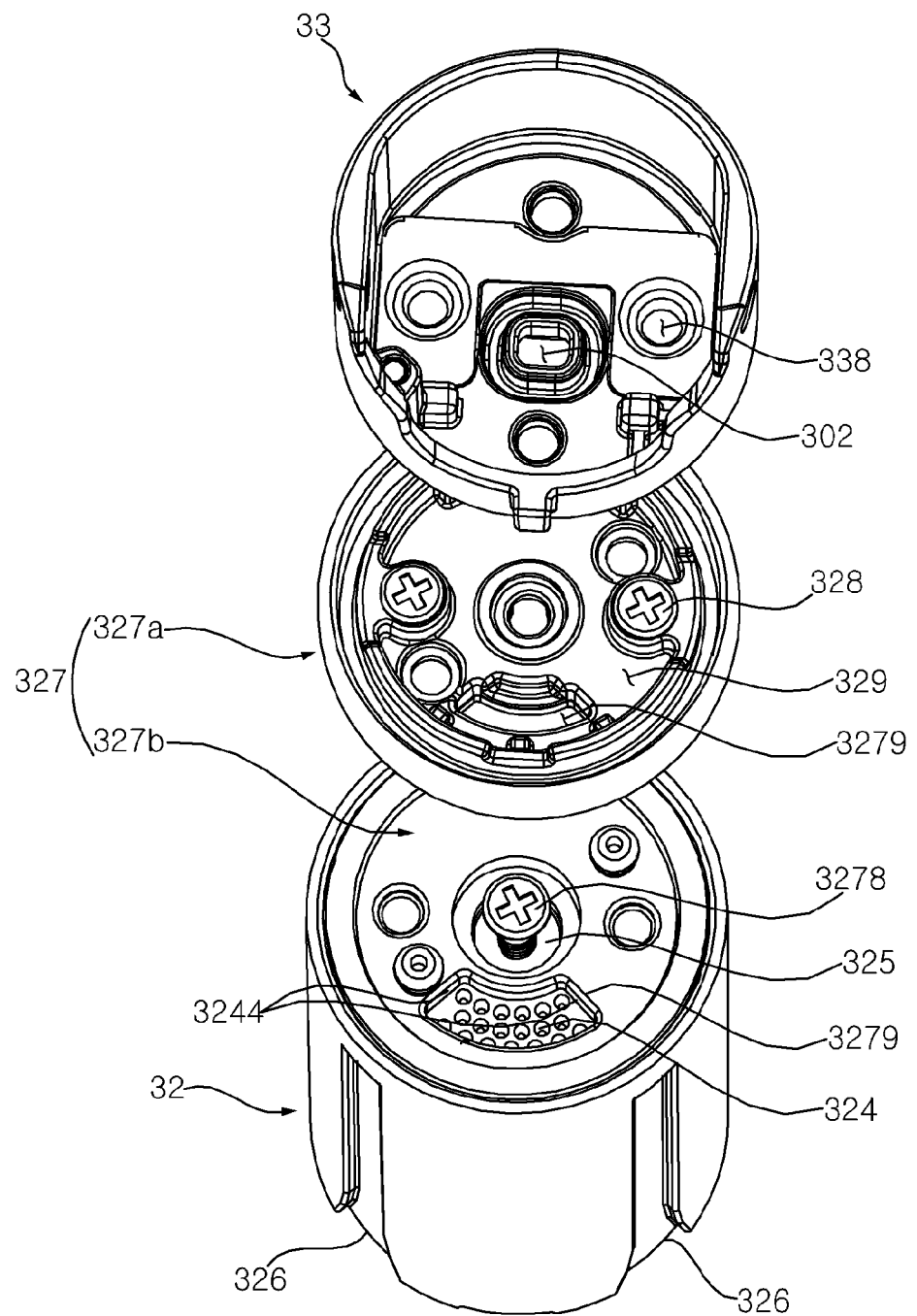

[Fig. 33]
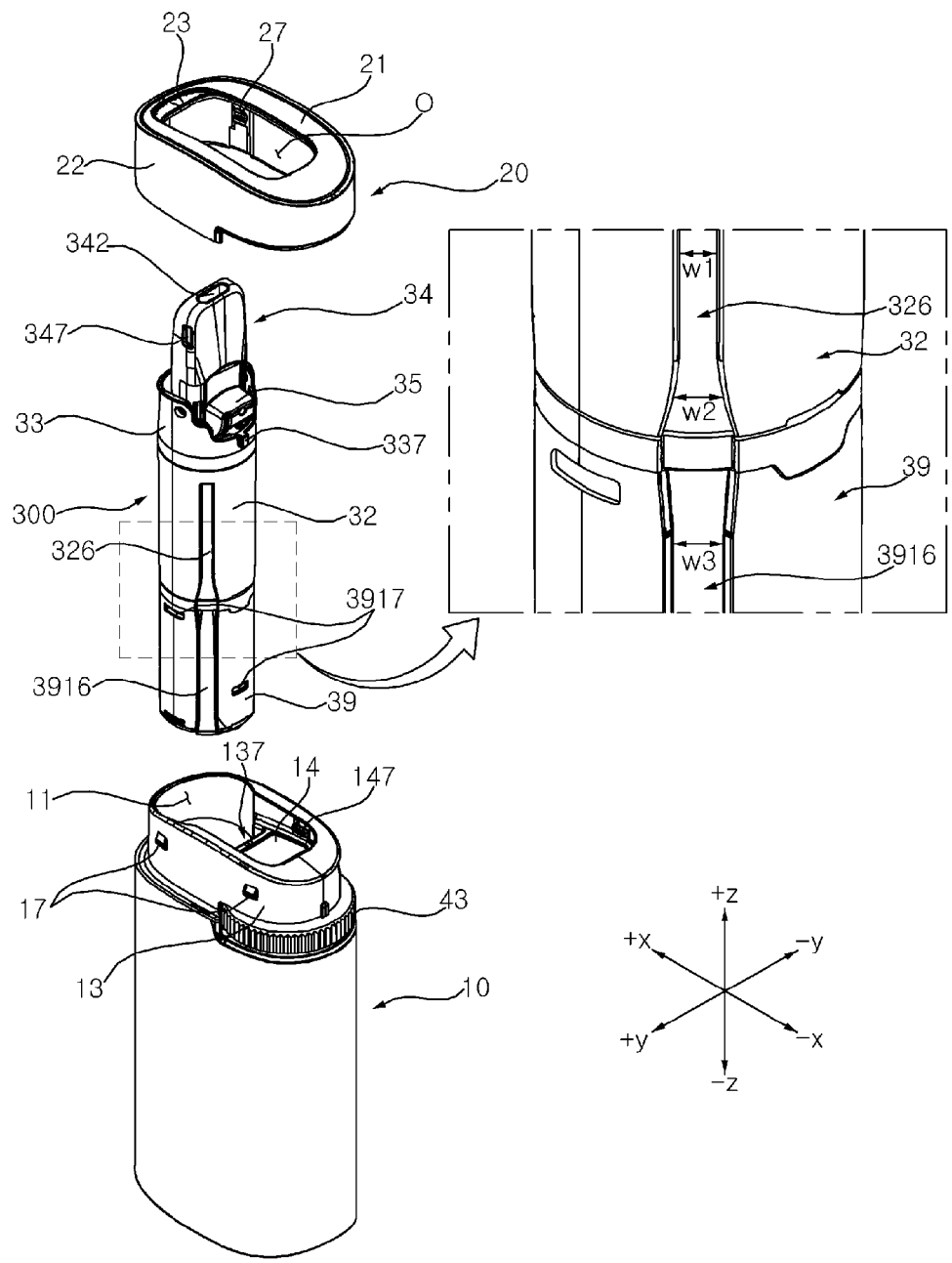

[Fig. 34]
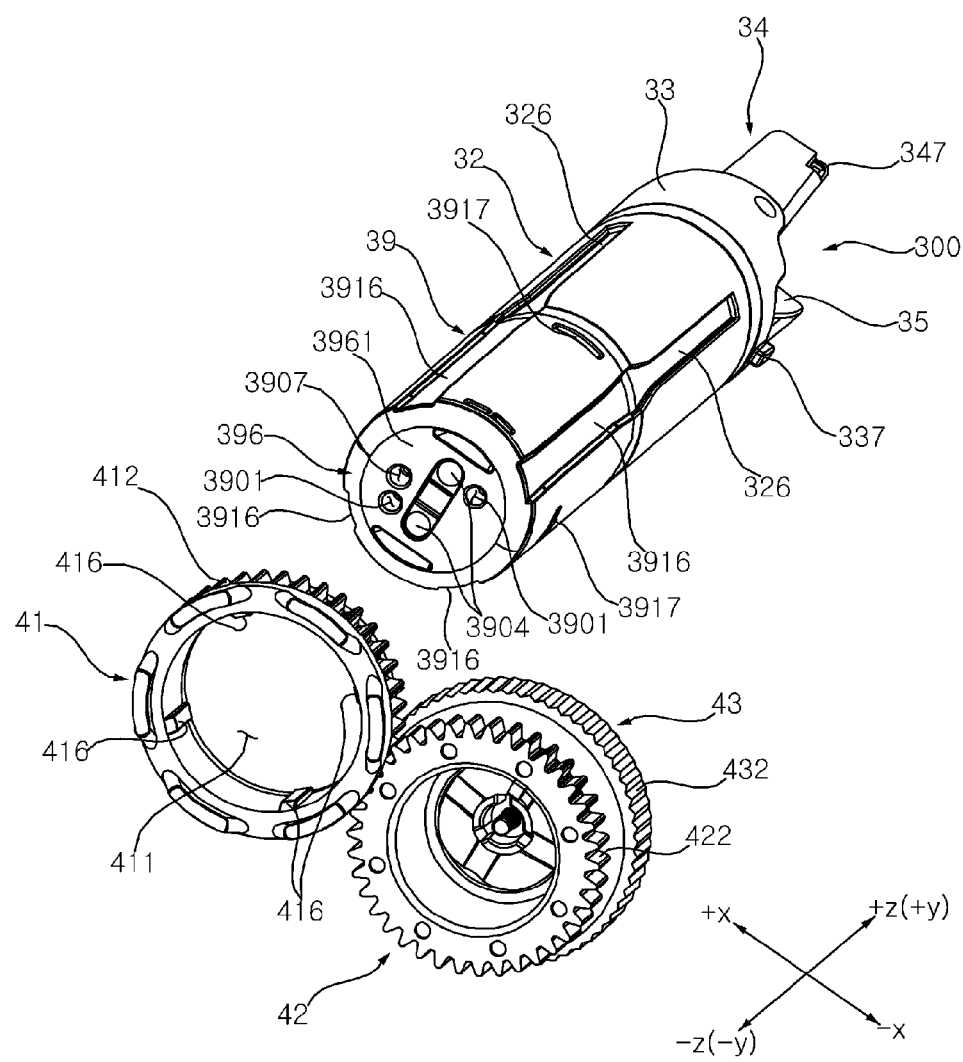

[Fig. 35]
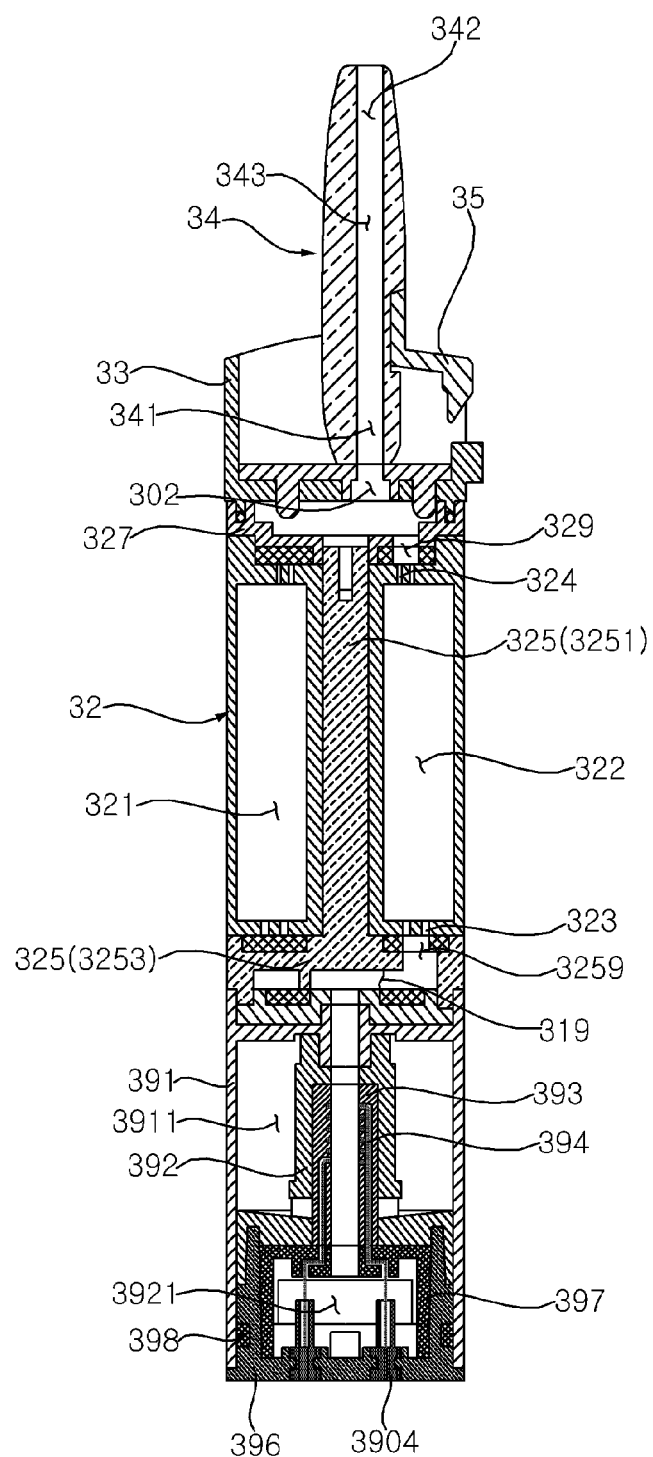

[Fig. 36]
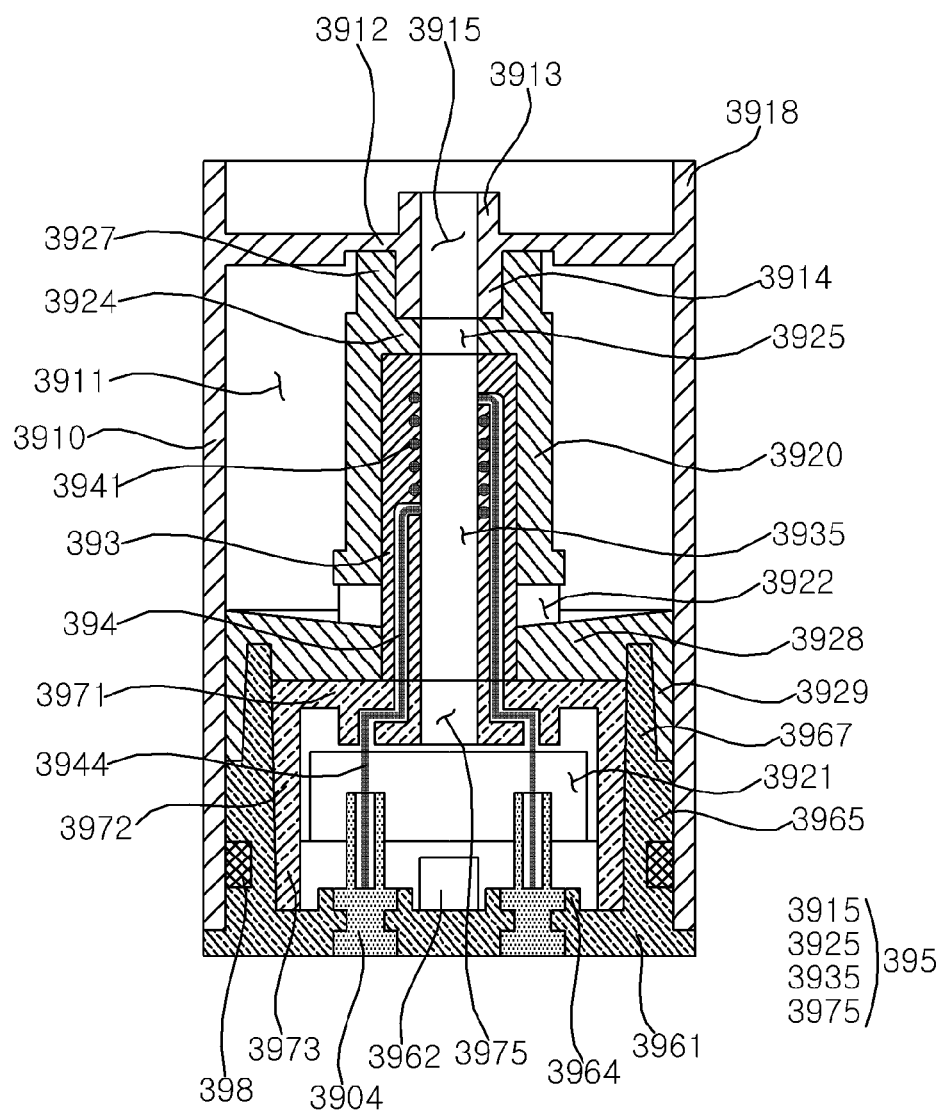

[Fig. 37]
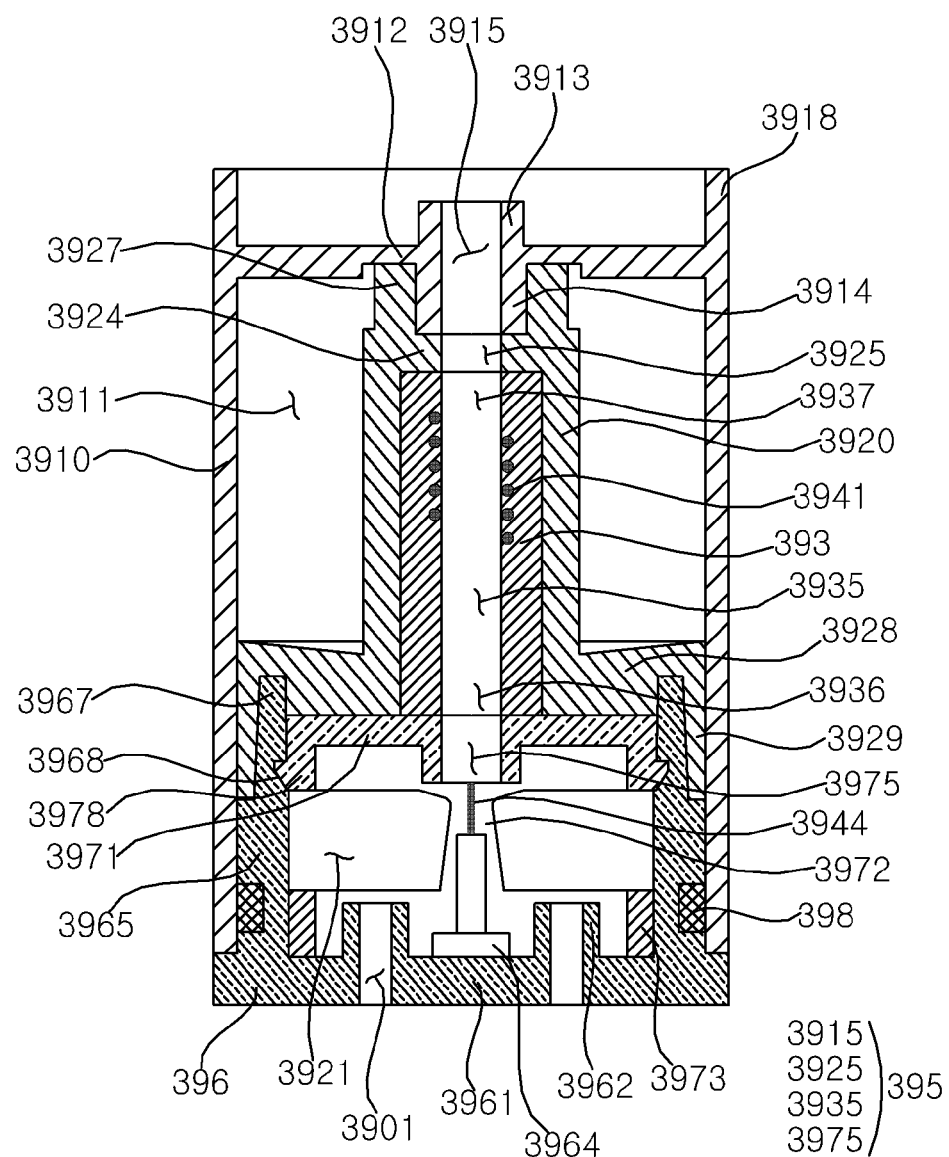

[Fig. 38]
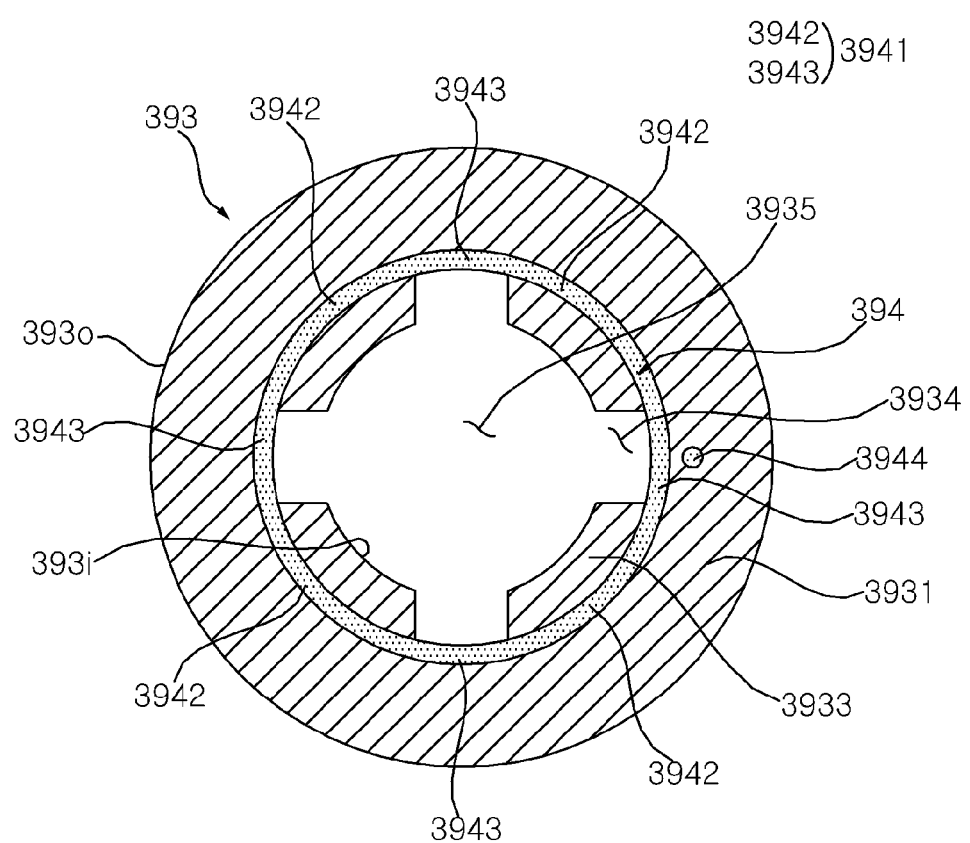

[Fig. 39]
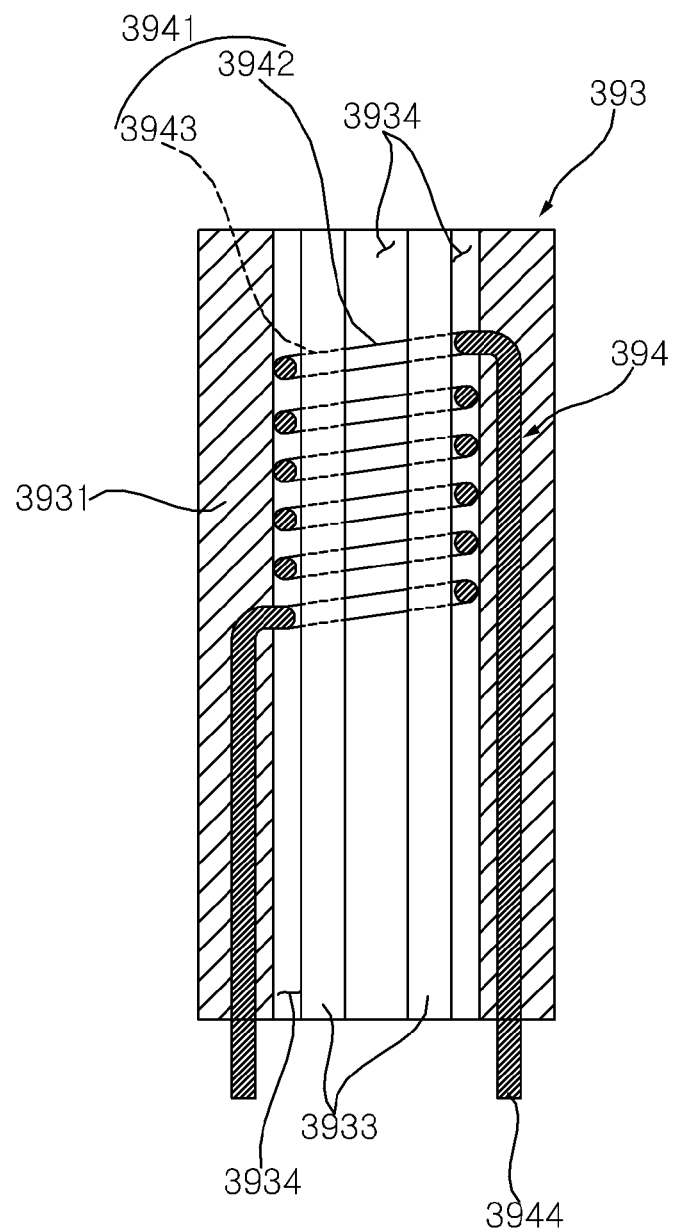

[Fig. 40]
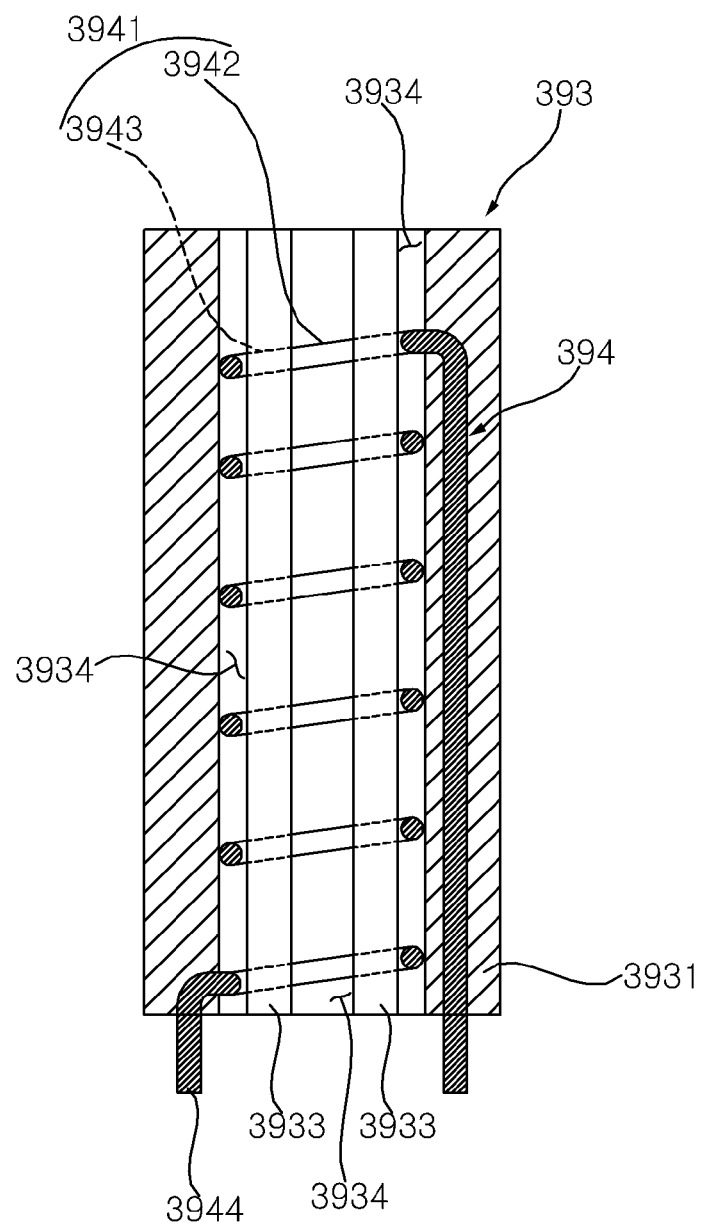

[Fig. 41]
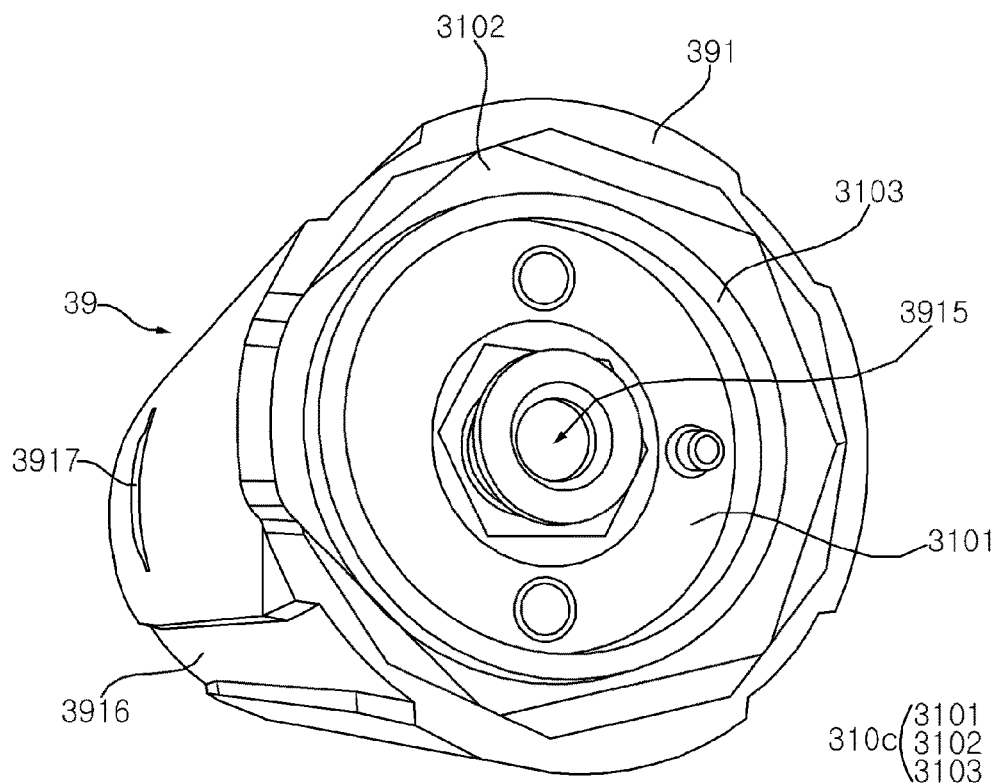
[Fig. 42]
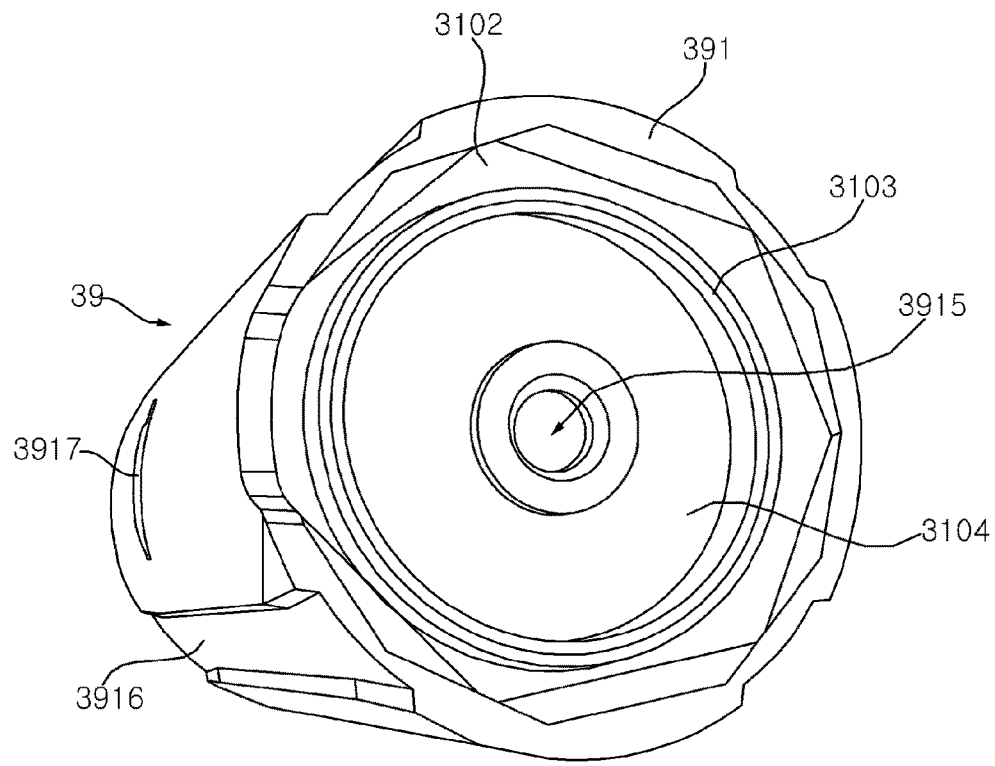

[Fig. 43]
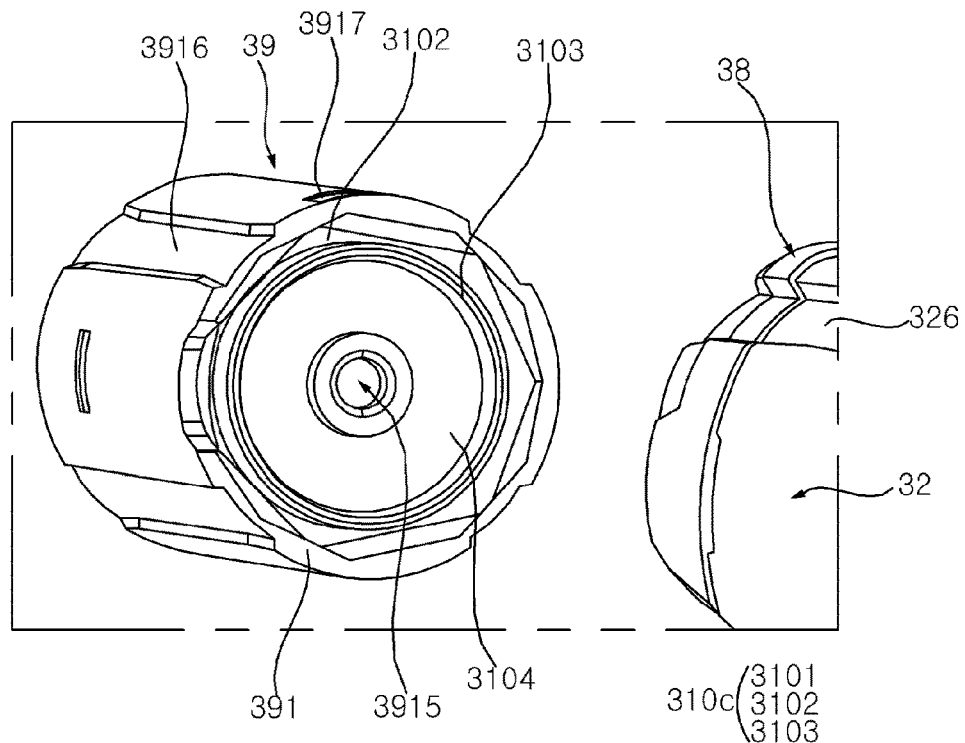
[Fig. 44]
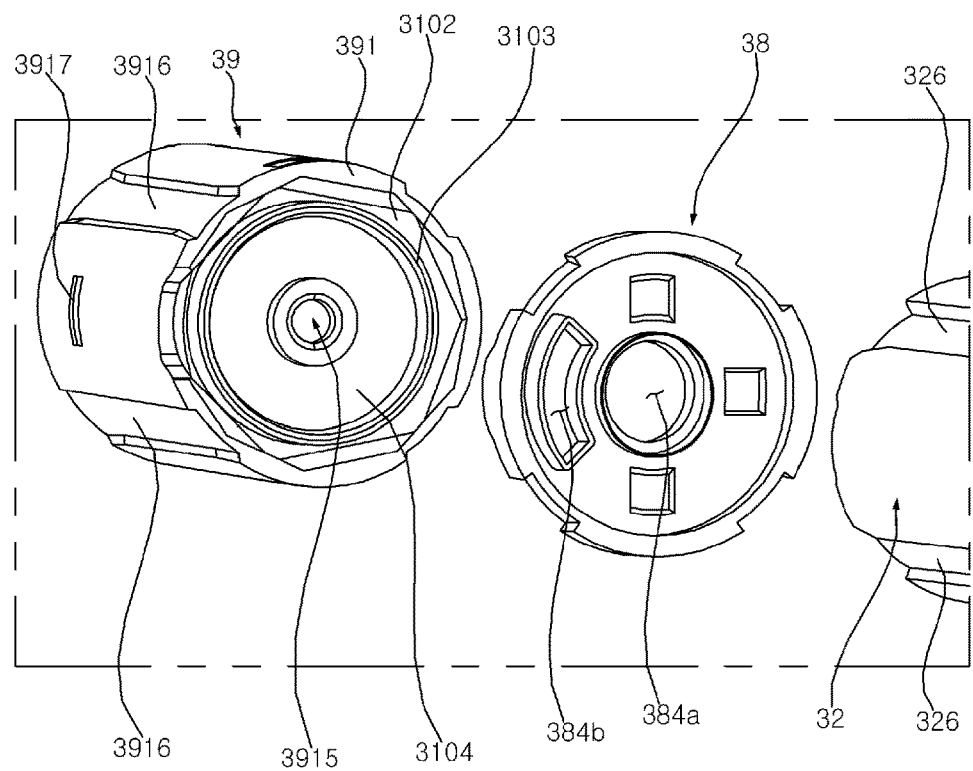

[Fig. 45]
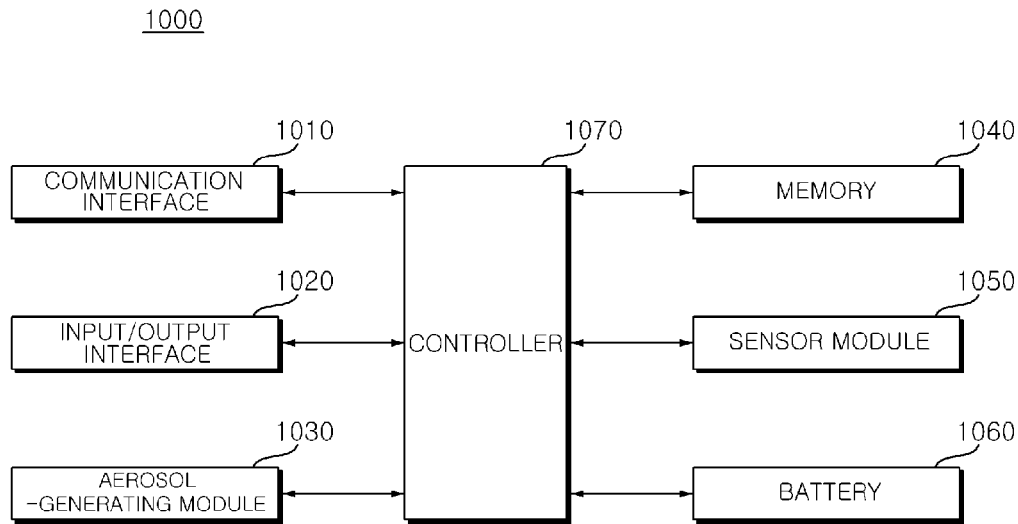
[Fig. 46]
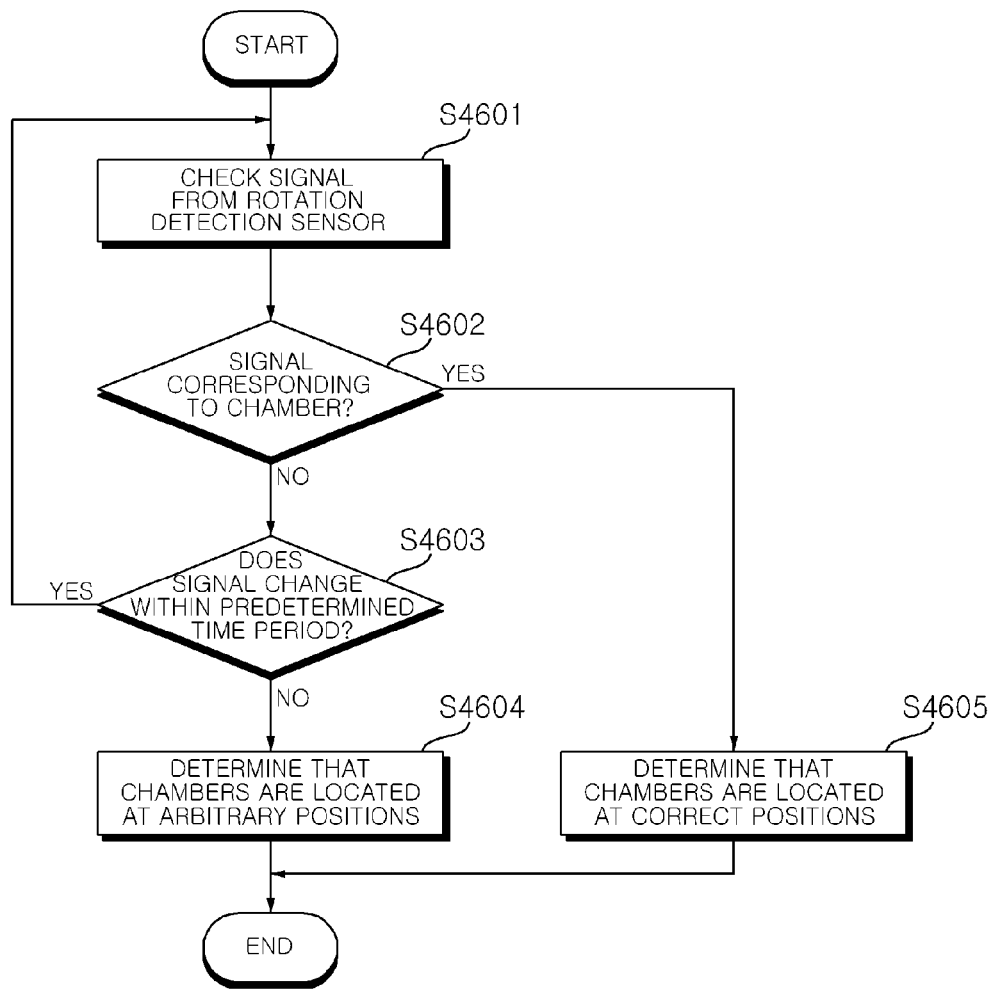

[Fig. 47]
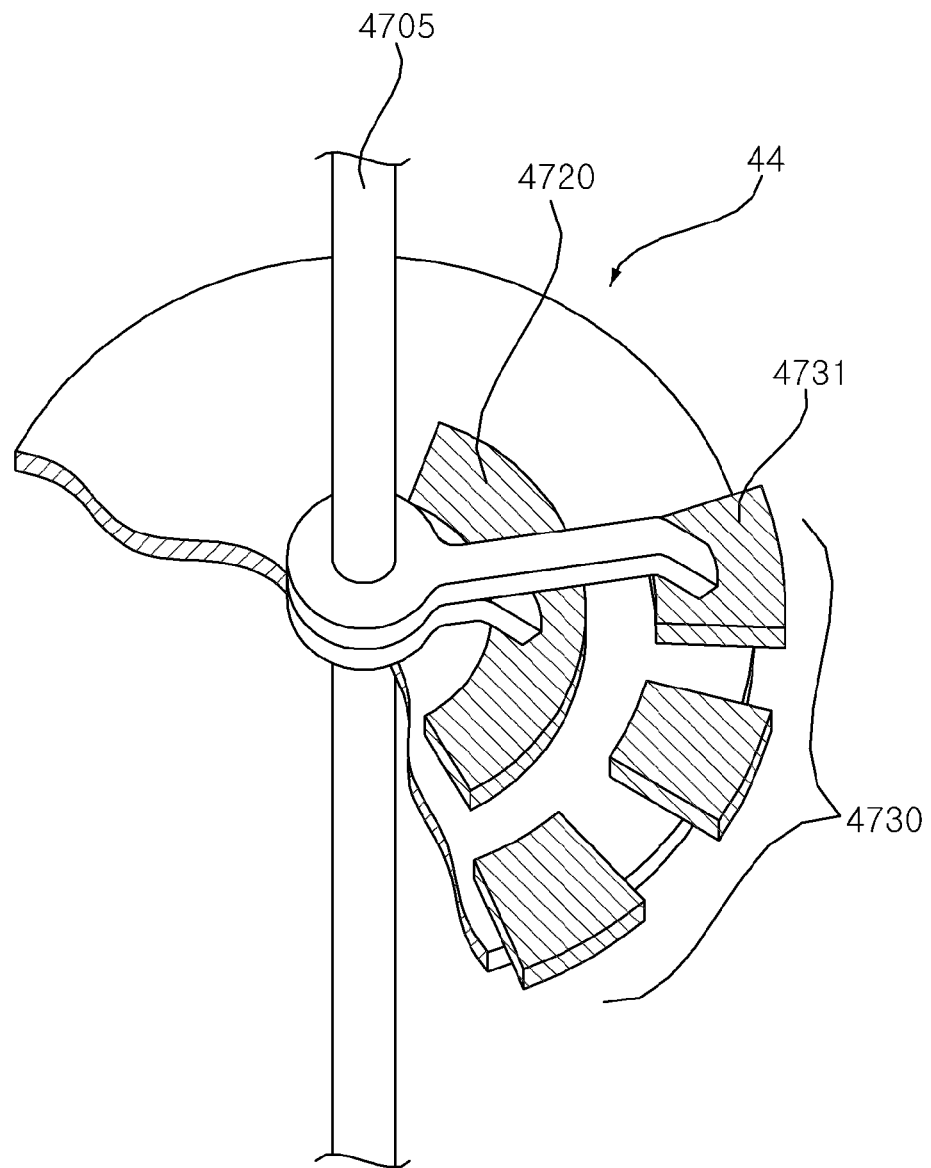

[Fig. 48]
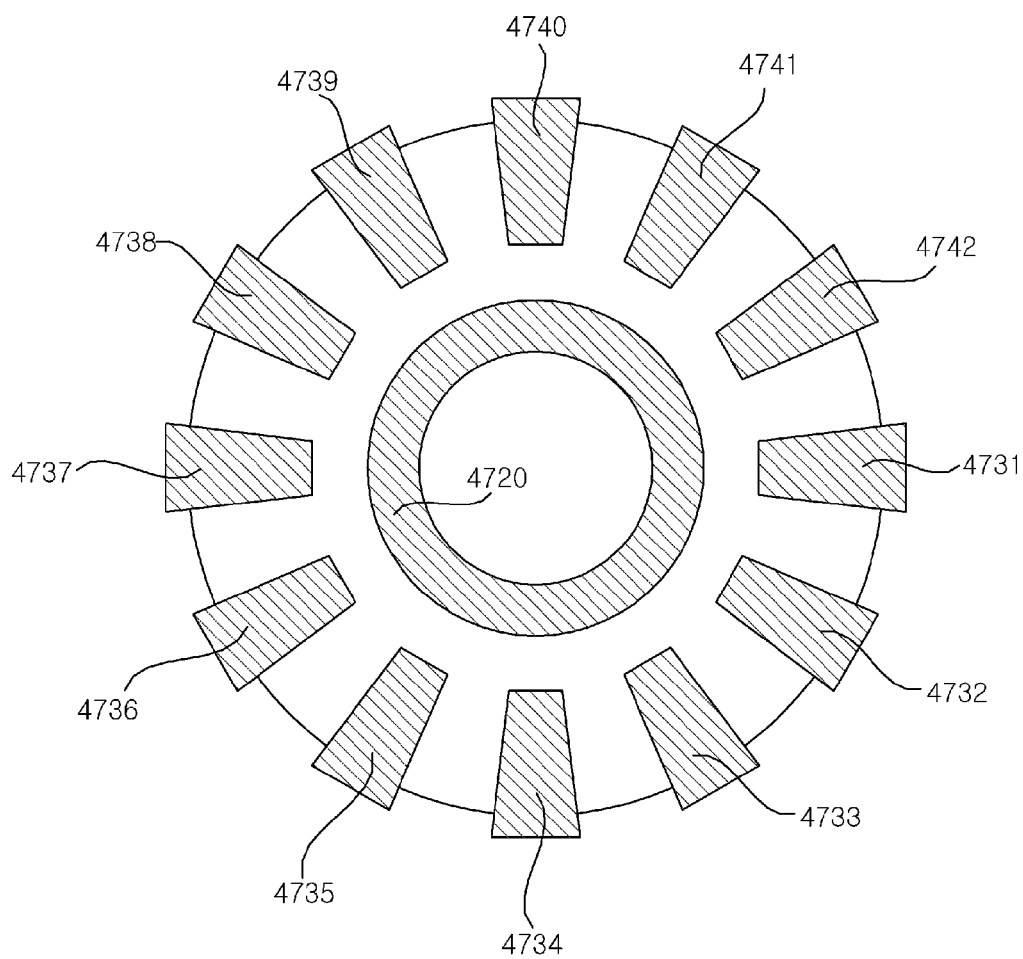

[Fig. 49]
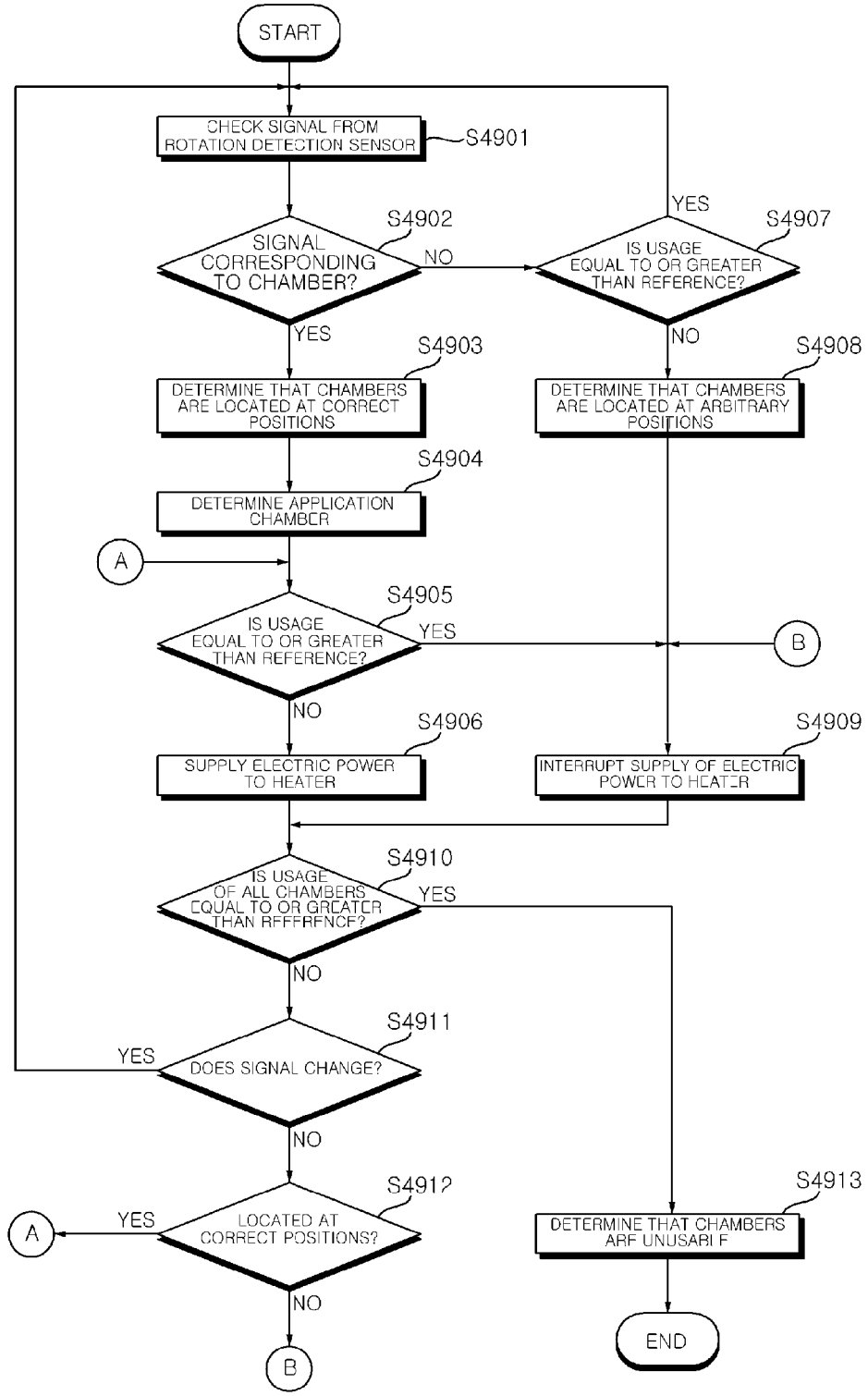

AEROSOL-GENERATING DEVICE

CROSS-REFERENCE TO RELATED APPLICATIONS

This application is the National Stage filing under 35 U.S.C. 371 of International Application No. PCT/KR2021/018935, filed on Dec. 14, 2021, which claims the benefit of earlier filing date and right of priority to Korean Application No. 10-2020-0180001, filed on Dec. 21, 2020, the contents of which are all hereby incorporated by reference herein their entirety.

TECHNICAL FIELD

The present disclosure relates to an aerosol-generating device.

BACKGROUND ART

An aerosol-generating device is a device that extracts certain components from a medium or a substance by forming an aerosol. The medium may contain a multicomponent substance. The substance contained in the medium may be a multicomponent flavoring substance. For example, the substance contained in the medium may include a nicotine component, an herbal component, and/or a coffee component. Recently, various research on aerosol-generating devices has been conducted.

DISCLOSURE OF INVENTION

Technical Problem

It is an object of the present disclosure to solve the above and other problems.

It is still another object of the present disclosure to provide an aerosol-generating device capable of providing a medium, optimal quality or which is maintained.

It is still another object of the present disclosure to provide an aerosol-generating device capable of providing various media to a user without the necessity to replace a cartridge.

It is yet another object of the present disclosure to provide an aerosol-generating device capable of enabling a user to select an appropriate medium in the state in which a cartridge is mounted in the device.

Solution to Problem

An aerosol-generating device according to various embodiments of the present disclosure for accomplishing the above and other objects may include a first container configured to accommodate an aerosol-generating substance, a heater configured to heat the aerosol-generating substance, a second container configured to be rotatable about a rotating shaft thereof and including a plurality of partitioned chambers, a first sensor configured to output a signal indicating rotation of the second container, and a controller configured to determine whether the plurality of chambers is located at preset correct positions based on a signal received from the first sensor.

Advantageous Effects of Invention

According to at least one of embodiments of the present disclosure, it is possible to provide a medium and of maintaining optimal quality thereof.

According to at least one of embodiments of the present disclosure, it is possible to provide various media to a user without the necessity to replace a cartridge.

According to at least one of embodiments of the present disclosure, a user is capable of selecting an appropriate medium in the state in which a cartridge is mounted to a main body.

Additional applications of the present disclosure will become apparent from the following detailed description. However, because various changes and modifications that fall within the spirit and scope of the present disclosure will be readily apparent to those skilled in the art, it should be understood that the detailed description and specific embodiments, including preferred embodiments of the present disclosure, are merely given by way of example.

BRIEF DESCRIPTION OF DRAWINGS

The above and other objects, features and other advantages of the present disclosure will be more clearly understood from the following detailed description taken in conjunction with the accompanying drawings, in which:

FIGS. 1 to 44 are views illustrating an aerosol-generating device according to an embodiment of the present disclosure;

FIG. 45 is a block diagram of an aerosol-generating device according to an embodiment of the present disclosure;

FIG. 46 is a flowchart showing an operation method of the aerosol-generating device according to an embodiment of the present disclosure;

FIGS. 47 and 48 are views for explaining the operation of the aerosol-generating device; and FIG. 49 is a flowchart showing an operation method of the aerosol-generating device according to another embodiment of the present disclosure.

BEST MODE FOR CARRYING OUT THE INVENTION

A description will now be given in detail according to exemplary embodiments disclosed herein, with reference to the accompanying drawings. For the sake of brevity of description with reference to the drawings, the same or equivalent components are denoted by the same reference numbers, and a description thereof will not be repeated.

In general, suffixes such as "module" and "unit" may be used to refer to elements or components. The use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to facilitate understanding of various technical features, and it should be understood that the embodiments presented herein are not limited by the accompanying drawings. As such, the present disclosure should be construed to extend to any alterations, equivalents and substitutes, in addition to those that are particularly set out in the accompanying drawings.

It is to be understood that, although the terms "first," "second," etc. may be used herein to describe various elements, these elements should not be limited by these terms. These terms are only used to distinguish one element from another.

It will be understood that when an element is referred to as being "connected with" another element, intervening elements may be present. In contrast, it will be understood that when an element is referred to as being "directly connected with" another element, there are no intervening elements present.

A singular representation may include a plural representation unless the context clearly indicates otherwise.

Hereinafter, directions of an aerosol-generating device are defined based on the orthogonal coordinate system shown in FIGS. 1 to 3, 5 and 6. In the orthogonal coordinate system, the x-axis direction may be defined as the rightward and leftward direction of the aerosol-generating device. Here, based on the origin, the +x-axis direction may mean the leftward direction, and the −x-axis direction may mean the rightward direction. Furthermore, the y-axis direction may be defined as the forward and backward direction of the aerosol-generating device. Here, based on the origin, the +y-axis direction may mean the forward direction, and the −y-axis direction may mean the backward direction. In addition, the z-axis direction may be defined as the upward and downward direction of the aerosol-generating device. Here, based on the origin, the +z-axis direction may mean the upward direction, and the −z-axis direction may mean the downward direction.

Referring to FIGS. 1 and 2, a housing 10 may be provided therein with a reception space 11, and may be open at one surface thereof. An upper case 20 may be mounted on the upper portion of the housing 10 (hereinafter, referred to as an upper housing 13). The upper case 20 may surround the upper housing 13. The upper case 20 may be perforated vertically so as to define an opening O therein. The opening O may communicate with the reception space 11. A cartridge 30 may be fitted into the reception space 11 defined in the housing 10. An aerosol may be generated in the cartridge 30, and may be discharged to the outside through the inside of the cartridge 30.

The opening O may be formed in the upper surface 21 of the upper case 20. The upper surface 21 of the upper case 20 may be disposed over the housing 10. The side surface 22 of the upper case 20 may extend along the circumference of the upper surface 21. A head cover 23 may be a portion of the upper surface 21 of the upper case 20. The head cover 23 may cover the upper portion of a container head 33.

A mounting groove 27 may be formed in the side surface of the upper case 20. The mounting groove 27 may be formed in the inner side of the side surface 22.

A mounting protrusion 17 may project outwards from the upper housing 13. The mounting protrusion 17 may project outwards from the side surface of the upper housing 13.

The mounting protrusion 27 may be fitted into the mounting groove 27. The mounting protrusion 17 and the mounting groove 27 may be formed at positions corresponding to each other. Each of the mounting protrusion 17 and the mounting groove 27 may include a plurality of mounting protrusions or grooves.

The cartridge 30 may be disposed in the reception space 11. The cartridge 30 may include a first container 31 and a second container 32. For example, the first container 31 may have therein a chamber configured to contain a liquid therein. The second container 32 may have therein a chamber configured to contain a medium.

The second container 32 may include a chamber configured to receive therein a medium. The second container 32 may be connected or coupled to the first container 31. The second container 32 may be disposed above the first container 31.

The second container 32 may be rotatably connected or coupled to the first container 31. The second container 32 may be disposed on the first container 31. The first container 31 and the second container 32 may have approximately the same diameter.

A first guide slit 316 may be formed in the outer circumferential surface of the first container 31. The first guide slit 316 may be depressed inwards from the outer circumferential surface of the first container 31. The first guide slit 316 may be formed so as to extend vertically. The first guide slit 316 may extend to the lower end from the upper end of the outer circumferential surface of the first container 31. Hereinafter, the first guide slit 316 may be referred to as a first guide rail 316.

The second guide slit 326 may be formed in the outer circumferential surface of the second container 32. The second guide slit 326 may be depressed inwards from the outer circumferential surface of the second container 32. The second guide slit 326 may be formed so as to extend vertically. The second guide slit 326 may extend to the lower end of the outer circumferential surface of the second container 32 from a predetermined vertical position thereof. Hereinafter, the second guide slit 326 may be referred to as a second guide rail 326.

When the second container 32 rotates to a predetermined position, the second guide slit 326 may be aligned with the first guide slit 316. At this position, the lower end of the second guide slit 326 may be connected to the upper end of the first guide slit 316.

The second guide slit 326 may include a portion that is increasingly wide downwards. The second guide slit 326 may be widest at the lower end of the second container 32. The width of the second guide slit 326 may increase upwards from the lower end of the second guide slit 326, and may be maintained at a certain value from a predetermined height. The lower end of the second guide slit 326 may be the same width as the width of the upper end of the first guide slit 316. The width of the first guide slit 316 may be greatest at the lower end and/or the upper end thereof.

The first guide slit 316 may include a plurality of first guide slits, which are arranged along the circumference of the first container 31. The second guide slit 326 may include a plurality of second guide slits, which are arranged along the circumference of the second container 32.

Each of the first and second guide slits 316 and 326 may be referred to as a guide rail, a guide channel or a guide groove.

A holding groove 317 may be formed in the outer circumferential surface of the first container 31. T holding groove 317 may be formed so as to be depressed inwards from the outer circumferential surface of the first container 31. The holding groove 317 may be formed at a position that is spaced apart from the first guide slit 316. The holding groove 317 may be formed at a location spaced outwards apart from the first guide slit 316. A holding protrusion 117, which is provided at a lower portion of the reception space 11, may be fitted into the holding groove 317 (see FIG. 3).

The holding groove 317 may extend in the circumferential direction of the cylinder 310. The holding groove 317 may have a length greater than the width thereof. The holding protrusion 117 may have a length and a width that correspond to those of the holding groove 317.

The holding groove 317 may include a plurality of holding grooves. The holding grooves 317 may include a first holding groove 317, which is positioned at a lower level, and a second holding groove 317, which is positioned at a higher level. The second holding groove 317 may be disposed closer to the second container 32 than is the first holding groove 317. The first holding groove 317 and the second holding groove 317 may be disposed at positions that are spaced apart from each other in a circumferential direction.

The first holding groove 317 may include a plurality of first holding grooves. The second holding groove 317 may include a plurality of second holding grooves.

Alternatively, the holding protrusion may be formed on the outer circumferential surface of the first container 31, and the holding groove may be formed in the lower portion of the reception space 11. The holding protrusion formed on the outer circumferential surface of the first container 31 may be fitted into the holding groove in the lower portion of the reception space 11.

Hereinafter, the holding groove or the holding protrusion 317 formed on the outer circumferential surface of the first container 31 may be referred to as a first rotation limiter 317, and the holding protrusion of the holding groove 117 formed in the lower portion of the reception space 11 may be referred to as a second rotation limiter 117.

The cartridge 30 may include the container head 33, which is positioned on the second container 32. The container head 33 may extend upwards from the outer circumferential surface of the second container 32. The container head 33 may be configured such that the upper portion thereof is open. The container head 33 may be open at a portion of the side surface portion thereof. The container head 33 may be configured such that the upper surface portion and the side surface portion thereof are continuously opened so as to form an "L"-shaped opening.

A fitting protrusion 337 may be formed in the outer surface of the container head 33. The fitting protrusion 337 may project from the outer surface of the container head 33. The fitting protrusion 337 may project outwards from one side surface of the container head 33. The fitting protrusion 337 may be fitted into a fitting groove 137 formed in the upper portion of the reception space 11 (see FIG. 5).

The cartridge 30 may include a mouthpiece 34, which is pivotably connected or coupled to the container head 33. The mouthpiece 34 may have formed therein a suction passage 343 (see FIG. 3). The suction passage 343 may communicate both with a second inlet 341 and with a second outlet 342 (see FIG. 5). For convenience of explanation, the suction passage 343 may be referred to as a passage 343 or a second passage 343.

The mouthpiece 34 may be exposed to the outside from the open portion of the container head 33. When the mouthpiece 34 is inserted into the reception space 11, the mouthpiece 34 may be exposed to the outside through the opening O in the upper case 20. The mouthpiece 34 may have a shape corresponding to the opening O. The mouthpiece 34 may be pivotable in the opening O.

A sealing cap 35 may project outwards from the mouthpiece 34. The sealing cap 35 may be coupled to one side of the mouthpiece 34. The sealing cap 35 may be oriented so as to project in the direction in which the mouthpiece 34 is pivoted.

A seating portion 14 may be formed in the upper housing 13. The seating portion 14 may be depressed downwards from the upper housing 13. The seating portion 14 may have a shape corresponding to the mouthpiece 34. When the mouthpiece 34 is pivoted to a certain position while the cartridge 30 is disposed in the reception space 11, the mouthpiece 34 may be seated and received in the seating portion 14.

A holding groove 347 may be formed so as to be depressed inwards from the side surface of the mouthpiece 34. A holding protrusion 147 may project inwards from the side surface of the seating portion 14. The holding protrusion 147 may be removably fitted into the holding groove 347. When the mouthpiece 34 is pivoted and seated in the seating portion 14, the holding protrusion 147 may be fitted into the holding groove 347 such that the mouthpiece 34 is held in the seated position. When the mouthpiece 34 is pivoted in the opposite direction, the holding protrusion 147 may be disengaged from the holding groove 347 such that the mouthpiece 34 becomes separable from the seating portion 14.

A dial 43 may be rotatably disposed in the housing 10. At least a portion of the dial 43 may be exposed to the outside from the housing 10. The dial 43 may be disposed adjacent to the upper housing 13. The dial 43 may be rotated in order to rotate the second container 32.

Referring to FIG. 3, the cartridge 30 may be inserted vertically in the reception space 11 (see FIG. 2) in the housing 10. A battery 50 may be received in the housing 10 so as to be disposed parallel to the reception space 11. A gear assembly 40 may be received in the housing 10 so as to be disposed over the battery 50. The seating portion 14 may be oriented parallel to the reception space 11. The seating portion 14 may be disposed over the battery 50.

The first container 31 may include therein a liquid chamber 311 and an evaporation chamber 312. A prevaporized aerosol material may be received in the liquid chamber 311. The prevaporized aerosol material may be liquid. A wick 313 may be disposed in the evaporation chamber 312. The wick 313 may be formed so as to extend in a forward and backward direction. A heater 314 may be disposed in the evaporation chamber 312. The heater 314 may be disposed around the wick 313 so as to heat the wick 313. The heater 314 may be configured so as to have the form of a coil surrounding the wick 313.

The prevaporized aerosol material may be absorbed into the wick 313 from the liquid chamber 311, and may then be introduced into the evaporation chamber 312. The heater 314 may heat the wick 313 to thereby evaporate the prevaporized aerosol material absorbed in the wick 313 and thus generate an aerosol.

An evaporation passage 318 may communicate with the evaporation chamber 312. The evaporation passage 318 may be formed above the evaporation chamber 312. The evaporation passage 318 may be positioned over the wick 313 and the heater 314. The evaporation passage 318 may be oriented in the longitudinal direction of a container shaft 325, which is disposed vertically. The evaporation passage 318 may be positioned in a line extending from the container shaft 325.

The second container 32 may include a plurality of chambers 321 and 322, which are isolated from each other. The plurality of chambers 321 and 322 may be respectively referred to as a first granulation chamber 321 and a second granulation chamber 322. Hereinafter, although only the first and second granulation chambers 321 and 322 will be described for convenience of explanation, the second container 32 may include a plurality of chambers 321, 322, . . . , which are isolated from each other, without limiting the number thereof. For example, the plurality of chambers 321, 322, . . . may include four chambers.

The second container 32 may be rotated about the container shaft 325, which is oriented vertically. The container shaft 325 may be positioned in the center of the second container 32. The container shaft 325 may be oriented vertically. The container shaft 325 may rotatably support the second container 32. The second container 32 may be rotated about the container shaft 325.

The container shaft 325 may include a rotating shaft 3251, which extends vertically. The container shaft 325 may include a first disc 3253, which is disposed above the first container 31. The rotating shaft 3251 and the first disc 3253 may be connected to each other. The rotating shaft 3151 and the first disc 3253 may be integrally formed with each other. The first disc 3253 may be referred to as a first flange 3253.

The container shaft 325 may be coupled or bonded to the first container 31. The container 325 may be fixed to the first container 31. The first disc 3253 may be disposed above the first container 31. The first disc 3253 may be coupled or bonded to the first container 31. The first disc 3253 may be fixed to the first container 31.

A first disc hole 3259 may be formed in the first disc 3253. The first disc hole 3259 may be connected to or communicate with a first connecting passage 319. The first disc hole 3259 may communicate with a lower chamber hole 323 depending on the rotational position of the second container 32.

The rotating shaft 3251 may be disposed in the second container 32. The rotating shaft 3251 may be disposed between the plurality of chambers 321 and 322. The rotating shaft 3251 may be disposed in the center of the second container 32. The second container 32 may be rotated about the rotating shaft 3251.

The rotating shaft 3251 may extend vertically. The rotating shaft 3251 may project upwards from the first disc 3253.

A second disc 327 may be disposed at the upper portion of the second container 32. The second disc 327 may cover the upper portion of the second container 32. The second disc 327 may be disposed above the plurality of chambers 321 and 322. The second disc 327 may be referred to as a second flange 327.

The second disc 327 may be coupled to the container shaft 325. The second disc 327 may be coupled to the rotating shaft 3251. The second disc 327 may be fixed to the rotating shaft 3251.

The second disc 327 may be coupled or bonded to the container head 33. The second disc 327 may be fixed to the container head 33.

The first container 31 and the container head 33 may be connected to each other via the container shaft 325. The first container 31 and the container head 33 may be held in rotational position relative to each other. The first container 31, the container head 33, and the container shaft 325 may be fixed to one another.

The second container 32 may be rotated about the container shaft 325. The second container 32 may be rotatable relative to the first container 31. The second container 32 may be rotatable relative to the container head 33.

The plurality of chambers 321 and 322 may be arranged in the rotational direction of the second container 32. The medium may be received in the plurality of chambers 321 and 322. The container shaft 325 may be referred to as a rotating shaft of the second container 32.

A lower chamber hole 323 may be formed in the lower portion of the first granulation chamber 321. The lower chamber hole 323 may be formed in the lower 5 portion of the second granulation chamber 322. An upper chamber hole 324 may be formed in the upper portion of the first granulation chamber 321. The upper chamber hole 324 may be formed in the upper portion of the second granulation chamber 322.

The first container 31 and the second container 32 may be connected to each other via a first connecting passage 319. The first connecting passage 319 may be positioned between the first container 31 and the second container 32. The first connecting passage 319 may be positioned over the evaporation passage 318 so as to communicate with the evaporation passage 318.

The first connecting passage 319 may be connected to one of the plurality of chambers 321 and 322 in the second container 32. The first connecting passage 319 may be selectively connected to one of the plurality of chambers 321 and 322 in the second container 32. When the second container 32 is rotated, the first connecting passage 319 may be connected to one of the plurality of chambers 321 and 322 in the second container 32. The first connecting passage 319 may be connected to the lower chamber hole 323 formed in the lower portion of the first granulation chamber 321. The first connecting passage 319 may be connected to the lower chamber hole 323 formed in the lower portion of the second granulation chamber 322.

Among the plurality of chambers, the remaining chamber or chambers (hereinafter, referred to as a remaining chamber), which is not connected to the first connecting passage 319, may be hermetically closed so as to prevent the entry of external air. The chamber holes in the remaining chamber may be closed.

A first inlet 301 (see FIG. 4) may be formed in the lower portion of the first container 31, and a first outlet 302 may be formed in the upper portion of the second container 32. The first inlet 310 may communicate with the evaporation chamber 312. The evaporation chamber 312 may be positioned over the first inlet 301. The first outlet 302 may communicate with the upper chamber hole 324. The first outlet 302 may be positioned over the upper chamber hole 324. A second connecting passage 329 (see FIG. 5) may be connected to the first outlet 302 and the upper chamber hole 324. The second connecting passage 329 may be positioned between the first outlet 302 and the upper chamber hole 324. The first outlet 302 may face the second inlet 341 so as to communicate with the suction passage 343. A user may inhale air through the mouthpiece 34. Air may be discharged upwards through the first outlet 302. The passage formed in the cartridge 30 may be referred to as a first passage or a cartridge passage. The first passage may communicate with the first inlet 301 and the first outlet 302. The air that is introduced through the first inlet 301 may be discharged from the first outlet 302 through the first passage. The first passage may be formed by connecting one of the plurality of chambers in the second container 32 to the passage formed in the first container 31.

When the cartridge 30 is inserted into the reception space 11, the head cover 23 of the upper case 20 may be disposed over the container head 33. The head cover 23 may cover the upper portion of the container head 33.

Consequently, it is possible to prevent the cartridge 30 from escaping outwards from the reception space 11.

The holding protrusion 117 may be disposed at the lower portion of the reception space 11, and may project toward the inside of the reception space 11. When the cartridge 30 is inserted into the reception space 11, the holding protrusion 117 may be fitted into the holding groove 317 (see FIG. 2).

Consequently, when the second container 32 is rotated in the reception space 11, the first container may be held in place without being rotated together with the second container 32.

The fitting groove 137 may be formed in the upper side of the reception space 11. When the cartridge 30 is inserted into the reception space 11, the fitting protrusion 337 may be fitted into the fitting groove 137 (see FIG. 5).

Accordingly, when the cartridge 30 is inserted into the reception space 11, a user is able to dispose the cartridge 30 at the correct position.

Consequently, when the second container 32 is rotated in the reception space 11, the container head 33 may be held in place without being rotated together with the second container 32.

The gear assembly 40 may rotate the second container 32. The gear assembly 40 may be mounted in the housing 10. The gear assembly 40 may include at least one of a cartridge gear 41, a dial gear 42, and the dial 43.

The dial gear 42 may be mounted in the housing 10. The dial gear 42 may include a rotating shaft, which is parallel to the rotating shaft of the second container 32. The rotating shaft of the dial gear 42 and/or the rotating shaft of the dial 43 may be referred to as a dial shaft 45. The dial shaft 45 of the dial gear 42 may be oriented parallel to the container shaft 325. The dial gear 42 may be disposed over the battery 50. The dial gear 42 may be disposed adjacent to the side surface of the cartridge 30. The dial gear 42 may be disposed adjacent to the side surface of the second container 32.

The dial gear 42 may be rotated by rotating the dial 43. The dial gear 42 may be rotated by receiving power from a motor (not shown).

The dial gear 42 may be rotated while being engaged with the second container 32. The dial gear 42 may be rotated while being directly engaged with the outer circumferential surface of the second container 32.

The cartridge gear 41 may be rotatably mounted in the housing 10. The cartridge gear 41 may be positioned coaxially with the second container 32.

The cartridge gear 41 may be configured to have the form of a ring, the inner circumferential surface of which defines therein a space. The inner circumferential surface of the cartridge 41 may be configured to surround the reception space 11. The inner circumferential surface of the cartridge gear 41 may be engaged with the outer 5 circumferential surface of the second container 32 so as to rotate therewith. The dial gear 42 may be engaged with the outer circumferential surface of the cartridge gear 41 so as to rotate therewith.

The dial 43 may be mounted in the housing 10. At least a portion of the dial 43 may be exposed to the outside from the housing 10. The dial 43 may be positioned coaxially with the dial gear 42. The dial 43 may be rotated together with the dial gear 42 about the dial shaft 45. The dial shaft 45 may be disposed parallel to the container shaft 325.

Consequently, a user is able to rotate the second container 32 by rotating the dial 43 at the outside of the housing 10.

The dial 43 may be mounted to the upper housing 13. The dial 43 may be mounted over the battery 50.

Consequently, a user is able to conveniently rotate the dial 43 while gripping the aerosol-generating device.

A rotary switch 44 may be mounted coaxially with the dial gear 42 and/or the dial 43. The rotary switch 44 may be disposed over the battery 50. The rotary switch 44 may detect the rotational position of the dial gear 42 and/or the dial 43 and may thus detect the position of the second container 32.

A controller 70 may determine with which of the plurality of granulation chambers the first connecting passage 319 and the first outlet 302 communicate using the rotary switch 44.

The battery 50 may be disposed at the side surface of the reception space 11. The battery 50 may be disposed parallel to the reception space 11 and/or the cartridge 30. The battery 50 may be disposed adjacent to the dial gear 42 and the reception space 11 in the longitudinal direction of the rotating shaft of the dial gear 42.

Accordingly, even when the volume of the battery 50 is increased in order to increase the capacity of the battery 50, the aerosol-generating device may have a compact structure suitable for being held in a user's hand without unnecessarily increasing the length thereof.

Consequently, it is possible to ensure spaces for accommodating therein the gear assembly 40, the seating portion 14, a flow sensor 60, a vibration motor and the like above and below the battery 50.

The flow sensor 60 may be disposed under the battery 50. The flow sensor 60 may be disposed so as to face the side surface of the lower portion of the reception space 11. A sensing hole 61 may be formed between the flow sensor 60 and the reception space 11. The flow sensor 60 may detect the flow of the air that is introduced into the cartridge 30 through the first inlet 301.

The seating portion 14 may be formed in the upper housing 13 over the battery 50. The seating portion 14 may be positioned above the dial gear 42 and the dial 43. The seating portion 14 may be positioned over the dial gear 42 and/or the dial 43 in the longitudinal direction of the rotating shaft of the dial gear 42.

A socket 80 may be mounted on one surface of the housing 10. The socket 80 may be connected to a charging terminal so as to supply power to the battery 50 and the like.

The vibration motor 90 may be received in the housing 10. The vibration motor 90 may be disposed at the lower portion of the housing 10. The vibration motor 90 may be disposed adjacent to the controller 70. The controller 70 may be disposed under the battery 50.

The controller 70 may be received in the lower portion of the housing 10. The controller 70 may be disposed under the reception space 11. The controller 70 may be electrically connected to components such as the heater 314, the rotary switch 44, the battery 50, the flow sensor 60, the socket 80, the vibration motor 90, and the like. The controller 70 may control the operation of the components, which are electrically connected thereto.

The controller 70 may control the heater 314 to heat the wick 313 to thus generate an aerosol. The controller 70 may operate the flow sensor 60. The controller 70 may control the operation of the internal components based on the information corresponding to the result of detection of air flow. The controller 70 may receive an electric signal from the rotary switch 44. The controller 70 may control the operation of the components based on the electric signal received from the rotary switch 44. The controller 70 may operate the vibration motor 90 to transmit the vibration to a user.

Referring to FIG. 4, the first container 31 may include a cylinder 310, which defines the appearance thereof. The liquid chamber 311 may be formed in the cylinder 310. The evaporation passage 318 may be formed in the cylinder 310. The evaporation passage 318 may be formed in an evaporation pipe 3180, which extends vertically. The evaporation pipe 3180 may be surrounded by the liquid chamber 311.

An evaporation housing 3120 may extends downwards from the evaporation pipe 3180. The lower portion of the evaporation housing 3120 may be enlarged radially outwards so as to be connected to the cylinder 310. The evaporation chamber 312 may be formed in the evaporation housing 3120. The evaporation chamber 312 may be connected to the evaporation passage 318 in a vertical direction.

The wick 313 may be disposed in the evaporation housing 3120. The heater 314 may be disposed in the evaporation housing 3120. The heater 314 may be wound around the wick 313 so as to surround the wick 313. The heater 314 may be configured to have the form of a coil surrounding the wick 313. The heater 314 may include a coil. The heater 314 may be referred to as a coil heater 314. The coil of the heater 314 may be wound around the outer circumferential surface of the wick 313.

A wick hole 3121 may be formed in the evaporation housing 3120 so as to connect the liquid chamber 311 to the evaporation chamber 312. The wick 313 may be inserted into the wick hole 3121. The prevaporized aerosol material may be introduced through the wick hole 3121 so as to wet the wick 313.

A cap 36 may define the bottom surface of the cartridge 30. The cap 36 may be disposed at the lower portion of the first container 31. The cap 36 may cover the lower portion of the cylinder 310. The outer surface of the cap 36 may be rounded upwards so as to be connected to the outer circumferential surface of the cylinder 310.

The first inlet 301 may be formed through the cap 36. The first inlet 301 may be connected to the evaporation chamber 312.

A first extension 362 may project upwards from the bottom 361 of the cap 36 around the first inlet 301. A first extension 362 may extend upwards from the bottom 361 of the cap 36 so as to surround the first inlet 301. The first extension 362 may define a step with respect to the bottom 361 of the cap 36.

Consequently, it is possible to prevent the prevaporized aerosol material that leaks from the liquid chamber 311 from being discharged to the outside of the cartridge 30 through the first inlet 301.

A connector 365 may extend upwards from the circumferential portion of the cap 36. The connector 365 may be fitted into the inner circumferential surface of the lower portion of the cylinder 310.

A rim 367 may extend upwards from the connector 365. The rim 367 may be spaced inwards apart from the inner circumferential surface of the cylinder 310.

A lower sealant or lower seal 37 may be disposed between the cap 36 and the evaporation chamber 312. The lower seal 37 may define the evaporation chamber 312 in 5 conjunction with the evaporation housing 3120. The body 373 of the lower seal 37 may be disposed below the evaporation housing 3120. An evaporation inlet 371 may be vertically formed through the lower seal 37. The evaporation inlet 371 may be formed in the body 373 of the lower seal 37. The evaporation inlet 371 may be positioned between the first inlet 301 and the evaporation chamber 312, and may be connected to the first inlet 301 and the evaporation chamber 312.

A second extension 372 may extend upwards from the lower seal 37. The second extension 372 may surround the evaporation inlet 371. The second extension 372 may project from the body 373 of the lower seal 37 around the evaporation inlet 371. The second extension 372 may define a step with respect to the bottom surface of the lower seal 37.

Consequently, it is possible to minimize downward leakage of the prevaporized aerosol material that is absorbed in the wick 313 through the evaporation inlet 371. It is possible to prevent the prevaporized aerosol material that leaks from the liquid chamber 311 from being discharged to the outside of the cartridge 30 through the evaporation inlet 371 and the first inlet 301.

An upper rim 375 may extend upwards from the outer circumferential portion of the lower seal 37. The upper rim 375 may extend upwards from the outer circumferential portion of the body 373 of the lower seal 37. A rib 3122 may extend downwards from the evaporation housing 3120. The upper rim 375 may be fitted between the rib 3122 and the inner circumferential surface of the cylinder 310.

A lower rim 377 may extend downwards from the outer circumferential portion of the lower seal 37. The lower rim 377 may be fitted between the rim 367 of the cap 36 and the inner circumferential surface of the cylinder 310.

The outer circumferential surfaces of the upper rim 375 and the lower rim 377 may define a continuous surface. The upper rim 375 and the lower rim 377 may be in contact with the inner circumferential surface of the cylinder 310.

Hereinafter, the flow of air and aerosol when a user inhales air through the mouthpiece 34 will be described with reference to FIGS. 3 and 4.

When a user inhales air through the mouthpiece 34, the air may be introduced from the outside of the housing 10, and may pass through the reception space 11 between the housing 10 and the cartridge 30. The air that has passed through the reception space 11 between the housing 10 and the cartridge 30 may be introduced into the evaporation chamber 312 in the first container 31 through the first inlet 301. The introduced air may pass through the evaporation passage 318 together with the aerosol contained in the evaporation chamber 312. The aerosol that has passed through the evaporation passage 318 may be introduced into the second granulation chamber 322 sequentially through the first connecting passage 319 and the lower chamber hole 323. The aerosol may pass through the medium in the second granulation chamber 322, the upper chamber hole 324, and the first outlet 302 in that order. The aerosol that has passed through the first outlet 302 may be discharged upwards through the second inlet 341, the suction passage 343, and the second outlet 342.

Referring to FIG. 5, the second disc 327 may be coupled or fixed to the container shaft 325. The second disc 327 may be coupled or fixed to the rotating shaft 3251.

A coupling hole 3271 may be formed in the second disc 327. The coupling hole 3271 may be formed in the center of the second disc 327. A coupling member 3278 may extend through the coupling hole 3271. The coupling member 3278 may be fitted into the rotating shaft 3251. The coupling member 3278 may be threadedly engaged with the rotating shaft 3251. The coupling member 3278 may couple the second disc 327 to the container shaft 325.

A second disc hole 3279 may be formed in the second disc 327. The second disc hole 3279 may be formed at a position that is spaced apart from the center of the second disc 327. The second disc hole 3279 may be connected to (or may communicate with) the upper chamber hole 324. The second disc hole 3279 may be connected to or communicate with the upper chamber hole 324 formed in the upper portion of one of the plurality of granulation chambers 321 and 322. One of the plurality of granulation chambers 321 and 322 may communicate with the connecting passage via the upper chamber hole 324 and the second disc hole 3279.

The second connecting passage 329 may be formed between the second disc 327 and the container head 33.

The container head 33 may be coupled or bonded to the second disc 327. The container head 33 may be fixed to the second disc 327.

The first outlet 302 may be formed in the container head 33. The first outlet 302 may communicate with the second connecting passage 329.

Referring to FIGS. 5 and 6, the cartridge gear 41 may include an inner circumferential protrusion 416, which is fitted into the second guide slit 326. The inner circumferential protrusion 416 may project inwards from the inner circumferential surface of the cartridge gear 41. The inner circumferential protrusion 416 may be fitted into the second guide slit 326. The inner circumferential protrusion 416 may be engaged with the second guide slit 326. The inner circumferential protrusion 416 may be engaged with the second guide slit 326 such that the cartridge gear 41 is rotated together with the second container 32.

The second guide slit 326 may extend in the longitudinal direction of the rotating shaft of the second container 32. The second guide slit 326 may vertically guide the cartridge 30 along the inner circumferential protrusion 416. When the cartridge 30 is inserted into the reception space 11, the inner circumferential protrusion 416 may catch on the upper end of the second guide slit 326. The upper end of the second guide slit 326 may serve as a stopper configured to prevent further downward movement of the cartridge 30.

The first guide slit 316 may extend in the longitudinal direction of the second guide slit 326. The first guide slit 316 and the second guide slit 326 may define a continuous surface such that the cartridge 30 is guided vertically along the inner circumferential protrusion 416.

The mouthpiece 34 may be pivotably connected or coupled to the container head 33. FIG. 5 illustrates the state in which the mouthpiece 34 is pivoted so as to be positioned at a first position. FIG. 6 illustrates the state in which the mouthpiece 34 is pivoted so as to be positioned at a second position.

Hereinafter, the state in which the mouthpiece 34 is pivoted so as to be positioned at the first position will be described with reference to FIG. 5.

When the mouthpiece 34 is pivoted so as to be positioned at the first position, the mouthpiece 34 may be seated in the seating portion 14 so as to close the upper portion of the housing 10. The mouthpiece 34 may close the opening O in the upper case 20. One surface of the mouthpiece 34 may be exposed to the outside through the opening O.

The suction passage 343 in the mouthpiece 34 may be disposed in the upper case 20. The suction passage 343 may be oriented so as not to be aligned with the longitudinal direction of the cartridge 30.

The sealing cap 35 may project downwards from the mouthpiece 34. The sealing cap 35 may be configured to have the form of a hook. The sealing cap 35 may close the first outlet 302.

Consequently, the medium and the prevaporized aerosol material contained in the cartridge and the internal components may be protected from the external environment.

The sealing cap 35 may have an outer surface, which is rounded in the direction in which the mouthpiece 34 pivots. Accordingly, when the mouthpiece 34 is pivoted so as to be positioned at the first position, the sealing cap 35 does not catch on the surface surrounding the first outlet 302.

Next, the state in which the mouthpiece 34 is pivoted so as to be positioned at the second position will be described with reference to FIG. 6.

When the mouthpiece 34 is pivoted so as to be positioned at the second position, the mouthpiece 34 may be separated from the seating portion 14. The sealing cap 35 may be separated from the first outlet 302 so as to open the first outlet 302.

The first outlet 302 may come into contact with the second inlet 341. The suction passage 343 in the mouthpiece 34 may communicate with the first outlet 302. The suction passage 343 in the mouthpiece 34 may communicate with the space in the first container 31 and the space in the second container 32 through the first outlet 302.

The suction passage 343 may be oriented so as to extend in the longitudinal direction of the cartridge 30. The suction passage 343 may be oriented so as to extend vertically. The sealing cap 35 may be disposed so as to project toward the seating portion 14.

Hereinafter, the directions of the mouthpiece 34 are defined based on the orthogonal coordinate system shown in FIGS. 7 to 9. In the orthogonal coordinate system, a forward direction FD may be defined as the forward direction of the mouthpiece 34. A rearward direction RD may be defined as the rearward direction of the mouthpiece 34. A lateral direction LD may be defined as the rightward and leftward direction or the lateral direction of the mouthpiece 34. An upward direction UD may be defined as the upward direction of the mouthpiece 34. A downward direction DD may be defined as the downward direction of the mouthpiece 34.

Referring to FIGS. 7 and 8, the mouthpiece 34 may be configured to be elongated in the forward and backward direction of the mouthpiece 34. The mouthpiece 34 may be configured to have a flat shape. The second inlet (or introduction inlet) 341 may be formed in the rear portion of the mouthpiece 34. The second outlet 342 may be formed in the front portion of the mouthpiece 34.

The suction passage 343 (see FIG. 6) may be formed in the mouthpiece 34, and may extend in a forward and backward direction. The second inlet 341 may be positioned at one end of the suction passage 343. The second outlet 342 may be positioned at the other end of the suction passage 343. The distance between the pivot shaft 355 and the second outlet 342 may be greater than the distance between the pivot shaft 355 and the second inlet 341. The suction passage 343 may be referred to as a second passage 343.

Accordingly, a user is able to inhale air while holding the portion of the second outlet 342 in his/her mouth.

The holding groove 347 may be formed as a depression in a side surface of the mouthpiece 34. The holding groove 347 may include two holding grooves formed in two side surfaces of the mouthpiece 34. The holding groove 347 may positioned closer to the second outlet 342 than to the second inlet 341.

The mouthpiece 34 may include the sealing cap 35. The sealing cap 35 may project outwards from the mouthpiece 34. The sealing cap 35 may project downwards from the mouthpiece 34. The sealing cap 35 may be integrally formed with the mouthpiece 34. The sealing cap 35 may be coupled to the mouthpiece 34. The sealing cap 35 may be disposed closer to the second inlet 341 than to the second outlet 342.

The mouthpiece 34 may be pivotable about the pivot shaft 355. The pivot shaft 355 may be thought of as the center of the pivoting action of the mouthpiece 34 or a pivot center. The pivot shaft 355 may project in a rightward and leftward directions from two side surfaces of the mouthpiece 34 or the sealing cap 35. The pivot shaft 355 may be disposed so as to be perpendicular to the vertical direction. The pivot shaft 355 may be positioned closer to the second inlet 341 than to the second outlet 342.

The sealing cap 35 may include an extension 352, which extends downwards from the mouthpiece 34. The sealing cap 35 may include a first sealing surface 356, 5 which extends in the rearward direction of the mouthpiece 34 from the lower end of the extension 352. The first sealing surface 356 may define the outer surface of the lower end of the sealing cap 35.

When the mouthpiece 34 is pivoted, the first sealing surface 356 may come into contact with the region around the first outlet 302. When the mouthpiece 34 is positioned at the first position, the first sealing surface 356 is disposed over the first outlet 302 so as to close the first outlet 302 (see FIG. 5). When the mouthpiece 34 is positioned at the first position, the first sealing surface 356 may come into close contact with a gasket 331 (see FIG. 11), which is disposed around the first outlet 302. The gasket 331 may alternatively be referred to as a docking member or a docking ring.

The first sealing surface 356 may include a portion that extends while being rounded in the direction in which the mouthpiece 34 is pivoted. The first sealing surface 356 may include a first planar portion 356*a*, which is formed to have a planar surface, and a first round portion 356*b*, which is rounded in the direction in which the mouthpiece 34 is pivoted.

The first planar portion 356*a* may define the lower surface of the extension 352. The first round portion 356*b* may define a surface that extends toward the second inlet 341 from the first planar portion 356*a* while being rounded. The first round portion 356*b* may have a curvature radius, the center of which is positioned adjacent to the pivot center of the mouthpiece 34.

Consequently, when the mouthpiece 34 is pivoted, the mouthpiece 34 may smoothly pivot between the first and second positions without the first sealing surface 356 of the sealing cap 35 catching on the surface around the first outlet 302. The end of the sealing surface 356 and/or the sealing cap 35 may be spaced apart from the lower surface of the mouthpiece 34 so as to define a space S between the mouthpiece 34 and the end. The front side and the lower side of the space S may be surrounded by the extension 352 and the first sealing surface 356. The extension 352 and the first sealing surface 346 of the sealing cap 35 may define a hook-shaped section.

The sealing cap 35 may be made of an elastic material. For example, the sealing cap 35 may be made of a plastic material.

Accordingly, when the mouthpiece 34 is positioned at the first position, the first sealing surface 356 may come into contact with the first outlet 302, and may press the first outlet 302 while being pushed toward the space S.

The mouthpiece 34 may include a second sealing surface 346, which constitutes the rear surface of the mouthpiece 34 and surrounds the second inlet 341. The second sealing surface 346 may define the outer surface of the mouthpiece 34 around the second inlet 341.

When the mouthpiece 34 is pivoted, the second sealing surface 346 may come into contact with the region around the first outlet 302. When the mouthpiece 34 is positioned at the second position, the second sealing surface 346 may be disposed so as to surround the first outlet 302, and the second inlet 341 may communicate with the first outlet 302 (see FIG. 6). When the mouthpiece 34 is positioned at the second position, the second sealing surface 346 may come into close contact with the gasket 331 (see FIG. 11), which is disposed around the first outlet 302.

The second sealing surface 346 may include a portion that extends while being rounded in the direction in which the mouthpiece 34 is pivoted. The second sealing surface 346 may include a second planar portion 346*b*, which is formed to have a planar surface, and a second round portion 346*a*, which is rounded in the direction in which the mouthpiece 34 is pivoted. The second planar portion 346*b* may be formed higher than the second round portion 346*a*.

The second round portion 346*a* may constitute a surface that extends while being rounded in the direction in which the mouthpiece 34 is pivoted. The second round portion 346*a* may have a predetermined curvature. The center of the curvature of the second round portion 346*a* may be positioned adjacent to the pivot center of the mouthpiece 34. The second planar portion 346*b* may extend from the second round portion 346*a* in the upward direction of the mouthpiece 34 to define a planar surface.

Consequently, when the mouthpiece 34 is pivoted, the second sealing surface 346 of the mouthpiece 34 may smoothly pivot between the first and second positions without catching on the surface around the first outlet 302.

A spring 344 may be connected to the mouthpiece 34. The spring 344 may be exposed to the outside of the mouthpiece 34 through a slit 354 formed in the sealing cap 35. A portion of the spring 344 may be exposed downwards from the mouthpiece 34.

Referring to FIG. 9, the sealing cap 35 may include an assembly protrusion 359, which projects inwards. The assembly protrusion 359 may include two assembly protrusions, which are formed on two inner side surfaces of the sealing cap 35. The mouthpiece 34 may have an assembly groove 349, which is depressed inwards. The assembly groove 359 may include two assembly grooves, which are formed in two side surfaces of the mouthpiece 34. The assembly protrusions 359 may be fitted into the assembly grooves 349. The sealing cap 35 may be assembled with the mouthpiece 34 so as to project downwards from the mouthpiece 34.

The mouthpiece 34 may include a spring-coupling shaft 345, which projects outwards from a side surface thereof. The spring-coupling shaft 345 may be formed coaxially with the pivot shaft 355. The spring 344 may be wound around the spring-coupling shaft 345 so as to extend in the longitudinal direction of the spring-coupling shaft 345. One end of the spring 344 may be in contact with the mouthpiece 34 and the other end of the spring 344 may be exposed from the mouthpiece 34.

Referring to FIGS. 10 and 11, the mouthpiece 34 may be pivotably connected or coupled to the container head 33. Shaft holes 335 may be formed in two side surfaces of the container head 33. The pivot shafts 355 may be fitted into the shaft holes 335. The mouthpiece 34 may be pivotable about the pivot shafts 355, which are fitted into the shaft holes 335.

The container head 33 may be configured to have a cylinder form, which extends upwards from the outer circumferential surface of the second container 32. The shaft holes 335 may be formed in two side surfaces of the upper portion of the container head 33. The container head 33 may be open at the upper surface thereof such that the mouthpiece 34 is disposed in the container head 33. A portion of one side surface of the container head 33 may be open. The container head 33 may be configured such that the upper surface portion and the side surface portion thereof are continuously opened so as to have an "L" shape. The mouthpiece 34 may be pivotable in the open area of the container head 33.

The first outlet 302 may be formed in the bottom surface of the container head 33. The first outlet 302 may be connected to the connecting passage 329 formed in the upper portion of the second container 32. The aerosol generated from the cartridge 30 may be discharged from the first outlet 302 through the connecting passage 329.

The gasket 331 may be formed around the first outlet 302. The gasket 331 may surround the first outlet 302 at the bottom surface of the container head 33. The gasket 331 may project upwards from the bottom surface of the container head 33. The gasket 331 may be fixed to the bottom surface of the container head 33. The gasket 331 may have a shape corresponding to the circumference of the second inlet 341 so as to surround the second inlet 341. The gasket 331 may be made of an elastic material such as rubber or silicone.

When the mouthpiece 34 is positioned at the first position, the gasket 331 may 5 come into close contact with the first sealing surface 356 of the sealing cap 35. When the mouthpiece 34 is positioned at the second position, the gasket 331 may come into contact with the second sealing surface 346, which constitutes the rear surface of the mouthpiece 34 around the second inlet 341.

The container head 33 may therein have a spring-fitting hole 334. The spring-fitting hole 334 may be formed in the inner surface of the container head 33. The spring-fitting hole 334 may extend upwards, and may be open at the upper portion thereof. The end of the spring 344 that is exposed downwards from the mouthpiece 34 may be fitted and fixed in the spring-fitting hole 334. The spring 344 may be fixed in the container head 33 and may be connected to the mouthpiece 34 so as to bias the mouthpiece 34 toward the second position. The spring 344 may move the mouthpiece 34 to the second position by virtue of the restoring force thereof.

The container head 33 may be coupled to the upper side of the second container 32. An assembly hole 338 may be formed in the bottom surface of the container head 33. An assembly screw 328 may be engaged with the upper portion of the second container 32 through the assembly hole 338.

Referring to FIG. 12, an inner wall 12 may be provided in the housing 10. The inner wall 12 may be formed separately from the housing 10, and may be coupled (or bonded) to the inner surface of the housing 10, or may be integrally formed with the housing 10. The inner wall 12 may surround the reception space 11. A groove 121 may be formed in the inner circumferential surface of the inner wall 12 in an outward direction.

A connector 110 may be disposed in the housing 10. The connector 110 may be disposed on the inner surface of the inner wall 12. The connector 110 may be disposed at the lower side of the cartridge gear 41. The connector 110 may be configured to have the form of a cylinder that extends vertically.

The connector 110 may surround the reception space 11. The connector 110 may define the reception space 11. The connector 110 may define a portion of the reception space 11. The diameter of the inner circumferential surface of the connector 110 may be equal to the diameter of the inner circumferential surface of the cartridge gear 41. The inner circumferential surface of the connector 110 may define an extension of the inner circumferential surface of the cartridge gear 41.

The connector 110 may include a cylindrical connector body 111. The connector body 111 may surround the reception space 11. The connector body 111 may define the reception space 11. The connector body 111 may define a portion of the reception space 11. The inner circumferential surface 112 of the connector body 111 may define the reception space 11. The inner circumferential surface 112 of the connector body 111 may define a portion of the reception space 11. The connector body 111 may extend vertically.

The connector 110 may be coupled to the housing 10. The connector 110 may be fixed to the housing 10. An outer protrusion 113 may be formed at a position corresponding to the groove 121 in the inner wall 12 of the housing 10. The outer protrusion 113 may be fitted into the groove 121. The outer protrusion 113 may be positioned at the upper portion of the connector 110. The outer protrusion 113 may be positioned higher than the center of the connector 110 in a vertical direction. The outer protrusion 113 may be positioned higher than the holding protrusion 117.

The outer protrusion 113 may project outwards from the connector 110. The outer protrusion 113 may project outwards from the connector body 111. The outer protrusion 113 may be inclined outwards moving upwards from below.

The holding protrusion 117 may extend inwards from the connector 110. The holding protrusion 117 may project inwards from the connector body 111. The holding protrusion 117 may be fitted into the holding groove 317 (see FIG. 14).

Referring to FIGS. 12 and 13, the cartridge gear 41 may be rotatably mounted in the housing 10. The cartridge gear 41 may be configured to have the form of a ring (see FIG. 15). A gear-fitting hole 411 may define a cavity in the cartridge gear 41. The gear-fitting hole 411 may be defined by the inner circumferential surface of the cartridge gear 41. The gear-fitting hole 411 may be disposed such that the inner circumferential surface thereof surrounds the reception space 11. The gear-fitting hole 411 may be positioned in the reception space 11.

An inner circumferential protrusion 416 may project toward the reception space from the inner circumferential surface of the cartridge gear 41. The inner circumferential protrusion 416 may include a plurality of inner circumferential protrusions 416. The plurality of inner circumferential protrusions 416 may be arranged in a circumferential direction. The plurality of inner circumferential protrusions 416 may be arranged in the circumferential direction of the cartridge gear 41 about the axis of the reception space 11 (an imaginary vertically extending line). The plurality of inner circumferential protrusions 416 may be arranged in a circumferential direction about the rotating shaft of the cartridge gear 41. The inner circumferential protrusion 416 may be elongated vertically so as to be fitted into the first and second guide slits 316 and 326.

The reception space 11 may be elongated. The reception space 11 may extend in the longitudinal direction of the cartridge 30. The reception space 11 may extend vertically.

The inner circumferential protrusion 416 may extend in the longitudinal direction of the reception space 11. The inner circumferential protrusion 416 may extend in the longitudinal direction of the first guide slit 316. The inner circumferential protrusion 416 may extend in the longitudinal direction of the second guide slit 326.

The reception space 11 may be open at one surface thereof. The reception space 11 may be open at the upper side thereof.

The gear-fitting hole 411 may be open at the surface thereof that faces the open surface of the reception space 11. The gear-fitting hole 411 may also be open at the surface thereof opposite the one open surface. Both the one surface and the other surface of the gear-fitting hole 411 may be open. The gear-fitting hole 411 may be open at a side thereof through which the cartridge 30 is inserted. The gear-fitting hole 411 may be open at a side thereof through which the cartridge 30 is removed therefrom. The gear-fitting hole 411 may be open at both the upper and lower sides thereof.

The inner circumferential protrusion 416 may include sloped surfaces 416a and 416b. The length of the inner circumferential protrusion 416 may be greater at the outer side thereof than at the inner side thereof. The inner circumferential protrusion 416 may be configured to have a trapezoidal form.

The sloped surfaces 416a and 416b may be positioned at the two ends of the inner circumferential protrusion 416 in the longitudinal direction thereof. The sloped surfaces 416a and 416b may include a first sloped surface 416a and a second sloped surface 416b, which are respectively positioned at the two ends of the inner circumferential protrusion 416 in the longitudinal direction.

The first sloped surface 416a may be positioned at one end of the inner circumferential protrusion 416 in the longitudinal direction. The first sloped surface 416a may be positioned at the end of the inner circumferential protrusion 416 at which the open surface of the reception space 11 is located. The first sloped surface 416a may be positioned at the end of the inner circumferential protrusion 416 at which the surface of the gear-fitting hole 411 is located. The first sloped surface 416a may be positioned at the upper portion of the inner circumferential protrusion 416.

The second sloped surface 416b may be positioned at the other end of the inner circumferential protrusion 416 in the longitudinal direction. The second sloped surface 416b may be positioned at the other end of the inner circumferential protrusion 416, at which the surface opposite the open surface of the reception space 11 is positioned. The second sloped surface 416b may be positioned at the other end of the inner circumferential protrusion 416 at which the other surface (opposite the one surface) of the gear-fitting hole 411 is positioned. The second sloped surface 416b may be positioned at the lower portion of the inner circumferential protrusion 416.

The first sloped surface 416a may face the open surface of the reception space 11. The first sloped surface 416a may face both the open surface of the reception space 11 and the central axis of the reception space 11. The first sloped surface 416a may be inclined toward the central axis of the reception space 11 moving in the direction in which the cartridge 30 is inserted into the reception space 11. The first sloped surface 416a may be inclined toward the central axis of the reception space 11 moving downwards.

The first sloped surface 416a may face the open surface of the gear-fitting hole 411. The first sloped surface 416a may face both the open surface of the gear-fitting hole 411 and the central axis of the gear-fitting hole 411. The first sloped surface 416a may be inclined toward the central axis of the gear-fitting hole 411 moving in the direction in which the cartridge 30 is inserted into the gear-fitting hole 411. The first sloped surface 416a may be inclined toward the central axis of the gear-fitting hole 411 moving downwards.

The upper end of the second guide slit 326 may face the first sloped surface 416a (see FIG. 5). The upper end of the second guide slit 326 may be inclined so as to be parallel to the first sloped surface 416a (see FIG. 5).

The second sloped surface 416b may face the direction opposite the direction faced by the open surface of the reception space 11. The second sloped surface 416b may face the direction opposite the direction faced by the open surface of the reception space 11 and may face toward the central axis of the reception space 11. The second sloped surface 416b may be inclined toward the central axis of the reception space 11 moving in the direction in which the cartridge 30 is taken out of the reception space 11. The second sloped surface 416b may be inclined toward the central axis of the reception space 11 moving upwards.

The second sloped surface 416b may face the direction opposite the direction faced by the open surface of the gear-fitting hole 411. The second sloped surface 416b may face the other open surface of the gear-fitting hole 411. The second sloped surface 416b may face the direction opposite the direction faced by the open surface of the gear-fitting hole 411 and may face toward the central axis of the gear-fitting hole 411. The second sloped surface 416b may be inclined toward the central axis of the gear-fitting hole 411 moving in the direction in which the cartridge 30 is taken out of the gear-fitting hole 411. The second sloped surface 416b may be inclined toward the central axis of the reception space 11 moving upwards.

Accordingly, it is possible to easily insert the cartridge 30 into the reception space 11.

Accordingly, it is possible to easily take the cartridge 30 out of the reception space 11.

Accordingly, it is possible to easily insert the cartridge 30 into the gear-fitting hole 411.

Accordingly, it is possible to easily take the cartridge 30 out of the gear-fitting hole 411.

Accordingly, it is possible to easily insert the cartridge 30 into the reception space 11 even when the first guide slit 316 and the inner circumferential protrusion 416 are not aligned with each other.

Accordingly, it is possible to easily insert and take out the cartridge 40 even when the first guide slit 316 and the second guide slit 326 are not aligned with each other.

Referring to FIGS. 14 to 16, the cartridge 30 may be fitted into the gear-fitting hole 411 formed in the cartridge gear 41. The cartridge 30 may be fitted in the direction of the rotating axis of the cartridge gear 41. The direction of the rotating axis of the cartridge gear 41 may be a vertical direction.

The inner circumferential protrusion 416 may be fitted into the first and second guide slits 316 and 326. The inner circumferential protrusion 416 may guide fitting of the cartridge 30 into the reception space 11 by sliding along the first and second guide slits 316 and 326. The guide slit 316 and the second guide slit 326 may sequentially come into contact with the inner circumferential protrusion 416.

The first guide slit 316 may include a plurality of first guide slits, which are arranged in the circumferential direction of the cartridge 30. The second guide slit 326 may include a plurality of second guide slits, which are arranged in the circumferential direction of the cartridge 30. The inner circumferential protrusion 416 may include a plurality of inner circumferential protrusions, which are arranged in the circumferential direction of the cartridge 41. The plurality of inner circumferential protrusions 416 may be arranged at positions corresponding to the plurality of second guide slits 326. Each of the plurality of inner circumferential protrusions 416 may be fitted into a corresponding one of the plurality of second guide slits 326.

The circumferential direction of the cartridge 30 may be the same as the rotational direction of the second container 32. The circumferential direction of the cartridge gear 41 may be the same as the rotational direction of the cartridge gear 41. The rotational direction of the second container 32 may be the same as the rotational direction of the cartridge gear 41.

When the cartridge 30 is completely fitted into the reception space 11, the holding protrusion 117 (see FIG. 12) may be fitted into the holding groove 317, thereby holding the first container 31 in position. When the cartridge 30 is completely fitted into the reception space 11, the fitting protrusion 337 may be fitted into the fitting groove 137 (see FIG. 6), thereby holding the container head 33 in position. When the cartridge 30 is completely fitted into the reception space 11, the inner circumferential protrusion 416 may be positioned at the upper end of the second guide slit 326.

Consequently, when the cartridge gear 41 is rotated, the second container 32 may be rotated because the inner circumferential protrusion 416 is engaged with the second guide slit 326. When the second container 32 is rotated, the position of the first container 31 may be held. When the second container 32 is rotated, the position of the container head 33 and the position of the mouthpiece 34 may be held.

The second guide slit 326 may include a portion that is increasingly wider moving downwards. The second guide slit 326 may have the maximum width at the lower end of the second container 32. The width w2 of the second guide slit 326 may continually decrease moving upwards from the lower end, and may maintain a constant value w1 from a predetermined height to the upper end thereof. The width w2 of the lower part of the second guide slit 326 may be greater than the width w1 of the upper part of the second guide slit 326.

The width w3 of the first guide slit 316 may become equal to the width w2 of the lower end of the second guide slit 326 at the portion thereof that abuts the lower end of the second guide slit 326. The width w3 of the first guide slit 316 may be equal to or greater than the width w1 of the upper part of the second guide slit 326.

The second guide slit 326 may have a portion that has the same width as the width of the inner circumferential protrusion 416. The width w1 of the upper part of the second guide slit 326 may be equal to the width w0 of the inner circumferential protrusion 416 (see FIG. 13). The width w2 of the lower part of the second guide slit 326 may be greater than the width w0 of the inner circumferential protrusion 416. The width w3 of the first guide slit 316 may be greater than the width w0 of the inner circumferential protrusion 416.

Accordingly, even when the cartridge 30 is fitted into the gear-fitting hole 411 in 5 the state in which the first guide slit 316 is misaligned with the second guide slit 326, the inner circumferential protrusion 416 slides along the side surfaces of the first guide slit 316 and the second guide slit 326, thereby aligning the first guide slit 316 with the second guide slit 326.

Consequently, since the first connecting passage 319 precisely communicates with the lower chamber hole 323, it is possible to prevent a decrease in aerosol flow efficiency.

Referring to FIGS. 16 and 17, the cartridge gear 41 may be engaged with the dial gear 41 so as to be rotated therewith. The rotating shaft of the cartridge 41 and the rotating shaft of the dial gear 42 may be oriented parallel to each other.

First gear teeth 412 may be formed on the outer circumferential surface of the cartridge gear 41. Second gear teeth 422 may be formed on the outer circumferential surface of the dial gear 42. The first gear teeth 412 and the second gear teeth 422 may be engaged with each other so as to be rotated together. The height of the first gear teeth 412 may be equal to the height of the second gear teeth 422.

The dial 43 may be connected to the dial gear 42 so as to be rotated therewith. The dial 43 and the dial gear 42 may be coaxially disposed.

An irregular portion 432 may be formed on the outer circumferential surface of the dial 43. The height of the irregular portion 432 may be lower than the height of the first gear teeth 412 and the height of the second gear teeth 412.

A user is able to rotate the dial 43 at the outside of the housing 10 (see FIG. 1). When the dial 43 is rotated by a user, the dial gear 42 and the cartridge gear 41 are sequentially rotated, thereby rotating the second container 32.

Referring to FIGS. 15 and 18, the cap 36 may form the bottom surface of the cartridge 30. The cap 36 may be referred to as a plug 36. The cap 36 may also be referred to as a lower cap 36. The cap 36 may be disposed below the cylinder 310 (see FIG. 4). The cap 36 may be coupled or bonded to the cylinder 310. The cap 36 may be fixed to the cylinder 310. A fitting hole 307 may be formed in the cap 36 by depressing the lower surface of the cap 36 upwards. The fitting hole 307 may be positioned so as to be spaced apart from the center of the cap 36. The fitting hole 307 may be spaced apart from a line extending from the rotating shaft of the second container 32. Hereinafter, the fitting hole 307 may be referred to as a fitting hole 307.

A base 16 may be configured to surround the lower portion of the reception space 11. A fitting protrusion 167 may project upwards from the bottom surface 168 of the base 16. The fitting protrusion 167 may be positioned so as to be spaced apart from the center of the base 16. The fitting protrusion 167 may be spaced apart from a line extending from the rotating shaft of the second container 32.

The fitting hole 307 may be positioned at a position corresponding to the fitting protrusion 167. When the cartridge 30 is fitted into the reception space 11, the fitting protrusion 167 may be fitted into the fitting hole 307.

The fitting protrusion 167 may be configured to have the form of a circular pillar, which extends upwards. The upper portion of the fitting protrusion 167 may become narrow moving upwards. The upper end of the fitting protrusion 167 may be rounded.

Accordingly, the first container 31 and the cartridge 30 may be disposed at a specified position.

Accordingly, even when the fitting protrusion 167 is not precisely aligned with the fitting hole 307, the upper end of the fitting protrusion 167 may be guided into the fitting hole 307, thereby guiding the cartridge to the correct position.

Accordingly, the first container 31 may be maintained in place even when the second container 32 is rotated.

A first terminal 164 may project upwards from the bottom surface 168 of the base 16. The first terminal 164 may be composed of a pair of terminals, and may be spaced 5 apart from the center of the base 16 by the same distance. The first terminal 164 may be configured to have the form of a circular pillar that extends upwards. The first terminal 164 may receive power from the battery 50.

A second terminal 304 may be formed on the bottom surface of the cap 36. The second terminal 304 may be composed of a pair of terminals, and may be spaced apart from the center of cap 36 by the same distance. The second terminal 304 may be electrically connected to the heater 314.

The second terminal 304 may be positioned at a position corresponding to the first terminal 164. When the cartridge 30 is fitted into the reception space 11, the second terminal 304 may come into contact with the first terminal 164, and may thus be electrically connected thereto. The first terminal 164 may transmit power to the second terminal 304 such that the heater 314 heats the wick 313.

Referring to FIG. 19 in conjunction with FIG. 2, the connector 110 may include the cylindrical connector body 111. The connector body 111 may extend vertically.

The connector 110 may have a structure configured to hold the rotational position of the cartridge 30. The holding protrusion 117 may project from the inner circumferential surface 112 of the connector 110.

Grooves 114 and 115 may be formed in the connector 110. The grooves 114 and 115 may be formed through the connector body 111.

Necks 116 and 118 may be respectively positioned in the grooves 114 and 115, may extend. The necks 116 and 118 may extend into the grooves 114 and 115 from the connector body 111. The necks 116 and 118 may be positioned on the same surface of the connector body 111, and may extend vertically.

The holding protrusions 117 and 119 may respectively project toward the inside of the connector 110 from the necks 116 and 118. Hereinafter, the holding protrusions 117 and 119 may be referred to as heads 117 and 119. The heads 117 and 119 may be fitted into the holding grooves 317.

The heads 117 and 119 may hold the first container 31 in position. When the cartridge 30 is fitted into the reception space 11, the heads 117 and 119 may hold the first container 31 in position. Because the heads 117 and 119 are fitted into the holding grooves 317, the first container 31 cannot be rotated even when the second container 32 is rotated.

The groove 114 may be formed in the lower portion of the connector 110. The lower groove 114 may be formed in the lower end of the connector 110.

The first neck 116 may be positioned in the lower groove 114. The first neck 116 may extend into the lower groove 114 from the connector 111.

The first head 117 may project toward the inside of the connector 110 from the first neck 116. The first head 117 may be disposed at a position corresponding to a holding groove 317, which is positioned at relatively low level, among the plurality of holding grooves 317 formed in the first container 31.

The first head 117 may include a plurality of first heads 117. The plurality of heads 117 may be circumferentially arranged at regular intervals. Each of the first neck 116 and the lower groove 114 may include a plurality of necks 116 or lower grooves 114. The plurality of necks 116 may be arranged at regular intervals. The plurality of lower grooves 114 may be arranged at regular intervals.

The middle groove 115 may be formed at a position higher than the lower groove 114. The middle groove 115 may be formed at a position that is spaced apart from the lower groove 114 in a circumferential direction.

The second neck 118 may be positioned in the middle groove 115. The second neck 118 may extend into the middle groove 115 from the connector body 111.

The second head 119 may project toward the inside of the connector 110 from the second neck 118. The second head 119 may be disposed at a position corresponding to a holding groove 317, which is positioned at a relatively high level, among the plurality of holding grooves 317 formed in the first container 31.

The second head 119 may include a plurality of second heads 119. The plurality of second heads 119 may be arranged at regular intervals in a circumferential direction. Each of the second neck 118 and the middle groove 115 may include a plurality of second necks 118 or middle grooves 115. The plurality of second necks 118 may be arranged at regular intervals. The plurality of middle grooves 115 may be arranged at regular intervals.

The connector body 111 may be configured to have a cylindrical form. The connector body 111 may extend vertically.

Referring to FIG. 20, the reception space 11 may be formed in the housing 10 and the upper housing 13. The upper housing 13 may define the upper portion of the reception space 11.

The upper case 20 may include the side surface 22, which is open at upper and lower sides thereof, and the upper surface 21, which is disposed at the upper side of the side surface 22. The upper case 20 may be disposed above the housing 10 and outside the upper housing 13. The opening O may be formed in the upper surface 21. The opening O may be vertically formed through the upper surface 21. The upper side of the reception space 11 may be open.

The fitting groove 137 (see FIG. 3) may be outwardly depressed from the housing 10 from the reception space 11. The fitting groove 137 may be open at the upper side thereof. The fitting protrusion 337 may be fitted into the fitting groove 137.

A sloped surface 143 may be inclined downwards and toward the cartridge from the seating portion 14. The sloped surface 143 may provide a space in which the sealing cap 35 (see FIG. 2) is rotated (pivoted).

The fitting protrusion 137 may be depressed downwards from the sloped surface 143.

Referring to FIGS. 21 and 22, the cylinder 310 may be open at the upper side thereof. A cylinder cap 310C may be fitted into the open upper side of the cylinder 310. The cylinder cap 310C may include an inner part 3101, an outer part 3102, and a rim 3103. The inner part 3101 may be a ring-shaped plate. The outer part 3102 may be a ring-shaped plate, and may be positioned outside the inner part 3101. The outer part 3102 may form a single circular plate in conjunction with the inner part 3101. The rim 3103 may isolate the inner part 3101 from the outer part 3102. The rim 3103 may be a ring-shaped wall, which projects from the outer surfaces of the outer part 3102 and the inner part 3101. The evaporation passage 318 may be formed in the inner part 3101. The evaporation passage 318 may be formed through the inner part 3101.

A seal 3104 may cover the inner part 3101. The seal 3104 may be a ring-shaped plate. The seal 3104 may be in contact with the inner part 3101, and the outer circumferential surface of the seal 3104 may be in contact with the inner circumferential surface of the rim 3103. The seal 3104 may include an elastic body. For example, the seal 3104 may include rubber.

Referring to FIGS. 23 to 26, the first container 31 may be rotatable relative to the second container 32, and may be coupled or connected to the second container 32. A coupling disc 38 may be positioned between the first container 31 and the second container 32. The coupling disc 38 may be fixed to the first container 31, and may be rotatable relative to the second container 32.

The coupling disc 38 may include a body 381, a center hole 382, coupling grooves 383, and a duct 384. The body 381 may be configured to have the shape of a circular plate overall. The center hole 382 may be formed through the center of the body 381. The coupling grooves 383 may be formed in one surface of the coupling disc 38. The coupling grooves 383 may face the second container 32.

The duct 384 may include a first duct part 384a and a second duct part 384b. The first duct part 384a may be positioned adjacent to the center hole 382. The first duct part 384a may be configured to have an elongated canal or tub shape overall. The first duct part 384a may be closed at one end thereof, and may be open at the other end thereof. The second duct part 384b may be configured to have a hollow wall having an overall sector shape. The second duct part 384b may communicate with the other open end of the first duct part 384a. The second duct part 384b of the duct 384 may face the coupling groove 383 with the center hole 382 interposed therebetween.

A coupling protrusion 3253P may be formed on the outer surface of the first disc 3253. The coupling protrusion 3253P may include a plurality of coupling protrusions. The number of coupling protrusions 3253P may correspond to the number of coupling grooves 383 in the coupling disc 38. When the coupling disc 38 is fitted into the second container 32, the coupling protrusions 3253P may be fitted into the coupling grooves 383. The second duct part 384b of the duct 384 may be fitted into a disc hole 3259 in the first disc 3253. The gas that flows through the evaporation passage 318 may flow to the second container 32 via the first duct part 384a and the second duct part 384b.

Referring to FIGS. 27 to 29, the second container 32 may include the plurality of chambers 321 and 322. The plurality of chambers 321 and 322 may be partitioned into a first chamber 321a, a second chamber 321b, a third chamber 322a, and a fourth chamber 322b. The rotating shaft 325 may extend between the plurality of chambers 321 and 322. The first chamber 321a may face the third chamber 322a with the rotating shaft 325 interposed therebetween, and the second chamber 321b may face the fourth chamber 322b with the rotating shaft 325 interposed therebetween. The plurality of chambers 321 and 322 may be open at the upper and lower ends thereof.

A first chamber bottom 3211a may block the open lower end of the first chamber 321a. A second chamber bottom 3211b may block the open lower end of the second chamber 321b. A third chamber bottom 3221a may block the open lower end of the third chamber 322a. A fourth chamber bottom 3221b may block the open lower end of the fourth chamber 322b.

Chamber tubes 3212a, 3212b, 3222a, and 3222b may be formed at respective chamber bottoms 3211a, 3211b, 3221a, and 3221b. Each of the chamber tubes 3212a, 3212b, 3222a, and 3222b may be configured to have a hollow funnel shape overall. Chamber tubes 3212a, 3212b, 3222a, and 3222b may disperse the gas that flows therethrough.

A chamber cover CC may have therein holes 323, which correspond to the chamber tubes 3212a, 3212b, 3222a, and 3222b, and may be rotatable together with the chambers 321 and 322 about the rotating shaft 325. The holes 323 may be referred to as lower chamber holes 323. The chamber cover CC may be fixed to the chambers 321 and 322. The first disc 3253 may be coupled to the chamber cover CC, and may be fixed to the rotating shaft 325. The first disc hole 3259 may be aligned with the chamber tubes 3212a, 3212b, 3222a, and 3222b and the holes 323 by rotating the chambers 321 and 322.

Referring to FIGS. 30 and 31, a chamber roof 3241 may cover the upper open ends of the chambers 321 and 322 (see FIG. 27). The chamber roof 3241 may be a ring-shaped plate. The chamber roof 3241 may be rotatably coupled to the rotating shaft 325. The chamber roof 3241 may be fixed to the chambers 321 and 322, and may be rotatable together with the chambers 321 and 322. Alternatively, the chamber roof 3241 may be fixed to the rotating shaft 325, and the chambers 321 and 322 may be rotatable while contacting the chamber roof 3241. The upper chamber holes 324 may be formed in the chamber roof 3241. The number and/or positions of the upper chamber holes 324 may correspond to those of the lower chamber holes 323.

A chamber cover 3242 may face the chamber roof 3241. The chamber tubes 3243 may be positioned between the chamber cover 3242 and the chamber roof 3241. Each of the chamber tubes 3243 may be configured to have a hollow cylinder shape or a funnel shape. The diameter of each of the chamber tubes 3243 close to the chamber roof 3241 may be less than the diameter of each of the chamber tubes 3243 close to the chamber cover 3242. Consequently, gas may be dispersed while passing through the chamber tubes 3243.

Referring to FIG. 32, the second disc 327 may include an upper plate 327a and a lower plate 327b. The lower plate 327b may be coupled to the upper portion of the second container 32. The upper plate 327a may be coupled to the lower plate 327b. The second disc hole 3279 may be formed in the second disc 327 through the upper plate 327a and the lower plate 327b.

A seal 3244 may be disposed around the second disc hole 3279 between the chamber cover 3241 (see FIG. 31) and the lower plate 327b so as to seal the second disc hole 3279. The seal 3244 may be fixed to the lower plate 327b, and may be rotatable and in contact with the chamber cover 3242.

The second container 32 may be rotatable relative to the second disc 327. The upper chamber hole 324 may be moved relative to the second disc hole 3279. The gas that flows through the upper chamber holes 324 and the second disc hole 3279 may pass through the first outlet 302 formed in the container head 33.

Hereinafter, a cartridge according to another embodiment of the present disclosure will be described. Here, a description the same as the above description made with reference to FIGS. 1 to 32 will be omitted.

Referring to FIG. 33, a cartridge 300 may be fitted into the reception space 11 defined in the housing 10. An aerosol may be generated in the cartridge 300, and may be discharged to the outside through the inside of the cartridge 300.

The cartridge 300 may be disposed in the reception space 11. The cartridge 300 may include a first container 39 and a second container 32. The first container 39 may have therein a chamber configured to contain a liquid therein.

The second container 32 may be connected or coupled to the first container 39. The second container 32 may be disposed above the first container 39.

The second container 32 may be rotatably connected or coupled to the first container 39. The second container 32 may be disposed above the first container 39. The first container 39 and the second container 32 may have approximately the same diameter.

A first guide slit 3916 may be formed in the outer circumferential surface of the first container 39. The first guide slit 3916 may be depressed inwards from the outer circumferential surface of the first container 39. The first guide slit 3916 may be formed so as to extend vertically. The first guide slit 3916 may extend to the lower end from the upper end of the outer circumferential surface of the first container 39. Hereinafter, the first guide slit 3916 may be referred to as a first guide rail 3916.

When the second container 32 rotates to a predetermined position, the second guide slit 326 may be aligned with the first guide slit 3916. At this position, the lower end of the second guide slit 326 may be connected to the upper end of the first guide slit 3916.

The lower end of the second guide slit 326 may be the same width as the width of the upper end of the first guide slit 3916. The first guide slit 3916 may be widest at the lower end and/or the upper end thereof.

The first guide slit 3916 may include a plurality of first guide slits, which are arranged along the circumference of the first container 39.

The first guide slit 3916 may be referred to as a guide rail, a guide channel, or a guide groove.

A holding groove 3917 may be formed in the outer circumferential surface of the first container 39. A holding groove 317 may be depressed inwards from the outer circumferential surface of the first container 31. The holding groove 3917 may be formed 5 at a position that is spaced apart from the first guide slit 3916. The holding groove 3917 may be formed at a location that is spaced outwards apart from the first guide slit 3916. A holding protrusion 117 (see FIG. 3), which is provided at a lower portion of the reception space 11, may be fitted into the holding groove 3917 (see FIG. 3).

The holding groove 3917 may extend in the circumferential direction of the cylinder 391 (see FIG. 35). The holding groove 3917 may have a length greater than the width thereof. The holding protrusion 117 may have a length and a width corresponding to the holding groove 3917.

The holding groove 3917 may include a plurality of holding grooves. The holding grooves 3917 may include a first holding groove 3917, which is positioned at a lower level, and a second holding groove 3917, which is positioned at a higher level. The second holding groove 3917 may be disposed closer to the second container 32 than is the first holding groove 3917. The first holding groove 3917 and the second holding groove 3917 may be disposed at positions that are spaced apart from each other in a circumferential direction.

The first holding groove 3917 may include a plurality of first holding grooves. The second holding groove 3917 may include a plurality of second holding grooves.

Alternatively, the holding protrusion may be formed on the outer circumferential surface of the first container 39, and the holding groove may be formed in the lower portion of the reception space 11. The holding protrusion formed on the outer circumferential surface of the first container 39 may be fitted into the holding groove in the lower portion of the reception space 11.

Hereinafter, the holding groove or the holding protrusion 3917 formed on the outer circumferential surface of the first container 39 may be referred to as a first rotation limiter 3917, and the holding protrusion or the holding groove 117 formed in the lower portion of the reception space 11 may be referred to as a second rotation limiter 117.

The heads 117 and 119 (see FIG. 19) may hold the first container 39 in position. When the cartridge 300 is fitted into the reception space 11, the heads 117 and 119 may hold the first container 39 in position. Even when the second container 32 is rotated, the first container 39 cannot be rotated, because the heads 117 and 119 are fitted into the holding grooves 3917.

The first head 117 may be disposed at a position corresponding to a holding groove 3917 that is positioned at a lower level among the plurality of holding grooves 3917 formed in the first container 39. The second head 119 may be disposed at a position corresponding to a holding groove 3917 that is positioned at an upper level, among the plurality of holding grooves 3917 formed in the first container 39.

The cartridge 300 may be vertically fitted into the reception space 11 (see FIG. 2) in the housing 10.

The cartridge 300 may include the container head 33, which is positioned above the second container 32.

The cartridge 300 may include the mouthpiece 34, which is pivotably connected or coupled to the container head 33. The cartridge 300 may include the sealing cap 35.

When the cartridge 300 is fitted into the reception space 11, the head cover 23 of the upper case 20 may be disposed above the container head 33.

The flow sensor 60 may detect the flow of air that is introduced into the cartridge 300 via the first inlet 3901.

Referring to FIG. 34, the cartridge 300 may be fitted into the gear-fitting hole 411 formed in the cartridge gear 41. The cartridge 300 may be fitted in the direction of the rotational axis of the gear-fitting hole 411.

The inner circumferential protrusions 416 may be fitted into the first and second guide slits 3916 and 326. The inner circumferential protrusions 416 may guide the cartridge 300 in such a way that the inner circumferential protrusions 416 slide along the first and second guide slits 3916 and 326 while the cartridge 300 is fitted into the reception space 11. The first guide slit 3916 and the second guide slit 326 may sequentially come into contact with the inner circumferential protrusion 416.

The first guide slit 3916 may include a plurality of first guide slits 3916, which are arranged in the circumferential direction of the cartridge 300.

The circumferential direction of the cartridge 300 may be the same as the rotational direction of the second container 32.

When the cartridge 300 is completely fitted into the reception space 11, the holding protrusion 117 (see FIG. 12) may be fitted into the holding groove 9317, thereby holding the first container 39 in position. When the second container 32 is rotated, the first container 39 may be held in position.

The width w3 of the first guide slit 3916 may become equal to the width w2 of the lower end of the second guide slit 326 at the portion thereof that abuts the lower end of the second guide slit 326. The width w3 of the first guide slit 3916 may be equal to or greater than the width w1 of the upper part of the second guide slit 326. The width w3 of the first guide slit 316 may be greater than the width w0 (see FIG. 13) of the inner circumferential protrusion 416.

Accordingly, even when the cartridge 300 is fitted into the gear-fitting hole 411 in the state in which the first guide slit 3916 is misaligned with the second guide slit 326, the inner circumferential protrusion 416 slides along the side surfaces of the first guide slit 3916 and the second guide slit 326, thereby aligning the first guide slit 3916 with the second guide slit 326.

Consequently, since the first disc hole 3259 precisely communicates with the lower chamber hole 323, it is possible to prevent a decrease in aerosol flow efficiency.

A cap 396 may form the bottom surface of the cartridge 300. The cap 396 may be referred to as a plug 396. The cap 396 may be referred to as a lower cap 396. The cap 396 may be disposed below the cylinder 391 (see FIG. 35). The cap 396 may be coupled or bonded to the cylinder 391. The cap 396 may be fixed to the cylinder 391. A fitting hole 3907 may be formed in the cap 396 so as to be depressed upwards. The fitting hole 3907 may be spaced apart from the center of the cap 396. The fitting hole 3907 may be spaced apart from a line extending from the rotating shaft of the second container 32. Hereinafter, the fitting hole 3907 may be referred to as a fitting groove 3907.

The fitting hole 3907 may be located at a position corresponding to the fitting protrusion 167 (see FIG. 18). When the cartridge 300 is fitted into the reception space 11, the fitting protrusion 167 may be fitted into the fitting hole 3907.

A second terminal 3904 may be disposed on the bottom surface of the cap 396. The second terminal 3904 may be composed of a pair of second terminals, which are spaced apart from the center of the cap 396 by the same distance. The second terminal 3904 may be electrically connected to a heater 394.

The first terminal 164 may be disposed at a position corresponding to a second terminal 3304. When the cartridge 300 is fitted into the reception space 11, the second terminal 3904 may come into contact with the first terminal 164, thereby establishing electrical connection therebetween. The first terminal 164 may transmit power to the second terminal 3904 such that the heater 394 heats a wick 393.

The first inlet 3901 may be formed in the bottom of the cartridge 300. The first inlet 3901 may be formed in the cap 396. The first inlet 3901 may be formed in the bottom 3961 of the cap 396. The first inlet 3901 may include a plurality of first inlets.

Referring to FIG. 35, the cartridge 300 may be vertically fitted into the reception space 11 (see FIG. 2) in the housing 10.

The first container 39 may include the cylinder 391, which extends longitudinally. The cylinder 391 may define the outer surface of the first container 39. The cylinder 391 may have therein a liquid chamber 3911 (see FIG. 36). The cylinder 391 may be open at the lower side thereof.

The cap 396 may be coupled to the lower portion of the cylinder 391. The cap 396 may cover the lower open side of the cylinder 391.

A seal 398 may be disposed between the cylinder 391 and the cap 396. A groove may be formed in the cap, and the seal 398 may be fitted in the groove.

An evaporation housing 392 may be disposed in the first container 39. The evaporation housing 392 may be disposed in the cylinder 391.

The evaporation housing 392 may partition the internal space in the cylinder 391 into the liquid chamber 3911 and an air chamber 3921. The liquid chamber 3911 may be formed between the evaporation housing 392 and the cylinder 391. The air chamber 3921 may be formed between the evaporation housing 392 and the cap 396.

The prevaporized aerosol material may be received in the liquid chamber 311. The prevaporized aerosol material may be liquid.

The evaporation housing 392 may receive therein the wick 393. The evaporation housing 392 may be provided therein with a wick-receiving space. The wick 393 may be disposed in the wick-receiving space. The wick-receiving space may be connected to the liquid chamber 3911. The wick-receiving space may communicate with the liquid chamber 3911. The wick-receiving space may have a shape corresponding to that of the wick 393. The wick-receiving space may be open downwards.

The wick 393 may be disposed in the first container 39. The wick 393 may be disposed in the cylinder 391. The wick 393 may be disposed in the center of the cylinder 391. The wick 393 may extend in the longitudinal direction of the cylinder 391.

The wick 393 may be disposed in the evaporation housing 392. The wick 393 may be fitted into the evaporation housing 392.

The wick 393 may absorb prevaporized aerosol material. The wick 393 may include a porous ceramic material. The wick 393 may be made of a ceramic material. The wick 393 may be porous. The wick 393 may be made of a porous ceramic material. The wick 393 may absorb the prevaporized aerosol material that is introduced into the evaporation housing 392.

The wick 393 may have a hollow cavity. The hollow cavity may be formed through the wick 393 in the longitudinal direction of the wick 393. The hollow cavity may be formed in the center of the cylinder 391. The hollow cavity may communicate with the air chamber 3921. The hollow cavity may be referred to as an evaporation passage 3935 (see FIG. 36).

The heater 394 may heat the prevaporized aerosol material. The heater 394 may evaporate the prevaporized aerosol material. The heater 394 may heat the prevaporized aerosol material that is absorbed in the wick 393. The heater 394 may heat the wick 313 to evaporate the prevaporized aerosol material that is absorbed in the wick to thus generate an aerosol.

The heater 394 may heat the wick 393. The heater 394 may be fitted into the wick 393. The heater 394 may be connected to the second terminal 3904.

The heater 394 may be electrically connected to the controller 70 (see FIG. 3). The controller 70 may control the operation of the heater 394. The controller 70 may control the heater 394 to heat the wick 393 to generate an aerosol.

A support 397 may be disposed below the wick 393. The support 397 may support the wick 393. The support 397 may be disposed below the evaporation housing 392. The support 397 may be disposed between the evaporation housing 392 and the cap 396.

The container shaft 325 may be disposed above the first container 39. The container shaft 325 may be coupled or bonded to the first container 39. The container shaft 325 may be fixed to the first container 39.

The first disc 3253 may be disposed above the first container 39. The first disc 3253 may be coupled or bonded to the first container 39. The first disc 3253 may be fixed to the first container 39.

The first container 39 and the container head 33 may be connected to each other via the container shaft 325. The first container 39 and the container head 33 may be held in relative rotational position. The first container 39, the container head 33, and the container shaft 325 may be fixed to one another.

The second container 32 may be rotatable relative to the first container 39.

The first container 39 and the second container 32 may be connected to each other via a first connecting passage 319. The first connecting passage 319 may be positioned between the first container 39 and the second container 32. The first connecting passage 319 may be positioned above the evaporation passage 3935. The first connecting passage 319 may communicate with the evaporation passage 3935.

The first inlet 3901 (see FIG. 37) may be formed in the lower portion of the first container 39. The first inlet 3901 may communicate with the air chamber 3921. The air chamber 3921 may be positioned above the first inlet 3901.

A user may inhale air through the mouthpiece 34. Air may be discharged upwards through the first outlet 302. The passage formed in the cartridge 300 may be referred to as a first passage or a cartridge passage. The first passage may communicate with the first inlet 301 and the first outlet 302. The air that is introduced through the first inlet 3901 may be discharged from the first outlet 302 through the first passage. The first passage may be formed by connecting one of the plurality of chambers in the second container 32 to the passage formed in the first container 39.

Referring to FIGS. 36 and 37, the cylinder 391 may include a cylindrical outer wall 3910. The outer wall 3910 may be open at upper and lower sides thereof.

An upper cap 3912 may be disposed at the upper portion of the cylinder 391. The upper cap 3912 may be disposed at the upper open side of the outer wall 3910. The upper cap 3912 may be disposed in the width direction of the cylinder 391. The upper cap 3912 may cover the upper open side of the outer wall 3910. The upper cap 3912 may be disposed above the liquid chamber 3911. The upper cap 3912 may serve as the upper surface of the liquid chamber 3911.

Connecting pipes 3913 and 3914 may extend from the upper cap 3912 in the longitudinal direction of the cylinder 391. The connecting pipes 3913 and 3914 may be disposed in the central axis of the cylinder 391. The connecting pipes 3913 and 3914 may be positioned in the center of the upper cap 3912. The connecting pipes 3913 and 3914 may be coupled to a coupler 3927 of the evaporation housing 392.

The connecting pipes 3913 and 3914 may be fitted into the coupler 3927 of the evaporation housing 392.

The first connecting pipe 3913 may project upwards from the upper cap 3912.

The second connecting pipe 3914 may project downwards from the upper cap 3912. The second connecting pipe 3914 may be coupled to the coupler 3927 of the evaporation housing 392. The second connecting pipe 3914 may be fitted into the coupler 3927 of the evaporation housing 392.

A discharge passage 3915 may be formed in the connecting pipes 3913 and 3914. The discharge passage 3915 may communicate with the evaporation passage 3935. The discharge passage 3915 may be connected to the evaporation passage 3935. The discharge passage 3915 may communicate with the first connecting passage 319. The discharge passage 3915 may be connected to the first connecting passage 319. The discharge passage 3915 may guide the aerosol discharged from the evaporation passage 3935, toward the first connecting passage 319.

The upper end 3918 of the cylinder 391 may extend from the outer wall 3910 in the longitudinal direction of the cylinder 391. The upper end 3918 of the cylinder 391 may extend from the outer periphery of the upper cap 3912 in the longitudinal direction of the cylinder 391. The upper end 3918 of the cylinder 391 and the outer wall 3910 may form a continuous surface. The upper end 3918 of the cylinder 391 may be referred to as an upper rim 3918.

A wick housing 3920 may be disposed in the cylinder 391. The wick housing 3920 may extend in the longitudinal direction of the cylinder 3910. The wick housing 3920 may have therein the wick-receiving space. The wick housing 3920 may surround the wick 393.

An introduction inlet 3922 may be formed in the wick housing 3920. The introduction inlet 3922 may be formed in the lower portion of the wick housing 3920.

The introduction inlet 3922 may extend in the radial direction of the cylinder 391. The introduction inlet 3922 may be connected to the wick-receiving space. The introduction inlet 3922 may be connected to the liquid chamber 3911. The introduction inlet 3922 may connect the wick-receiving space with the liquid chamber 3911.

A projection 3924 may project inwards from the upper portion of the wick housing 392. The projection 3924 may be disposed on the inner circumferential surface of the wick housing 3924. The projection 3924 may be configured to have a ring shape.

The projection 3924 may be disposed below the connecting pipes 3913 and 3914. The projection 3924 may be disposed below the second connecting pipe 3914. The projection 3924 may be disposed above the wick 393. The projection 3924 may be disposed between the wick 393 and the connecting pipes 3913 and 3914.

A connecting passage 3925 may be formed in the center of the projection 3924. The connecting passage 3925 may be connected to the discharge passage 3915. The connecting passage 3925 may be connected to the evaporation passage 3935. The connecting passage 3925 may connect the evaporation passage 3935 with the discharge passage 3915.

The connecting passage 3925 may communicate with the discharge passage 3915. The connecting passage 3925 may communicate with the evaporation passage 3935. The connecting passage 3925 may allow the evaporation passage 3935 to communicate with the discharge passage 3915.

The coupler 3927 may extend from the wick housing 3920 in the longitudinal direction of the wick housing 3920. The coupler 3927 may be coupled to the connecting pipes 3913 and 3914. The coupler 3927 may be coupled to the second connecting pipe 3914. The coupler 3927 may surround the second connecting pipe 3914. The second connecting pipe 3914 may be fitted into the coupler 3927.

A partition 3928 may be disposed in the cylinder 391. The partition 3928 may be disposed below the wick housing 3920.

The partition 3928 may extend in the radial direction of the cylinder 391. The partition 3928 may extend in the radial direction of the cylinder 391 below the lower portion of the wick housing 3920. The outer surface of the partition 3928 may be in contact with the inner surface of the cylinder 391.

The partition 3928 may isolate the liquid chamber 3911 from the air chamber 3921. The partition 3928 may partition the internal space in the cylinder 391 into the liquid chamber 3911 and the air chamber 3921.

The upper surface of the partition 3928 may define the lower end of the liquid chamber 3911. The upper surface of the partition 3928 may be inclined in the radial direction of the cylinder 391. The upper surface of the partition 3928 may be inclined upwards moving toward the cylinder 391 from the wick 393.

The introduction inlet 3922 may abut on the upper surface of the partition 3928. The lower portion of the introduction inlet 3922 may be positioned on the upper surface of the partition 3928.

Consequently, the liquid in the liquid chamber 3911 may easily flow into the introduction inlet 3922.

An outer rim 3929 may project downwards from the outer periphery of the partition 3928. The outer rim 3929 may extend in the circumferential direction of the cylinder 391. The outer rim 3929 may be configured to have a ring shape.

The outer rim 3929 may be disposed between the cylinder 391 and a rim 3967 of the cap 396. The outer rim 3929 may be in contact with the inner circumferential surface of the cylinder 391. The outer rim 3929 may be in contact with the rim 3967. The rim 3957 may be spaced apart from the cylinder 391 so as to define a groove therebetween to thus allow the outer rim 3929 to be fitted into the groove.

The wick 393 may be disposed in the wick housing 3920.

The evaporation passage 3935 may be formed in the wick 393. The evaporation passage 3935 may be formed through the wick 393. The evaporation passage 3935 may extend in the longitudinal direction of the wick 393.

The evaporation passage 3935 may be connected to the air chamber 3921. The evaporation passage 3935 may communicate with the air chamber 3921. The evaporation passage 3935 may be connected to an inlet passage 3975. The evaporation passage 3935 may communicate with the air chamber 3921 via the inlet passage 3975.

The evaporation passage 3935 may be connected to the discharge passage 3915. The evaporation passage 3935 may communicate with the discharge passage 3915. The evaporation passage 3935 may be connected to the connecting passage 3925. The evaporation passage 3935 may be connected to the inlet passage 3975 via the connecting passage 3925.

The heater 394 may include a coil 3941 surrounding the evaporation passage 3953. The coil 3941 may heat the wick 393. The coil 3941 may be fitted into the wick 393. The coil 3941 may be configured to have a spiral shape, and may extend in the longitudinal direction of the wick 393. The coil 3941 may be configured to have the shape of a spiral surrounding the evaporation passage 3945.

A wire 3944 may be connected to the coil 3941. The wire 3944 may be connected to the second terminal 3904. The wire 3944 may connect the coil 3941 to the second terminal 3904. The wire 3944 may extend through the support 397.

The support 397 may be disposed below the wick 393. The support 397 may be disposed below the partition 3928.

The support 397 may include a plate 3971, which is disposed below the partition 3928. The support 397 may include a ring 3973, which is disposed above the bottom 3961 of the cap 396. The support 397 may include a bridge 3972 connecting the plate 3971 to the ring 3973.

The plate 3971 may be disposed below the partition 3928. The plate 3971 may be disposed inside the rim 3967 of the cap 396. The plate 3971 may support the wire 3944.

The inlet passage 3975 may be formed through the support 397. The inlet passage 3975 may be formed through the plate 3971. The inlet passage 3975 may be connected to the air chamber 3921. The inlet passage 3975 may be connected to the evaporation passage 3935. The inlet passage 3975 may connect the air chamber 3921 with the evaporation passage 3935.

The inlet passage 3975 may communicate with the air chamber 3921. The inlet passage 3975 may communicate with the evaporation passage 3935. The inlet passage 3975 may allow the air chamber 3921 to communicate with the inlet passage 3975.

The inlet passage 3975, the evaporation passage 3935, the connecting passage 3925, and the discharge passage 3915 may define a single passage 395. The inlet passage 3975, the evaporation passage 3935, the connecting passage 3925, and the discharge passage 3915 may be connected to one another so as to connect the air chamber 3921 to the first connecting passage 319. The inlet passage 3975, the evaporation passage 3935, the connecting passage 3925, and the discharge passage 3915 may extend in the longitudinal direction of the cylinder 391. The inlet passage 3975, the evaporation passage 3935, the connecting passage 3925, and the discharge passage 3915 may be substantially the same width.

A container passage 395 may connect the air chamber 3921 to the first connecting passage 319. The container passage 395 may be positioned at the central axis of the cylinder 391, and may extend in the longitudinal direction of the cylinder 391. The container passage 395 may include the evaporation passage 3935. The container passage 395 may include the discharge passage 3915. The container passage 395 may include the connecting passage 3925. The container passage 395 may include the inlet passage 3975.

The ring 3973 may extend in the circumferential direction of the cylinder 391. The ring 3973 may be disposed inside a connector 3965 of the cap 396. The ring 3973 may be in contact with the connector 3965 of the cap 396.

The ring 3973 may be disposed above the cap 396. The ring 3973 may be disposed above the bottom 3961.

The bridge 3972 may connect the ring 3973 to the plate 3971. The bridge 3972 may be oriented in the longitudinal direction of the cylinder 391. The bridge 3972 may include a plurality of bridges. The plurality of bridges 3972 may be spaced apart from each other in a circumferential direction of the ring 3973.

A protrusion 3978 may project outwards from the plate 3971. A groove 3968 may be formed as a depression in the inner surface of the cap 396. The groove 3968 may be formed as a depression in the inner surface of the rim 3967 or the connector 3965. The protrusion 3978 may be fitted into the groove 3968.

The cap 396 may define the bottom 3961 of the cartridge 300. The cap 396 may define the bottom 3961 of the first container 39. The bottom 3961 may be disposed below the cylinder 391. The bottom 3961 may be coupled to the lower portion of the cylinder 391. The bottom 3961 may cover the lower open side of the cylinder 391.

A boss 3964 may project upwards from the bottom 3961. The boss 3964 may project from the bottom 3961 in the longitudinal direction of the cylinder 391. The boss 3964 may surround the second terminal 3904. The boss 3964 may fix the second terminal 3904 to the cap 396.

The second terminal 3904 may extend through the cap 396. The second terminal 3904 may extend through the boss 3964. The second terminal 3904 may be coupled to the boss 3964. The second terminal 3904 may be fixed to the boss 3964. The second terminal 3904 may be exposed to the outside of the cartridge 300.

A first extension 3962 may project upwards from the bottom 3961. The first extension 3962 may project from the bottom 3961 in the longitudinal direction of the cylinder 391. The first extension 3962 may surround the first inlet 3901.

The first inlet 3901 may be formed through the cap 396. The first inlet 3901 may be formed through the bottom 3961. The first inlet 3901 may be formed through the first extension 3962. The first inlet 3901 may be connected to the air chamber 3922. The first inlet 3901 may communicate with the air chamber 3922.

The cap 396 may include the connector 3965, which projects upwards from the bottom 3961. The connector 3965 may extend in the circumferential direction of the cylinder 391. The connector 3965 may be fitted into the cylinder 391. The connector 3965 may be fitted into the lower open side of the cylinder 391. The connector 3965 may be in contact with the inner surface of the cylinder 391.

A groove may be formed in the outer surface of the connector 3965 so as to be depressed. The groove may extend in the circumferential direction of the connector 3965. The groove may have a ring shape.

The seal 398 may be fitted into the groove. The seal 398 may be configured to have a ring shape. The seal 398 may prevent the entry of air through the gap between the cylinder 391 and the cap 396. The seal 398 may prevent the liquid in the liquid chamber 3911 from leaking in the downward direction of the cartridge 300.

The cap 396 may include the rim 3967, which projects upwards from the connector 3965. The rim 3967 may extend in a circumferential direction of the cylinder 391. The rim 3967 may be spaced apart from the cylinder 391. The lower rim 3929 may be fitted into the cap between the rim 3967 and the cylinder 391.

FIG. 38 is a cross-sectional view of the coil 3941.

Referring to FIG. 38, the wick 393 may have therein the hollow cavity 3935, and may extend in a longitudinal direction. The wick 393 may be configured to have a hollow cylindrical form. The wick 393 may extend in the longitudinal direction of the cylinder 391.

The hollow cavity 3935 may also be referred to as the evaporation passage 3935. The evaporation passage 3935 may be defined by the inner surface 393$i$ of the wick 393.

The heater 394 may be positioned between the inner surface 393$i$ and the outer surface 393$o$ of the wick 393.

A groove 3934 may be formed by removing a portion of the inner surface 393$i$ of the wick 393. The groove 3934 may expose the heater 394 to the inside of the wick 393.

The groove 3934 may be formed as a depression in the inner circumferential surface of the wick 393. The groove 3934 may extend in the longitudinal direction of the wick 393.

The outer portion 3931 of the wick 393 may be configured to have a cylindrical form. The outer portion 3931 may extend in the longitudinal direction of the cylinder 391. The outer portion 3931 may surround the evaporation passage

3935. The outer portion 3931 may surround the heater 394. The outer portion 3931 may surround the coil 3941.

The inner portion 3933 of the wick 393 may project inwards from the outer portion 3931. The inner portion 3933 may project toward the evaporation passage 3935 from the outer portion 3931. The inner portion 3933 may extend in the longitudinal direction of the wick 393.

The groove 3934 may be formed as a depression in the inner portion 3933.

The inner portion 3933 may include a plurality of inner portions 3933. The plurality of inner portions 3933 may be spaced apart from each other in the circumferential direction of the wick 393. The groove 3934 may be defined between the plurality of inner portions 3933, which are spaced apart from each other.

The wick 393 may be divided into the outer portion 3931 and the inner portion 3933. The heater 394 may be positioned between the outer portion 3931 and the inner portion 3933. The coil 3941 may be positioned between the outer portion 3931 and the inner portion 3933.

The heater 394 may be embedded in the wick 393. A first portion 3942 of the heater 394 may not be exposed to the groove 3934. A second portion 3943 of the heater 394 may be exposed to the groove 3934. The second portion 3943 of the heater 394 may be exposed to the evaporation passage 3935 via the groove 3934.

The heater 394 may surround the evaporation passage 3935. The heater 394 may surround the inner portion 3933. The heater 394 may be disposed outside the inner portion 3933.

The coil 3941 may surround the evaporation passage 3935. The coil 3941 may surround the inner portion 3933. The coil 3941 may be disposed outside the inner portion 3933. The coil 3941 may be disposed inside the outer portion 3941.

The first portion 3942 may be disposed outside the inner portion 3933. The first portion 3942 may be disposed inside the outer portion 3931. The first portion 3942 may be disposed between the inner portion 3933 and the outer portion 3931.

The second portion 3943 may be disposed inside the outer portion 3931. The second portion 3943 may be positioned at the groove 3934.

Consequently, an aerosol may easily flow along the evaporation passage 3935.

Referring to FIG. 39, the coil 3941 may be configured to have the shape of a spiral surrounding the evaporation passage 3935 (see FIG. 36). The coil 3941 may extend like a spiral, and may extend in the longitudinal direction of the wick 393.

The coil 3941 may positioned at the upper portion of the wick 393. The coil 3941 may be disposed adjacent to the outlet 3937 (see FIG. 37) in the evaporation passage 3935. The coil 3941 may be disposed closer to the outlet 3937 of the evaporation passage 3935 than to the inlet 3936 (see FIG. 37) of the evaporation passage 3935.

Consequently, an aerosol, which is heated to a high temperature, may be introduced into the second container 32.

Referring to FIG. 40, the coil 3941 may be configured to have the shape of a spiral surrounding the evaporation passage 3935 (see FIG. 36). The coil 3941 may extend like a spiral, and may extend in the longitudinal direction of the wick 393.

The coil 3941 may be close to the inlet 3936 (see FIG. 37) in the evaporation passage 3935, and may be close to the outlet 3937 (see FIG. 37) in the evaporation passage 3935.

The coil 3941 may extend from a position adjacent to the inlet 3936 to a position adjacent to the outlet 3937 through the intermediate position of the wick 393 in the longitudinal direction. The end of the coil 3941 that is adjacent to the inlet 3936 may be closer to the inlet 3936 than to the intermediate position. The other end of the coil 3941 adjacent to the outlet 3937 may be closer to the outlet 3937 than to the intermediate position.

Consequently, it is possible to increase the heated region of the wick 393 and thus to increase an amount of generated aerosol.

In addition, an aerosol heated to a high temperature, may be introduced into the second container 32.

Referring to FIGS. 41 and 42, the cylinder 391 may be open at the upper side thereof. The cylinder cap 310C may be fitted into the upper open side of the cylinder 391. The discharge passage 3915 may be formed in the inner part 3101. The discharge passage 3915 may be formed through the inner part 3101.

Referring to FIGS. 43 and 44, the first container 39 may be rotatable relative to the second container 32, and may be coupled or connected to the second container 32. A coupling disc 38 may be positioned between the first container 39 and the second container 32. The coupling disc 38 may be fixed to the first container 39, and may be rotatable relative to the second container 32.

FIG. 45 is a block diagram of an aerosol-generating device according to an embodiment of the present disclosure.

Referring to FIG. 45, an aerosol-generating device 1000 may include a communication interface 1010, an input/output interface 1020, an aerosol-generating module 1030, a memory 1040, a sensor module 1050, a battery 1060 (e.g. the battery 50 shown in FIG. 3), and/or a controller 1070 (e.g. the controller 70 shown in FIG. 3).

In one embodiment, the aerosol-generating device 1000 may be composed only of a main body (e.g. the housing 10 and the upper case 20 shown in FIG. 1). In this case, the components included in the aerosol-generating device 1000 may be located in the main body. In another embodiment, the aerosol-generating device 1000 may be composed of a cartridge (e.g. the cartridge 30 shown in FIG. 2), which contains an aerosol-generating substance, and a main body (e.g. the housing 10 and the upper case 20 shown in FIG. 2). In this case, the components included in the aerosol-generating device 1000 may be located in at least one of the main body or the cartridge.

The communication interface 1010 may include at least one communication module for communication with an external device and/or a network. For example, the communication interface 1010 may include a communication module for wired communication, such as a Universal Serial Bus (USB). For example, the communication interface 1010 may include a communication module for wireless communication, such as Wireless Fidelity (Wi-Fi), Bluetooth, Bluetooth Low Energy (BLE), ZigBee, or nearfield communication (NFC).

The input/output interface 1020 may include an input device (not shown) for receiving a command from a user and/or an output device (not shown) for outputting information to the user. For example, the input device may include a touch panel, a physical button, a microphone, or the like. For example, the output device may include a display device for outputting visual information, such as a display or a light-emitting diode (LED), an audio device for outputting auditory information, such as a speaker or a buzzer, a motor for outputting tactile information such as a haptic effect (e.g. the vibration motor 90 shown in FIG. 3), or the like.

The input/output interface 1020 may transmit data corresponding to a command input by the user through the input device to another component (or other components) of the aerosol-generating device 1000, and may output information corresponding to data received from another component (or other components) of the aerosol-generating device 1000 through the output device.

The aerosol-generating module 1030 may generate an aerosol from an aerosol-generating substance. Here, the aerosol-generating substance may be a substance in a liquid state, a solid state, or a gel state, which is capable of generating an aerosol, or a combination of two or more aerosol-generating substances.

According to an embodiment, the liquid aerosol-generating substance may be a liquid including a tobacco-containing material having a volatile tobacco flavor component. According to another embodiment, the liquid aerosol-generating substance may be a liquid including a non-tobacco material. For example, the liquid aerosol-generating substance may include water, solvents, nicotine, plant extracts, flavorings, flavoring agents, vitamin mixtures, etc.

The solid aerosol-generating substance may include a solid material based on a tobacco raw material such as a reconstituted tobacco sheet, shredded tobacco, or granulated tobacco. In addition, the solid aerosol-generating substance may include a solid material having a taste control agent and a flavoring material. For example, the taste control agent may include calcium carbonate, sodium bicarbonate, calcium oxide, etc. For example, the flavoring material may include a natural material such as herbal granules, or may include a material such as silica, zeolite, or dextrin, which includes an aroma ingredient.

In addition, the aerosol-generating substance may further include an aerosol-forming agent such as glycerin or propylene glycol.

The aerosol-generating module 1030 may include at least one heater (e.g. the heater 314 shown in FIG. 3).

The aerosol-generating module 1030 may include an electro-resistive heater. For example, the electro-resistive heater may include at least one electrically conductive track, and may be heated as current flows through the electrically conductive track. At this time, the aerosol-generating substance may be heated by the heated electro-resistive heater.

The electrically conductive track may include an electro-resistive material. In one example, the electrically conductive track may be formed of a metal material. In another example, the electrically conductive track may be formed of a ceramic material, carbon, a metal alloy, or a composite of a ceramic material and metal.

The electro-resistive heater may include an electrically conductive track that is formed in any of various shapes. For example, the electrically conductive track may be formed in any one of a tubular shape, a plate shape, a needle shape, a rod shape, and a coil shape.

The aerosol-generating module 1030 may include a heater that uses an induction-heating method. For example, the induction heater may include an electrically conductive coil, and may generate an alternating magnetic field, which periodically changes in direction, by adjusting the current flowing through the electrically conductive coil. At this time, when the alternating magnetic field is applied to a magnetic body, energy loss may occur in the magnetic body due to eddy current loss and hysteresis loss, and the lost energy may be released as thermal energy. Accordingly, the aerosol-generating substance located adjacent to the magnetic body may be heated. Here, an object that generates heat due to the magnetic field may be referred to as a susceptor.

Meanwhile, the aerosol-generating module 1030 may generate ultrasonic vibrations to thereby generate an aerosol from the aerosol-generating substance.

The aerosol-generating module 1030 may be referred to as a cartomizer, an atomizer, or a vaporizer.

The memory 1040 may store therein a program for processing and controlling each signal in the controller 1070, and may store therein processed data and data to be processed.

For example, the memory 1040 may store therein applications designed for the purpose of performing various tasks that can be processed by the controller 1070, and may selectively provide some of the stored applications in response to the request from the controller 1070.

For example, the memory 1040 may store therein data on the operation time of the aerosol-generating device 1000, the maximum number of puffs, the current number of puffs, at least one temperature profile, at least one electric power profile, and the user's inhalation pattern. Here, "puff" means inhalation by the user, and "inhalation" means the user's act of taking air or other substances into the user's oral cavity, nasal cavity, or lungs through the user's mouth or nose.

The memory 1040 may include at least one of volatile memory (e.g. dynamic random access memory (DRAM), static random access memory (SRAM), or synchronous dynamic random access memory (SDRAM)), nonvolatile memory (e.g. flash memory), a hard disk drive (HDD), or a solid-state drive (SSD).

The sensor module 1050 may include at least one sensor.

For example, the sensor module 1050 may include a sensor for sensing a puff (hereinafter referred to as a "puff sensor"). In this case, the puff sensor may be implemented as a pressure sensor or the flow sensor 60.

For example, the sensor module 1050 may include a voltage sensor for sensing voltage applied to a component (e.g. the battery 1060) provided in the aerosol-generating device 1000 and/or a current sensor for sensing current.

For example, the sensor module 1050 may include a sensor for sensing the temperature of the heater included in the aerosol-generating module 1030 and the temperature of the aerosol-generating substance (hereinafter referred to as a "temperature sensor"). In this case, the heater included in the aerosol-generating module 1030 may also serve as the temperature sensor. For example, the electro-resistive material of the heater may be a material having a predetermined temperature coefficient of resistance. The sensor module 1050 may measure the resistance of the heater, which varies according to the temperature, to thereby sense the temperature of the heater.

For example, in the case in which the main body of the aerosol-generating device 1000 is formed to allow a cigarette to be inserted thereinto, the sensor module 1050 may include a sensor for sensing insertion of the cigarette (hereinafter referred to as a "cigarette detection sensor").

For example, in the case in which the aerosol-generating device 1000 includes a cartridge, the sensor module 1050 may include a sensor for sensing mounting and demounting of the cartridge to and from the main body and the position of the cartridge (hereinafter referred to as a "cartridge detection sensor").

For example, in the case in which the second container 32 of the cartridge is rotatable, the sensor module 1050 may include a sensor for outputting a signal indicating rotation of the second container 32 (hereinafter referred to as a "rotation detection sensor").

The cigarette detection sensor, the cartridge detection sensor, and/or the rotation detection sensor may be implemented as an inductance-based sensor, a capacitive sensor, a resistance sensor, or a Hall sensor (or Hall IC) using a Hall effect.

The first terminal 164, which is included in the main body of the aerosol-generating device 1000 and transmits electric power to the cartridge, may serve as the cartridge detection sensor. For example, the sensor module 1050 may sense mounting and demounting of the cartridge to and from the main body based on the current flowing through the first terminal 164 or the voltage applied to the first terminal 164.

The rotary switch 44, which is mounted coaxially with the dial gear 42 and/or the dial 43 and outputs an electric signal indicating rotation of the dial gear 42 and/or the dial 43, may serve as the rotation detection sensor.

The battery 1060 may supply electric power used for operation of the aerosol-generating device 1000 under the control of the controller 1070. The battery 1060 may supply electric power to other components provided in the aerosol-generating device 1000, for example, the communication module included in the communication interface 1010, the output device included in the input/output interface 1020, and the heater included in the aerosol-generating module 1030.

The battery 1060 may be a rechargeable battery or a disposable battery. For example, the battery 1060 may be a lithium-ion battery or a lithium polymer (Li-polymer) battery. However, the present disclosure is not limited thereto. For example, when the battery 1060 is rechargeable, the charging rate (C-rate) of the battery 1060 may be 10 C, and the discharging rate (C-rate) thereof may be 10 C to 20 C. However, the present disclosure is not limited thereto. Also, for stable use, the battery 1060 may be manufactured such that 80% or more of the total capacity may be ensured even when charging/discharging is performed 2000 times.

The aerosol-generating device 1000 may further include a battery protection circuit module (PCM) (not shown), which is a circuit for protecting the battery 1060. The battery protection circuit module (PCM) may be disposed adjacent to the upper surface of the battery 1060. For example, in order to prevent overcharging and overdischarging of the battery 1060, the battery protection circuit module (PCM) may cut off the electrical path to the battery 1060 when a short circuit occurs in a circuit connected to the battery 1060, when an overvoltage is applied to the battery 1060, or when an overcurrent flows through the battery 1060.

The aerosol-generating device 1000 may further include a charging terminal (not shown) to which electric power supplied from the outside is input. For example, a power line may be connected to the charging terminal, which is disposed at one side of the main body of the aerosol-generating device 1000, and the aerosol-generating device 1000 may use the electric power supplied through the power line connected to the charging terminal to charge the battery 1060. In this case, the charging terminal may be a wired terminal for USB communication.

The aerosol-generating device 1000 may wirelessly receive electric power supplied from the outside through the communication interface 1010. For example, the aerosol-generating device 1000 may wirelessly receive electric power using an antenna included in the communication module for wireless communication, and may charge the battery 1060 using the wirelessly supplied electric power.

The controller 1070 may control the overall operation of the aerosol-generating device 1000. The controller 1070 may be connected to each of the components provided in the aerosol-generating device 1000, and may transmit and/or receive a signal to and/or from each of the components, thereby controlling the overall operation of each of the components.

The controller 1070 may include at least one processor, and may control the overall operation of the aerosol-generating device 1000 using a processor included therein. Here, the processor may be a general processor such as a central processing unit (CPU). Of course, the processor may be a dedicated device such as an application-specific integrated circuit (ASIC), or may be any of other hardware-based processors.

The controller 1070 may perform any one of a plurality of functions of the aerosol-generating device 1000. For example, the controller 1070 may perform any one of a plurality of functions of the aerosol-generating device 1000 (e.g. a preheating function, a heating function, a charging function, and a cleaning function) according to the state of each of the components provided in the aerosol-generating device 1000 and the user's command received through the input/output interface 1020.

The controller 1070 may control the operation of each of the components provided in the aerosol-generating device 1000 based on data stored in the memory 1040. For example, the controller 1070 may control the supply of a predetermined amount of electric power from the battery 1060 to the aerosol-generating module 1030 based on data on the temperature profile, the electric power profile, and the user's inhalation pattern, stored in the memory 1040.

The controller 1070 may determine the occurrence or non-occurrence of a puff using the puff sensor included in the sensor module 1050. For example, the controller 1070 may check a temperature change, a flow change, a pressure change, and a voltage change in the aerosol-generating device 1000 based on the values sensed by the puff sensor, and may determine the occurrence or non-occurrence of a puff based on the result of checking.

The controller 1070 may control the operation of each of the components provided in the aerosol-generating device 1000 according to the occurrence or non-occurrence of a puff and/or the number of puffs.

Upon determining that a puff has occurred, the controller 1070 may perform control such that a predetermined amount of electric power is supplied to the heater according to the electric power profile stored in the memory 1040. For example, the controller 1070 may supply electric power to the heater in a preset amount per unit time during a predetermined heating time based on the electric power profile stored in the memory 1040.

The controller 1070 may perform control such that the temperature of the heater is changed or maintained based on the temperature profile stored in the memory 1040.

For example, the controller 1070 may perform control such that a current pulse having a predetermined frequency and a predetermined duty ratio is supplied to the heater using a pulse width modulation (PWM) method. In this case, the controller 1070 may control the amount of electric power supplied to the heater by adjusting the frequency and the duty ratio of the current pulse.

For example, the controller 1070 may determine a target temperature to be controlled based on the temperature profile. In this case, the controller 1070 may control the amount of electric power supplied to the heater using a proportional-integral-differential (PID) method, which is a feedback control method using a difference value between the temperature of the heater and the target temperature, a value obtained by integrating the difference value with respect to time, and a value obtained by differentiating the difference value with respect to time.

Although the PWM method and the PID method are described as examples of a method of controlling the supply of electric power to the heater, the present disclosure is not limited thereto, and may employ any of various control methods, such as a proportional-integral (PI) method or a proportional-differential (PD) method.

The controller 1070 may perform control such that the supply of electric power to the heater is interrupted according to a predetermined condition. For example, the controller 1070 may perform control such that the supply of electric power to the heater is interrupted when a cigarette is removed, when the cartridge is demounted, when the number of puffs reaches a preset maximum number of puffs, when a puff is not sensed during a preset period of time or longer, or when the remaining capacity of the battery 1060 is less than a predetermined value.

The controller 1070 may calculate the remaining capacity with respect to the electric power stored in the battery 1060. For example, the controller 1070 may calculate the remaining capacity of the battery 1060 based on the values sensed by the voltage sensor and/or the current sensor included in the sensor module 1050.

The controller 1070 may update data on the cartridge, stored in the memory 140. For example, in the state in which any one of the plurality of granulation chambers is determined to be an application chamber, the controller 1070 may update data on usage of the granulation chamber determined to be the application chamber based on the number of puffs sensed by the puff sensor included in the sensor module 1030.

The controller 1070 may determine a granulation chamber through which the aerosol generated by the heater passes (hereinafter referred to as an "application chamber"), among the plurality of granulation chambers (e.g. the granulation chamber 321, 322 shown in FIG. 3). That is, the application chamber may be a granulation chamber that is connected to the first connecting passage 319, among the plurality of granulation chambers. For example, the controller 1070 may determine whether the second container 32 is rotated based on a signal received from the rotation detection sensor and determine a granulation chamber through which the aerosol passes, among the plurality of granulation chambers, according to rotation of the second container 32.

The controller 1070 may determine whether the multiple granulation chambers are located at correct positions based on a signal received from the rotation detection sensor. Here, the correct positions of the multiple granulation chambers may be positions at which one of the multiple granulation chambers is selectively connected to the first connecting passage 319 and the other one thereof is sealed so as to block the inflow of air from the outside thereinto.

When the multiple granulation chambers are not located at the correct positions, the controller 1070 may interrupt the supply of electric power to the heater.

The controller 1070 may determine the extent to which the cartridge is used. For example, the controller 1070 may determine the extent to which the cartridge is used based on the number of puffs, the temperature of the heater, the electric power supplied to the heater, a flow change during a puff, and a pressure change during a puff.

In the case in which the cartridge includes a liquid chamber (e.g. the liquid chamber 311 shown in FIG. 3) and a granulation chamber, the controller 1070 may determine the extent to which the liquid chamber is used and the extent to which the granulation chamber is used. On the other hand, in the case in which the cartridge includes a plurality of granulation chambers, the controller 1070 may independently determine the extents to which the respective granulation chambers are used.

The controller 1070 may store data on the cartridge in the memory 1040. In the case in which the cartridge includes a liquid chamber and a granulation chamber, the controller 1070 may store data on the liquid chamber and data on the granulation chamber in the memory 1040. For example, the controller 1070 may store data on the extent to which the liquid chamber is used and data on the extent to which the granulation chamber is used in the memory 1040.

On the other hand, in the case in which the cartridge includes a plurality of granulation chambers, the controller 1070 may independently store data on the respective granulation chambers in the memory 1040.

The controller 1070 may update the data stored in the memory 1040 based on mounting/demounting of the cartridge. For example, the controller 1070 may initialize the data stored in the memory 1040 when demounting of the cartridge is sensed.

When mounting of the cartridge is sensed, the controller 1070 may determine the order of the plurality of granulation chambers based on a signal received from the rotary switch 44, and may independently store data on the respective granulation chambers in the memory 1040 in the determined order.

In the case in which the dial gear 42 is connected to the motor, the controller 1070 may control the operation of the motor to rotate the second container 32. Here, the motor for rotating the dial gear 42 may be a step motor. For example, when user input for selecting any one of the plurality of granulation chambers is received through the input device, the controller 1070 may rotate the motor so that the selected granulation chamber is connected to the first connecting passage 319.

In this case, when demounting of the cartridge is sensed, the controller 1070 may perform control such that the position of the dial gear 42 is fixed. That is, in the state in which the cartridge is demounted from the housing 10, even when user input for rotating the dial gear 42 is received through the input device, the controller 1070 may omit control of operation of the motor for rotating the dial gear 42.

FIG. 46 is a flowchart showing an operation method of the aerosol-generating device according to an embodiment of the present disclosure.

Referring to FIG. 46, the aerosol-generating device 1000 may check a signal output from the rotation detection sensor included in the sensor module 1030 in operation 54601. This will be described with reference to FIGS. 47 and 48.

Referring to FIG. 47, the rotary switch 44, which is an example of the rotation detection sensor, may include a shaft 4710, which is rotatable about a rotating shaft 4705, a fixed contact 4720, and a plurality of variable contacts 4730, which are arranged in a circular shape.

When the shaft 4710 of the rotary switch 44 rotates in response to rotation of the dial gear 42 and/or the dial 43, the fixed contact 4720 may be electrically connected to one selected from among the variable contacts 4730 by the shaft 4710, and the rotary switch 44 may output an electric signal corresponding to the electric connection between the fixed contact 4720 and the selected one of the variable contacts 4730.

The aerosol-generating device 1000 may determine, among the plurality of variable contacts 4730, a first variable contact 4731, which corresponds to an electric signal output from the rotary switch 44 at the time of initial setting, to be a reference contact. The number of variable contacts 4730 may be equal to or larger than the number of granulation chambers included in the second container 32.

Also, the aerosol-generating device 1000 may determine variable contacts corresponding to respective ones of the granulation chambers included in the second container 32 based on the position of the first variable contact 4731 determined to be the reference contact.

Referring to FIG. 48, when the number of granulation chambers included in the second container 32 is two, the aerosol-generating device 1000 may determine, among the variable contacts arranged in a circular shape, the first variable contact 4731 and a second variable contact 4737, which is located opposite the first variable contact 4731, to be variable contacts corresponding to respective ones of the granulation chambers included in the second container 32.

When the number of granulation chambers included in the second container 32 is three, the aerosol-generating device 1000 may determine, among the variable contacts arranged in a circular shape, the first variable contact 4731 and a plurality of third variable contacts 4735 and 4739, which are located so as to trisect the circle, to be variable contacts corresponding to respective ones of the granulation chambers included in the second container 32.

When the number of granulation chambers included in the second container 32 is four, the aerosol-generating device 1000 may determine, among the variable contacts arranged in a circular shape, the first variable contact 4731 and a plurality of fourth variable contacts 4734, 4737, and 4740, which are located so as to quadrisect the circle, to be variable contacts corresponding to respective ones of the granulation chambers included in the second container 32.

Referring again to FIG. 46, the aerosol-generating device 1000 may determine whether a signal output from the rotation detection sensor is a signal corresponding to any one of the plurality of granulation chambers in operation S4602. For example, when the number of granulation chambers included in the second container 32 is four, the aerosol-generating device 1000 may determine whether an electric signal corresponding to electric connection between the fixed contact 4720 and any one of the variable contacts 4731, 4734, 4737, and 4740 corresponding to respective ones of the granulation chambers is output from the rotary switch 44.

When the signal output from the rotation detection sensor is a signal corresponding to any one of the plurality of granulation chambers, the aerosol-generating device 1000 may determine that the granulation chambers are located at correct positions in operation S4603. For example, when the signal output from the rotation detection sensor is an electric signal corresponding to electric connection between the first variable contact 4731 and the fixed contact 4720, the aerosol-generating device 1000 may determine that the granulation chamber corresponding to the first variable contact 4731 is selectively connected to the first connecting passage 319 and that the remaining chambers are sealed so as to block the inflow of air from the outside thereinto.

When the signal output from the rotation detection sensor is a signal different from the signals corresponding to the plurality of granulation chambers, the aerosol-generating device 1000 may monitor whether the signal output from the rotation detection sensor changes within a predetermined time period in operation 54604.

When the signal output from the rotation detection sensor changes within a predetermined time period, the process proceeds to operation 54601, so the aerosol-generating device 1000 may check the signal output from the rotation detection sensor. When the second cartridge 32 is rotated by the user, the signal output from the rotation detection sensor may continuously change. Therefore, the aerosol-generating device 1000 may check the signal output from the rotation detection sensor until the signal output from the rotation detection sensor is maintained constant during a predetermined time period or longer.

In the state in which the signal output from the rotation detection sensor is a signal different from the signals corresponding to the plurality of granulation chambers, when the signal output from the rotation detection sensor does not change during a predetermined time period or longer, the aerosol-generating device 1000 may determine that the granulation chambers are not located at correct positions, that is, that the granulation chambers are located at arbitrary positions, in operation S4605.

Here, the arbitrary positions may be positions of the plurality of granulation chambers 321 and 322 at which two or more of the plurality of granulation chambers 321 and 322 are connected to the first connecting passage 319 or at which all of the plurality of granulation chambers 321 and 322 are sealed so as to block the inflow of air thereinto.

On the other hand, when the signal output from the rotation detection sensor is a signal corresponding to any one of the plurality of granulation chambers, the aerosol-generating device 1000 may determine that the granulation chambers are located at correct positions in operation S4605.

FIG. 49 is a flowchart showing an operation method of the aerosol-generating device according to another embodiment of the present disclosure. A detailed description of the same content as that described with reference to FIGS. 46 to 48 will be omitted.

Referring to FIG. 49, the aerosol-generating device 1000 may check a signal output from the rotation detection sensor included in the sensor module 1030 in operation S4901.

The aerosol-generating device 1000 may determine whether the signal output from the rotation detection sensor is a signal corresponding to any one of the plurality of granulation chambers in operation S4902.

When the signal output from the rotation detection sensor is a signal corresponding to any one of the plurality of granulation chambers, the aerosol-generating device 1000 may determine that the granulation chambers are located at correct positions in operation S4903.

The aerosol-generating device 1000 may determine the application chamber through which the aerosol generated in the first container 31 passes, among the plurality of granulation chambers included in the second container 32, in operation S4904. For example, when the signal output from the rotation detection sensor is an electric signal corresponding to electric connection between the first variable contact 4731 and the fixed contact 4720, the aerosol-generating device 1000 may determine the granulation chamber corresponding to the first variable contact 4731 to be the application chamber.

The aerosol-generating device 1000 may check usage of the granulation chamber determined to be the application chamber, and may determine whether usage of the granulation chamber is equal to or greater than a predetermined reference in operation S4905. Here, the predetermined reference may be set according to the maximum number of puffs preset for each granulation chamber and the maximum time period for which electric power is supplied to the heater 314 in a preset amount per unit time for each granulation chamber.

For example, the aerosol-generating device 1000 may check usage of the granulation chamber determined to be the application chamber based on data on usage of the granulation chamber stored in the memory 1040.

When usage of the granulation chamber determined to be the application chamber is less than the predetermined reference, the aerosol-generating device 1000 may supply electric power to the heater 314 based on the temperature profile and/or the electric power profile stored in the memory 1040 in operation S4906.

The aerosol-generating device 1000 may determine whether a puff is sensed using the puff sensor included in the sensor module 1050. In this case, when a puff is sensed, the aerosol-generating device 1000 may supply electric power to the heater 314 in a preset amount per unit time based on the electric power profile stored in the memory 1040.

For example, the aerosol-generating device 1000 may supply electric power to the heater 314 in a preset amount per unit time during a preset time period starting when a puff is sensed.

For example, the aerosol-generating device 1000 may supply electric power to the heater 314 in a preset amount per unit time from when a puff is sensed to when the puff ends.

Also, the aerosol-generating device 1000 may update the data on usage of the granulation chamber determined to be the application chamber stored in the memory 1040. For example, when a puff is sensed, the aerosol-generating device 1000 may increase the current number of puffs corresponding to the granulation chamber determined to be the application chamber.

When the signal output from the rotation detection sensor is a signal different from the signals corresponding to the plurality of granulation chambers, the aerosol-generating device 1000 may monitor whether the signal output from the rotation detection sensor is changed within a predetermined time period in operation S4907.

When the signal output from the rotation detection sensor changes within a predetermined time period, the process proceeds to operation S4901, so the aerosol-generating device 1000 may check the signal output from the rotation detection sensor.

In the state in which the signal output from the rotation detection sensor is a signal different from the signals corresponding to the plurality of granulation chambers, when the signal output from the rotation detection sensor does not change during a predetermined time period or longer, the aerosol-generating device 1000 may determine that the granulation chambers are not located at correct positions, that is, that the granulation chambers are located at arbitrary positions, in operation S4908.

When the granulation chambers are not located at correct positions, or when usage of the granulation chamber determined to be the application chamber is equal to or greater than a predetermined reference, the aerosol-generating device 1000 may interrupt the supply of electric power to the heater 314 in operation S4909. For example, when the current number of puffs corresponding to the granulation chamber determined to be the application chamber reaches a preset maximum number of puffs, the aerosol-generating device 1000 may interrupt the supply of electric power to the heater 314.

When the granulation chambers are not located at correct positions, the aerosol-generating device 1000 may output a message prompting to adjust the positions of the granulation chambers through the output device. For example, when the granulation chambers are not located at correct positions, the aerosol-generating device 1000 may control the operation of the vibration motor so as to generate vibrations according to a preset time period and a preset number of times. In this case, the user may sense the vibrations generated by the vibration motor, thereby immediately recognizing the situation in which the granulation chambers are not located at correct positions.

Also, when usage of the granulation chamber determined to be the application chamber is equal to or greater than the predetermined reference, the aerosol-generating device 1000 may output a message prompting to change the application chamber through the output device.

For example, when there is a granulation chamber, usage of which is less than the predetermined reference, among the granulation chambers other than the granulation chamber determined to be the application chamber, the aerosol-generating device 1000 may output a message prompting to change the application chamber to the corresponding granulation chamber through the display.

For example, when there is a plurality of granulation chambers, usage of which is less than the predetermined reference, the aerosol-generating device 1000 may output a message prompting to change the application chamber to a granulation chamber located adjacent to the granulation chamber currently determined to be the application chamber, among the corresponding granulation chambers.

Also, based on the positions of the variable contacts corresponding to respective ones of the granulation chambers, which are included in the rotary switch 44, the aerosol-generating device 1000 may output a message prompting to change the application chamber, which includes a rotation direction and a rotation angle, through the output device.

The aerosol-generating device 1000 may determine whether usage of all of the plurality of granulation chambers is equal to or greater than the predetermined reference in operation S4910. For example, the aerosol-generating device 1000 may determine whether any of the current numbers of puffs corresponding to respective ones of the plurality of granulation chambers included in the second container 32 has reached a preset maximum number of puffs.

When there is at least one granulation chamber, usage of which is less than the predetermined reference, the aerosol-generating device 1000 may determine whether the signal output from the rotation detection sensor is changed, that is, whether the second cartridge 32 is rotated, in operation S4911.

When the signal output from the rotation detection sensor does not change, the aerosol-generating device 1000 may determine whether the granulation chambers are located at correct positions in operation S4912.

When the granulation chambers are located at correct positions, the process proceeds to operation S4905, so the aerosol-generating device 1000 may control the supply of electric power to the heater 314 according to usage of the granulation chamber determined to be the application chamber.

When the granulation chambers are located at arbitrary positions, the process proceeds to operation S4909, so the aerosol-generating device 1000 may continuously interrupt the supply of electric power to the heater 314.

When usage of all of the plurality of granulation chambers is equal to or greater than the predetermined reference, the aerosol-generating device 1000 may determine that it is not possible for the user to use the plurality of granulation chambers to generate an aerosol in operation S4913. In this case, the aerosol-generating device 1000 may output a message indicating that the plurality of granulation chambers is unusable through the output device.

Also, the aerosol-generating device 1000 may continuously monitor whether the signal output from the rotation detection sensor is changed throughout the operation thereof. When the signal output from the rotation detection sensor is changed, the process proceeds to operation S4901, so the aerosol-generating device 1000 may check the signal output from the rotation detection sensor.

As described above, according to at least one of the embodiments of the present disclosure, it is possible to guarantee optimal quality of a medium in consideration of usage of the plurality of granulation chambers. In addition, according to at least one of the embodiments of the present disclosure, it is possible to change the granulation chamber through which an aerosol passes, thereby providing various media to a user without the necessity to replace the cartridge 30. In addition, according to at least one of the embodiments of the present disclosure, in the state in which the cartridge 30 is mounted to the main body, a user is capable of appropriately selecting a desired medium using the dial 43 or the like in response to a message output through the output device.

Referring to FIGS. 1 to 49, an aerosol-generating device 1000 in accordance with one aspect of the present disclosure may include a first container 31 configured to accommodate an aerosol-generating substance, a heater 314 configured to heat the aerosol-generating substance, a second container 32 configured to be rotatable about a rotating shaft thereof and including a plurality of partitioned chambers, a first sensor (e.g. a rotation detection sensor) configured to output a signal indicating rotation of the second container 32, and a controller 1070 configured to determine whether the plurality of chambers is located at preset correct positions based on a signal received from the first sensor.

In addition, in accordance with another aspect of the present disclosure, the correct positions may be positions of the plurality of chambers at which an aerosol generated in the first container 31 passes through any one of the plurality of chambers and the remaining chambers other than the chamber through which the aerosol passes are sealed.

In addition, in accordance with another aspect of the present disclosure, when the signal received from the first sensor is a signal corresponding to any one of the plurality of chambers, the controller 1070 may determine that the plurality of chambers is located at the preset correct positions. When the signal received from the first sensor is a signal different from signals corresponding to the plurality of chambers, the controller 1070 may determine that the plurality of chambers is not located at the preset correct positions.

In addition, in accordance with another aspect of the present disclosure, when receiving a signal different from signals corresponding to the plurality of chambers, the controller 1070 may monitor whether the signal received from the first sensor changes within a predetermined time period. In the state of receiving a signal different from signals corresponding to the plurality of chambers, when the signal received from the first sensor does not change during the predetermined time period, the controller 1070 may determine that the plurality of chambers is not located at the preset correct positions.

In addition, in accordance with another aspect of the present disclosure, when the plurality of chambers is located at the preset correct positions, the controller 1070 may perform control such that electric power is supplied to the heater 314. When the plurality of chambers is not located at the preset correct positions, the controller 1070 may perform control such that the supply of electric power to the heater 314 is interrupted.

In addition, in accordance with another aspect of the present disclosure, when the plurality of chambers is located at the preset correct positions, the controller 1070 may determine a chamber through which an aerosol generated in the first container 31 passes, among the plurality of chambers, based on the signal received from the first sensor.

In addition, in accordance with another aspect of the present disclosure, the aerosol-generating device may further include an output device configured to output a message. When the plurality of chambers is not located at the preset correct positions, the controller 1070 may output a message prompting to adjust the position of a chamber through the output device.

In addition, in accordance with another aspect of the present disclosure, the output device may include a vibration motor. When the plurality of chambers is not located at the preset correct positions, the controller 1070 may control operation of the vibration motor so as to generate vibrations according to a preset time period and a preset number of times.

In addition, in accordance with another aspect of the present disclosure, the aerosol-generating device may further include a first gear (e.g. a cartridge gear 41) disposed such that the inner peripheral surface thereof is in contact with the outer peripheral surface of the second container 32 and a second gear (e.g. a dial gear 42) engaged with the outer peripheral surface of the first gear so as to rotate. The first sensor may be a rotary switch 44 mounted coaxially with the second gear.

In addition, in accordance with another aspect of the present disclosure, the plurality of chambers may be arranged in a circumferential direction about the rotating shaft of the second container 32.

Certain embodiments or other embodiments of the disclosure described above are not mutually exclusive or distinct from each other. Any or all elements of the embodiments of the disclosure described above may be combined with another or combined with each other in configuration or function).

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An aerosol-generating device comprising:
a first container configured to accommodate an aerosol-generating substance;
a heater configured to heat the aerosol-generating substance;
a second container configured to be rotatable about a rotating shaft and comprising a plurality of partitioned chambers;
a first sensor configured to output a signal corresponding to rotation of the second container;
a first gear coupled with the second container;
a second gear configured to be engaged with the first gear so as to rotate, wherein the first sensor is a rotary switch mounted coaxially with the second gear; and
a controller configured to determine whether the plurality of partitioned chambers are located at preset correct positions based on a signal received from the first sensor,
wherein the controller is further configured to:
determine that the plurality of partitioned chambers are located at the preset correct positions based on the received signal corresponding to any one of the plurality of partitioned chambers, and
determine that the plurality of partitioned chambers are not located at the preset correct positions based on the received signal being different from the signal corresponding to any one of the plurality of partitioned chambers.

2. The aerosol-generating device according to claim 1, wherein when the plurality of partitioned chambers are located at the preset correct positions, an aerosol generated in the first container is able to pass through one of the plurality of partitioned chambers and remaining chambers other than the one chamber are sealed.

3. The aerosol-generating device according to claim 1, wherein:
based on the received signal being different from the signal corresponding to any one of the plurality of partitioned chambers, the controller is configured to monitor whether the received signal changes within a predetermined time period before determining that the plurality of partitioned chambers are not located at the preset correct positions.

4. The aerosol-generating device according to claim 1, wherein the controller is configured to:
based on the plurality of partitioned chambers being located at the preset correct positions, perform control such that electric power is supplied to the heater, and
based on the plurality of partitioned chambers not being located at the preset correct positions, perform control such that supply of electric power to the heater is interrupted.

5. The aerosol-generating device according to claim 1, wherein, based on the plurality of partitioned chambers being located at the preset correct positions, the controller is configured to determine a chamber of the plurality of partitioned chambers through which an aerosol generated in the first container is able to pass based on the signal received from the first sensor.

6. The aerosol-generating device according to claim 1, further comprising:
an output device configured to output information,
wherein, based on the plurality of partitioned chambers not being located at the preset correct positions, the controller is configured to output an indication via the output device to adjust a position of a chamber.

7. The aerosol-generating device according to claim 6, wherein the output device comprises a vibration motor, and the output indication comprises vibrations according to a preset time period and a preset number of times.

8. The aerosol-generating device according to claim 1, wherein the plurality of partitioned chambers are arranged around the rotating shaft of the second container.

* * * * *